United States Patent [19]

Sakuraba

[11] Patent Number: 5,623,857
[45] Date of Patent: Apr. 29, 1997

[54] METHOD AND APPARATUS FOR COMPENSATING FOR THERMAL DISTORTION FOR A MACHINE TOOL

[75] Inventor: Hajime Sakuraba, Abiko, Japan

[73] Assignee: Hitachi Seiki Co., Ltd., Abiko, Japan

[21] Appl. No.: 458,305

[22] Filed: Jun. 2, 1995

[30] Foreign Application Priority Data

| Jun. 16, 1994 | [JP] | Japan | 6-158105 |
| Oct. 24, 1994 | [JP] | Japan | 6-284357 |
| Jan. 19, 1995 | [JP] | Japan | 7-024741 |

[51] Int. Cl.⁶ .................................................. B23Q 15/18
[52] U.S. Cl. ............................ 82/1.11; 82/142; 82/900; 409/135
[58] Field of Search ........................... 82/1.11, 142, 900; 408/10, 13; 409/131, 135, 193, 207, 238; 364/474.19

[56] References Cited

U.S. PATENT DOCUMENTS

| 3,136,218 | 6/1964 | Tripp | 409/238 |
| 3,521,526 | 7/1970 | Olig et al. | 409/135 |
| 3,612,840 | 10/1971 | Stobbe | 235/151.11 |
| 4,533,858 | 8/1985 | Tlaker | 82/900 X |
| 4,736,625 | 4/1988 | Patterson et al. | 364/474.19 |
| 4,808,048 | 2/1989 | Miller | 408/13 X |
| 5,303,458 | 4/1994 | Sheehan et al. | 409/135 X |

FOREIGN PATENT DOCUMENTS

| 0138375 | 4/1986 | European Pat. Off. . | |
| 0146410 | 2/1981 | Germany | 82/900 |
| 090239 | 7/1980 | Japan | 409/238 |
| 58-109250 | 6/1983 | Japan . | |
| 0132441 | 8/1983 | Japan | 409/135 |
| 60-9634 | 1/1985 | Japan . | |
| 60-009634 | 5/1985 | Japan . | |
| 1109048 | 7/1989 | Japan . | |
| 2041848 | 4/1990 | Japan . | |
| 2224949 | 11/1990 | Japan . | |
| 3-79256 | 4/1991 | Japan . | |
| 3079256 | 6/1991 | Japan . | |
| 4019042 | 4/1992 | Japan . | |
| 4008452 | 4/1992 | Japan . | |
| 40511836 | 1/1993 | Japan | 364/474.19 |
| 5-84628 | 4/1993 | Japan . | |
| 5084628 | 7/1993 | Japan . | |
| 6-22779 | 3/1994 | Japan . | |

OTHER PUBLICATIONS

"Machine-tool thermal compensation" Tooling & Production, pp. 60–65, Aug. 1989.
Seiki Technical News 1994 vol. 91, pp. 115–117, Oct. 7, 1994.
Kikai Gijutsu 1994 vol. 42 No. 10, pp. 44–48, Oct. 1, 1994.

*Primary Examiner*—M. Rachuba
*Assistant Examiner*—Henry W. H. Tsai
*Attorney, Agent, or Firm*—Armstrong, Westerman, Hattori, McLeland & Naughton

[57] ABSTRACT

A temperature change of a machine tool which is influenced by a heat generating source is detected by a temperature sensor. A temperature change having substantially the same time constant as a time constant of a thermal distortion of the machine tool is calculated by using the detected temperature change. A machining error is corrected on the basis of the thermal distortion corresponding to the calculated temperature change. According to a method and an apparatus for compensating for the thermal distortion in the machine tool, it is possible to perform the compensation relative to the thermal distortion with high precision. The invention is applied to a machine tool such as a machining center and an NC lathe.

26 Claims, 27 Drawing Sheets

METHOD AND APPARATUS FOR COMPENSATING FOR THERMAL DISTORTION FOR A MACHINE TOOL

BACKGROUND OF THE INVENTION

The present invention relates to a method and apparatus for compensating for thermal distortion for a machine tool.

A machine tool has heat sources in various parts thereof. For example, the heat sources includes a rolling frictional heat of a bearing of a main spindle, a heat generated from a cutting portion and the like. These heats are conducted to respective parts of the machine structure to cause the latter to be deformed. The deformation of the machine structure would largely influence the machining precision.

There have been proposed various methods and apparatus for correcting errors caused by the thermal distortion caused by various causes, by predicting the thermal distortion and feeding a compensation for the errors back to a servo system.

In such a machine tool having a function of compensating, it is important how accurately the thermal distortion generated during the operation of the machine is predicted. Various approaches for this end have been conducted. For example, in one of the approaches, the thermal distortion is predicted from operational conditions such as a rotation speed of the main spindle. In another approach, the thermal distortion is detected by a sensor installed in the machine structure.

The present applicant has proposed a method for compensating a thermal distortion for a machine tool in Japanese Patent Examined Publication No. Hei 6-22779 and Japanese Patent Application Laid-Open No. Hei 3-79256 in which the thermal distortion is calculated from a structure temperature. The calculation according to this method is basically given by the following principle of the following equation (1):

$$\Delta L = L \times (\text{linear expansion coefficient}) \times (\text{temperature change}) \quad (1)$$

where $\Delta L$ is the thermal distortion of the constituent part of the machine structure, and L is the length of the constituent part.

The machining precision after the compensation according to the conventional technology has a physical limit of about 20 to 30 μm. However, recently, the machine tool users generally require the precision after compensation to be suppressed to 10 μm or less. The reason for this is that a new material such as a ceramic material, a further miniaturized workpiece or the like should be machined with high precision.

Also, in the above-described calculation method, since the length L of the constituent part is expected from the structure of the machine structure and the temperature change is detected at the central position of the length L of the temperature sensor, there is a limit to a mount position of the temperature sensor. Further, in order to predict the thermal distortion with high precision, it is necessary to divide the machine structure into a number of small constituent parts each of which needs a temperature sensor for calculating each temperature change. Also, it is necessary to measure the length L of the constituent part and to confirm linear expansion coefficients of the respective machine constituent parts.

These factors lead to hindrances against the actual mounting work of the thermal distortion compensating apparatus of the machine tool in which the thermal distortion is calculated from the structure temperature.

On the other hand, Japanese Patent Application Laid-Open No. Sho 58-109250 discloses an apparatus for compensating a thermal distortion of a machine tool by using a metal piece having a thermal similarity to the machine tool, regarding the temperature thereof as a temperature representative of the machine tool and controlling a temperature of a cooling jetting air blow. In this case, however, it is necessary to additionally prepare the thermal metal piece having the thermal similarity.

Further, Japanese Patent Application Laid-Open No. Sho 60-9634 discloses a thermal distortion compensating apparatus using a temperature sensor having a thermal time constant which conforms with the characteristics of a Y axis thermal distortion. In this compensating apparatus, however, the detail of the temperature sensor having the thermal time constant which conform to the characteristics of the thermal distortion does not become apparent.

By the way, in case of a machine tool having a plurality of main spindles, each main spindle has a different elongation due to the non-uniformity in prepressure that has been applied to bearings of each main spindle, a difference in conduction of the temperature at a place where each main spindle is mounted and a status of lubrication of the bearings.

For this reason, for example, after a plurality of workpieces have been simultaneously roughly worked and finished by tools mounted on the main spindles, the number of the main spindles to be used in the final finishing work is limited to one and the other main spindles are stopped. As a result, the heat generation of the main spindle is suppressed and only the thermal deformation of the main spindle to be used is thermally compensated to thereby carry out the finishing work. In this case, in order to avoid interferences of the tools carried on the stopping main spindles with the workpieces, it is also necessary to remove the stopping tools from the main spindles in advance. Accordingly, the working efficiency of the finishing work is very low.

Japanese Patent Application Laid-Open No. Hei 5-84628 discloses a thermal distortion compensating apparatus of a machine tool having a plurality of main spindles. However, the thermal distortion compensation through the compensating apparatus has a certain limit. It is difficult to make the machining errors after the compensation approach zero as much as possible.

SUMMARY OF THE INVENTION

In order to overcome the above-noted defects, an object of the present invention is to provide a method and an apparatus for compensating a thermal distortion for a machine tool, which may carry out a correction of machining errors caused by generated heats with high precision.

Another object of the invention is to provide a thermal distortion compensating method and apparatus for a machine tool, which dispenses with a measurement of a length of a portion of a machine structure of the machine tool and a confirmation work of a linear expansion coefficient of a material of the machine structure, and simplifies the actually measurement work of the extraction of the thermal distortion growth using the actual machine tool.

Still another object of the invention is to provide a thermal distortion compensating method and apparatus for a machine tool, which considerably moderate the limitation of the mount positions of the temperature sensors with a high degree of freedom while well predicting the precision of the thermal distortion with a small number of the temperature sensors.

Still another object of the invention is to provide a thermal distortion compensating method and apparatus for a machine tool, which simultaneously machines a plurality of workpieces with high precision and considerably enhances the workability in case of a machine tool having a plurality of main spindles.

In order to attain these and other objects of the invention, a thermal distortion due to an elongation in a predetermined axial direction or a thermal distortion due to a slant of a main spindle when any desired main spindle rotation speed is imparted to a machine tool. At the same time, the temperature change at a suitable position of the machine structure of the machine tool is detected by a temperature sensor. If the temperature change and the thermal distortion are identical with each other in time sequence, the temperature change and the thermal distortion are kept under a simple linear relationship. Under the prerequisite condition, it is therefore possible to readily estimate the thermal distortion from the temperature change.

However, a "time constant" possessed by the temperature change detected from the predetermined position of the machine structure is not always a "time constant" possessed by the thermal distortion in the predetermined axial direction. It is therefore necessary to provide a method for making the time constant of the temperature change coincident with the time constant owned by the thermal distortion by suitably processing the data of the temperature change.

Accordingly, in the thermal distortion compensating method according to the present invention, the temperature change of the machine structure which is under the influence of a heat source is detected, the detected temperature change is used for calculating the temperature change having substantially the same time constant as the time constant of the thermal distortion of the machine tool, and a machining error is corrected on the basis of the thermal change obtained by using a function for determining the relationship between the calculated temperature change and the thermal distortion.

Incidentally, the "thermal distortion of the machine tool" ideally means a thermal distortion at a working point of a tool. However, it actually means a thermal distortion at a predetermined position of, for example, a distal end portion of the main spindle or a suitable portion of a test bar which has been temporarily attached to the distal end portion of the main spindle.

The apparatus for compensating for a thermal distortion of a machine tool comprises: temperature detecting means for detecting a temperature change of a machine structure which is influenced by a heat source; temperature calculating means for calculating a temperature change having substantially the same time constant as a time constant of the thermal distortion of the machine tool by using the temperature change detected by the temperature detecting means; thermal distortion calculating means for calculating the thermal distortion that changes in correspondence with the temperature change calculated by the temperature calculating means; and compensating means for correcting a machining error on the basis of the thermal distortion calculated by the thermal distortion calculating means.

A "mix method" and a "dummy method" are used as examples of data processing methods for making the data of the detected temperature change coincident with the time constant owned by the thermal distortion.

In the mix method, first of all, the thermal distortion is detected when any desired main spindle rotation speed is given to the machine tool. At the same time, the temperature change at a position having the time constant of the temperature change which is smaller than the time constant of this thermal distortion and the temperature at another position having the time constant of the temperature change which is larger than the time constant of this thermal distortion are detected. Then, a mixed temperature change having the time constant which is substantially the same as the time constant of the thermal distortion of the machine tool is created by mixing the temperature changes having the time constants different from each other.

Incidentally, in the mix method, when the mixed temperature change is created, it is possible to perform such a step that once the plurality of mixed temperature changes are created, and the plurality of mixed temperature changes are further mixed to make a new mixed temperature change having substantially the same time constant as the time constant of the thermal distortion of the machine tool.

By the way, in the mix method, when the mixed temperature change is created, the data obtained from the temperature sensors on the real time basis are directly used. For this reason, this method is superior in high reliability of the precision of the mixed temperature change. However, this method is limited to the application only in the case where the time constant of the thermal distortion is between the respective time constants of the temperature changes.

In contrast, in the dummy method, the thermal distortion is detected in the case where any desired main spindle rotation speed is given to the machine tool. At the same time, the temperature change at a predetermined position having a time constant of the temperature change which is smaller than the time constant of the thermal distortion is detected. The behavior of the delay temperature change that will appear with a time lag to the detected temperature change is predicted by setting a heat capacity of the dummy, namely a phantom delay temperature change having substantially the same time constant as the time constant of the thermal distortion which will appear with a time lag is created by the repeated calculation while predicting the time lag to the detected temperature change.

Incidentally, in the dummy method, when the delay temperature change is created, it is possible to perform such a step that once another delay temperature change is created, and a further delay is predicted to the delay temperature change to make a delay temperature change having substantially the same time constant as the time constant of the thermal distortion.

Thus, in the dummy method, the delay temperature change is calculated by the repeated calculation while predicting the delay to the temperature change. Accordingly, the equations for calculating are simple but the method is inferior in reliability of the precision because of its rough approximate calculation.

In some cases, the linear correlation between the new temperature change having the same time constant as the time constant of the thermal distortion of the machine tool and the thermal distortion could not be maintained due to a lagging characteristic of the thermal distortion. The lagging characteristic is caused by an influence of the transmission of the generated heat at the main spindle head to the column or the like in accordance with the rotation of the main spindle, or the influence of other heat sources such as a room temperature or the like.

Accordingly, in order to maintain the linear correlation between the new temperature change and the thermal distortion for a long period of time, the estimation is carried out by adding the lagging characteristic of the thermal distortion, which will gradually appear, to the thermal distortion estimated by the temperature change created by the mix method or the dummy method.

For example, the mixed temperature change is created by the mix method by using the temperature data detected at at least two positions where the temperatures are changed with different time constants by the influence of the heat source. At the same time, the thermal distortion obtained by this mixed temperature change and the linear correlation is calculated. Then, the lagging characteristic of the thermal distortion obtained by the delay temperature change created by predicting the delay to the temperature change and the linear correlation is calculated by using either the above-described temperature data or another temperature data detected from a position where the temperature will be changed relatively gradually.

The estimation of the thermal distortion by the temperature change created by the combination of the mix method and the dummy method is preferable because of its high reliability of the precision.

Also, the first delay temperature change is created by the dummy method by using the temperature data detected from a position where the temperature in the vicinity of the heat source is rapidly and largely changed. At the same time, the thermal distortion obtained by the delay temperature change at the linear correlation is calculated.

Then, a second delay temperature change created by sufficiently predicting the temperature change and a lagging characteristic of the thermal distortion obtained by the second delay temperature change at the linear correlation are calculated by using the above-described temperature data or the temperature data detected from the position where the temperature is comparatively gradually changed.

The estimation of the thermal distortion in accordance with the temperature change created by the combination of the dummy method and the dummy method is somewhat inferior in reliability of the precision to the estimation of the temperature change created by the combination of the mix method and the dummy method.

The methods for combining the mix method and the dummy method or the dummy method and the dummy method will be explained in more detail by exemplifying a machining center (hereinafter referred to as MC) in which a main spindle head is a heat source or a numerically controlled lathe (hereinafter referred to as NC lathe) in which a heat source is incorporated in a headstock.

First of all, in the combination of the mix method and the dummy method, the thermal distortion of the machine tool is detected when the MC or the like is operated and any desired main spindle rotation speed is given thereto. At the same time, the temperature changes of the machine structure at a nose position having the time constant of the temperature change smaller than the time constant of the thermal distortion and a head position having the time constant of the temperature change larger than the time constant of the thermal distortion are detected. Then, the mixed temperature change having the same time constant as the time constant of the thermal distortion is created by the mix method. A thermal distortion which changes in correspondence with the mixed temperature change is calculated.

Also, in the combination of the dummy method and the dummy method, the thermal distortion of the machine tool is detected when the MC or the like is operated and any desired main spindle rotation speed is given thereto. At the same time, the temperature changes of the machine structure at a nose position having the time constant of the temperature change smaller than the time constant of the thermal distortion is detected. Then, the delay temperature change having the same time constant as the time constant of the thermal distortion is created by the dummy method. A thermal distortion which changes in correspondence with the delay temperature change is calculated.

Subsequently, in either case of the combination of the mix method and the dummy method and the combination of the dummy method and the dummy method, the following dummy method is additionally effected.

Namely, by predicting the delay to the temperature change detected at the main spindle head position of the MC or the like, the delay temperature change having substantially the same function of time as the lagging characteristic of the thermal distortion, in which the actual thermal distortion is gradually displaced from the thermal distortion previously calculated by using the mixed temperature change or the delay temperature change, is created by the repeated calculation. The lagging characteristic which will change in correspondence with the delay temperature change is calculated.

The data processing method for making the data of the detected temperature change substantially coincident with the time constant owned by the thermal distortion is developed to a "linearizing method". This method is applied according to the present invention.

In the linearizing method, the thermal distortion of the machine tool is detected when any desired main spindle rotation speed is given to the machine tool. At the same time, a temperature change at a desired position of the machine structure where the temperature is changed under the influence of the heat generated from the heat source is detected. A temperature change at the heat source is calculated by using the detected temperature change. Then, the new temperature change having the time constant which is substantially the same as the time constant of the thermal distortion is calculated by using the temperature change of the heat source.

Incidentally, in the linearizing method, when the new temperature change is calculated, the other new temperature change may be once calculated by using the temperature change at the heat source, and the new temperature change having the same time constant as the time constant of the thermal distortion may be calculated by using the other new temperature change.

In the linearizing method, it is not always necessary to detect the temperature change of the position having the time constant of the temperature change smaller than the time constant of the thermal distortion. For this reason, this method has a high degree of freedom of the position where the temperature sensor is mounted but the steps for calculating the new temperature change are somewhat complicated.

Also, in the combination of the linearizing method and the dummy method, the thermal distortion of the machine tool is detected when any desired main spindle rotation speed is given to the machine tool. At the same time, the temperature change of the suitable position of the machine structure where the temperature is changed under the influence of the heat generated from the heat source is detected. Then, the new temperature change having substantially the same time constant as the time constant of the thermal distortion is calculated by the linearizing method. The thermal distortion which will change in correspondence with the new temperature change is calculated.

Subsequently, by predicting the delay to the above-described detected temperature change or the other temperature data separately detected at the position where the temperature is relatively gradually changed, the delay temperature change having substantially the same function of time as the lagging characteristic of the thermal distortion, in which the actual thermal distortion is gradually displaced from the thermal distortion previously calculated by using the new temperature change, is created by the repeated calculation. The lagging characteristic which will change in correspondence with the delay temperature change is calculated.

In the mix method, it is necessary that one of the time constants of the detected temperature changes is smaller than the time constant of the thermal distortion. Also, in the dummy method, the time constant of the detected temperature change must be smaller than the time constant of the thermal distortion. Accordingly, in the case where the thermal distortion is estimated by using the temperature changes created by these methods, the position where the temperature change is detected is limited.

In contrast, in the linearizing method, there is no limit of the magnitude of the time constant of the temperature change to be detected and only one detected temperature may be used for one heat source. Accordingly, the linearizing method is available for calculation of the new temperature change in an MC and an NC lathe having a spindle head (and a headstock) which is sensitive in the thermal distortion in comparison with the temperature change or in a machine tool having a plurality of heat sources which give influences against the machining precision.

For example, the NC lathe is provided with a main spindle for holding either a workpiece or a tool, a headstock for rotatably supporting the main spindle through a front bearing disposed on a machining position side and a rear bearing disposed on an opposite machining position side, and a built-in motor disposed between the front and rear bearings and incorporated in the headstock for drivingly rotating the main spindle. The main spindle is supported by the front and rear bearings, Then, in the NC lathe, the rear bearing is used for positioning the main spindle in a central axial direction, the front bearing is used for slidingly supporting the main spindle, which is elongated or retracted by the thermal distortion, in the central axial direction, and three temperature sensors are mounted on the headstock for detecting the temperature changes in the vicinity of the front and rear bearings and the built-in motor which are heat sources, respectively.

In the case where the linearizing method is applied to the machine tool having such multiple heat sources, the temperature change of each heat source is calculated by using the temperature change detected by each temperature sensor. Each new temperature change having the same time constant as that of the thermal distortion influenced by each heat source is calculated by using the temperature change. Each of the thus calculated temperature changes is kept in a linear correlation with the thermal distortion influenced by the associated heat source.

A heat is generated from each heat source such as the bearings of the main spindle, the motor for driving the main spindle or the like in accordance with the rotation of the spindle of the machine tool. This heat is conducted to the structural parts of the machine structure and as a result the temperature is changed. In general, the machine tool is mainly made of cast iron or steel.

Accordingly, if the temperature of the machine structure is changed, the thermal distortion in proportion to the linear expansion coefficient owned by each structural material is generated in respective structural parts. The thermal distortions of the respective parts are added to degrade of the machining precision of the machine tool.

The temperature change concomitant with the main spindle rotation of the machine tool will appear soon in the vicinity of the heat source. However, the more remote the members such as a spindle head, the head mount portion or a column from the heat source, the later the temperature change will appear. Therefore, the functions of time of the respective temperature changes are different from each other. For this reason, in general, the temperature change at any position of the machine structure is not directly correlated to the thermal distortion.

However, a step input response function of a single primary delay element is approximately simulated to a time-basis data of the thermal distortion and a time-basis data of the temperature change detected from a suitable position of the machine tool influenced by a heat generated from the heat source when any rotation speed of the main spindle is given to the machine tool. As a result, it is possible to extract the respective time constants until the thermal distortion and the temperature change are saturated. The balance between the time constant of the thermal distortion and the time constant of each temperature change may represent the thermal growth of the machine tool. The thermal growth is constant in a wide range of the rotation speed of the main spindle.

Accordingly, a method in which data of the temperature change are suitably processed and a new temperature change having substantially the same time constant as the time constant owned by the thermal distortion is calculated is used. Then, since the new temperature change and the thermal distortion are kept under a linear correlation, it is possible to well predict the thermal distortion indirectly from the data of the temperature change.

Approximately simulating that the thermal distortion phenomenon presents itself on the basis of the temperature change of the single primary delay element, the thermal distortion estimation due to the difference between the delay element and the actually complicated machine structure involves errors. Therefore, by approximate simulation of that the error element is also a function due to the temperature change of the different single primary delay element, it is possible to repeatedly apply the same work.

Accordingly, it is possible to predict the thermal distortion from the temperature change data detected by the positions of the machine structure with sufficiently high precision.

More specifically, in order to extract the thermal growth of the machine tool, the thermal distortion of the machine tool is obtained by using an electric micrometer or the like when any desired main spindle rotation speed is given to the machine tool in a preliminary test. At the same time, the temperature change at the suitable position of the machine structure where the temperature is changed under the influence of the heat from the heat source is detected by a thermistor temperature sensor or the like.

Subsequently, each time constant is extracted by simulating the step input response function of the primary delay element to the time-basis data until the change is substantially saturated. The coefficients of the temperature converting equations determined by the respective methods are calculated by using the temperature change data and selecting one method from the mix method, the dummy method, the linearizing method or the combination thereof for creating the temperature change that has the same time constant as that of the thermal distortion.

If the equations are rewritten by giving the time-basis data of the foregoing temperature change to the temperature converting equations of the selected method, the new temperature change that has the same time constant as that of the thermal distortion may be obtained. The new temperature change and the foregoing thermal distortion data are kept in the linear correlation and the gradient is the proportional constant for calculating the thermal distortion from the new temperature change.

In the thermal distortion compensation upon the operation of the machine tool, the data of the temperature which will change every time at the position where the forgoing temperature change is detected are converted into the new temperature change as desired by using the temperature converting equation in the selected method. Subsequently, the new temperature change is multiplied by the previously calculated proportional constant to thereby obtain the thermal distortion to be compensated.

DESCRIPTION OF THE PREFERRED EMBODIMENTS

Embodiments of the present invention will now be described with reference to FIGS. 1 to 37.

(First and Second Embodiments)

FIGS. 1 to 17 show the first and second embodiments of the invention.

Figure 1:
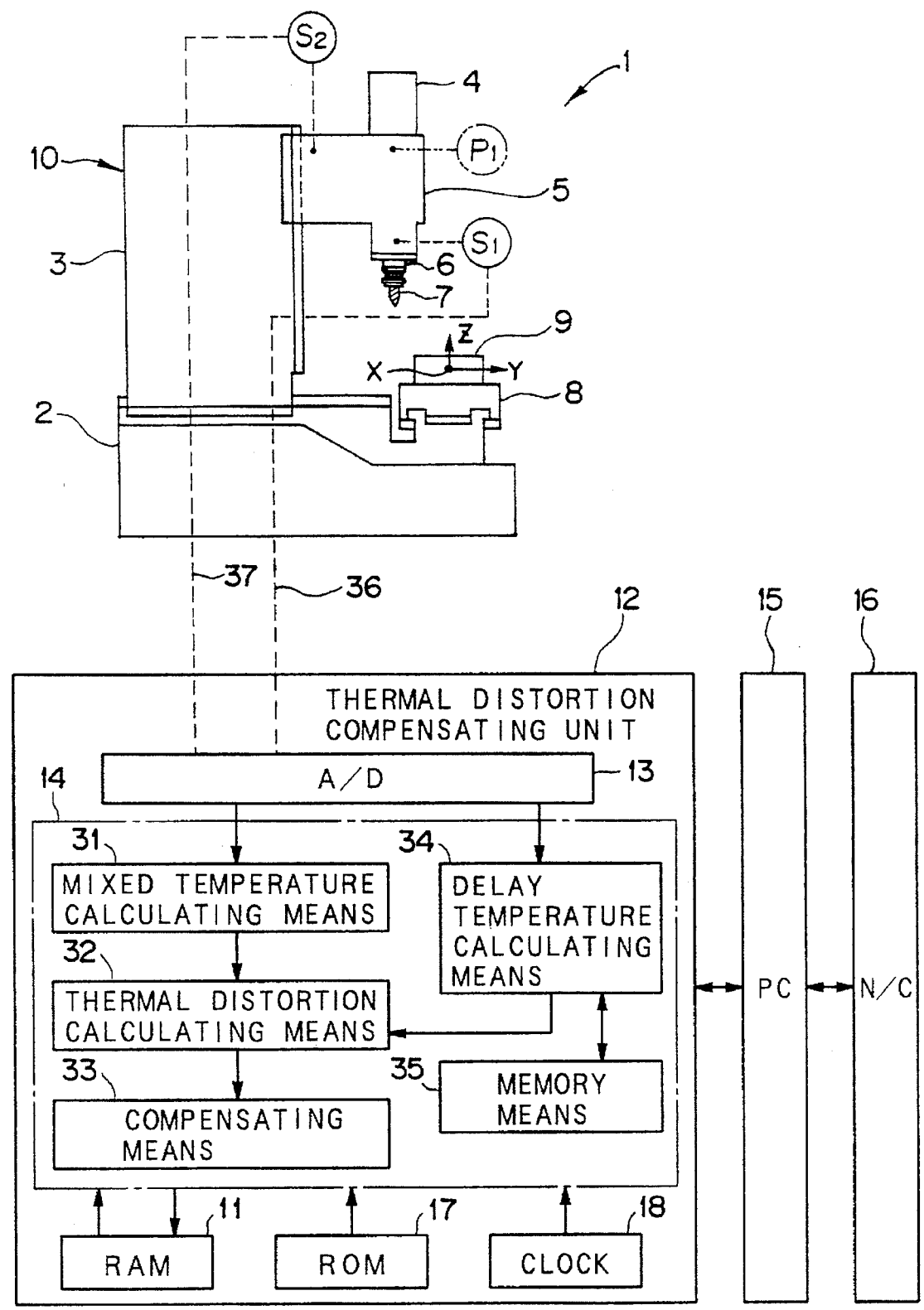
FIG. 1 is a block diagram showing a first embodiment of the present invention.

For instance, a numerically controlled (NC) machine tool shown in FIG. 1 is a vertical machining center (MC) 1 but may be NC machine tools other than MC. A column 3 is vertically provided on a bed 2. A main spindle head 5 is mounted movably in a Z axis direction on the column 3. The column 3 is movable in a Y axis direction on the bed 2.

A main spindle 6 is provided in the Z direction on the spindle head 5. A tool 7 is mounted at a spindle nose of the main spindle 6. The main spindle 6 is drivingly rotated by a main spindle motor 4 mounted on the spindle head 5. A workpiece 9 held on a table 8 provided on the bed 2 is cut by the tool 7. The table 8 is moved in an X axis direction on the bed 2.

Incidentally, the axial direction of the main spindle 6 is referred to by the Z axis, and the directions perpendicular to the Z axis for defining an orthogonal coordinate system are referred to by the X and Y axes, respectively.

A temperature detecting means for detecting a temperature change of a machine structure 10 is mounted on the MC 1. In the first embodiment, there are provided a nose temperature sensor $S_1$ for detecting a temperature of a nose position on the spindle nose side of the main spindle 6 of the spindle head 5 and a head temperature sensor $S_2$ disposed at any desired position away from the nose position for detecting a temperature of the spindle head 5. Any type ones may be used as the temperature detecting means, i.e., the temperature sensors $S_1$ and $S_2$. As the sensors, it is preferable to use thermistor temperature sensors which are stable against an external turbulence.

The nose temperature sensor $S_1$ immediately represents the temperature change with a small time constant since it is located close to the main spindle bearing of the main spindle 6 which is a main heat source. On the other hand, the head temperature sensor $S_2$ gradually represents the temperature change with a large time constant since it is located away from the main spindle bearing of the main spindle 6.

In the second embodiment, there are provided the above-described nose temperature sensor $S_1$ and a temperature sensor $S_3$ as a temperature detecting means for detecting a temperature of a position where the heat generation of the heat source influences the machine structure 10.

The principle of the thermal distortion compensation according to the present invention will now be described.

According to the invention, it is possible to effect the compensation for the thermal distortions in the respective directions of X, Y and Z axes. However, for instance, with respect to the X direction, since the column 3 and the spindle head 5 are symmetrical in configuration with respect to X axis, it is unnecessary to effect the compensation in the X axis direction. The Z axis direction out of the Y axis and Z axis will be mainly explained.

The calculation equation of the thermal distortion in the Z axis direction is given as follows:

$$\Delta Z = a \cdot (\Delta Z_1 + \Delta Z_2) \qquad (2)$$

where $\Delta Z$ is the thermal distortion in the Z axis direction, "a" is the overall compensation coefficient (the coefficient "a" is used for compensating for a difference between the result of the equation (2) and the actual precision), $\Delta Z_1$ is an immediate responding characteristic of the Z axis thermal distortion, and $\Delta Z_2$ is a lagging characteristic of the Z axis thermal distortion.

Namely, the equation (2) includes the immediate responding characteristic $\Delta Z_1$ which is used to immediately predict the thermal distortion from a temperature change, and the lagging characteristic $\Delta Z_2$ which represents the thermal distortion with a time lag from the temperature change. The above-described temperature change is calculated as a temperature difference obtained by subtracting the temperature detected by each sensor from a reference temperature.

As the reference temperature, a first output of the temperature sensor during the turn-on operation of the electric power source of the MC 1, an average output obtained by a plurality of the outputs, or an absolute reference such as 20° C., for example. The reference temperature for every temperature sensor is stored in a RAM 11.

By the way, in the case where the temperature change of the environment where the machine tool is installed is relatively slow, the thermal deformation of the overall machine tool due to the room temperature change is changed with a substantial similarity including the tool and the workpiece. Namely, the machining errors would not occur under such a slow room temperature change. Accordingly, the prediction of the thermal deformation which are obtained from the temperature change including the room temperature change is different from the actual thermal deformation.

Accordingly, in this case, every temperature detected by the temperature sensor which is separately provided to the bed or the like of the machine tool is adopted as the reference temperature. The difference obtained by subtracting the reference temperature from the output temperature from each temperature sensor is used as the temperature change. Thus, even if the room temperature is changed, it is possible to carry out the thermal distortion compensation with high precision.

Incidentally, in the invention, a calculation equation which is based only the immediate responding characteristic $\Delta Z_1$ as shown in the following equation (3) may be used. Also, another calculation equation which is based only the lagging characteristic $\Delta Z_2$ as shown in an equation (4) may be used.

$$\Delta Z = a \cdot \Delta Z_1 \qquad (3)$$

$$\Delta Z = a \cdot \Delta Z_2 \qquad (4)$$

The immediate responding characteristic $\Delta Z_1$ is given as follows:

$$\Delta Z_1 = b \cdot \Delta T_1 + c \cdot \Delta T_2 \qquad (5)$$

where $\Delta T_1$ [°C.] is the temperature change obtained by subtracting the reference temperature from the output of the temperature sensor $S_1$, $\Delta T_2$ [°C.] is the temperature change obtained by subtracting the reference temperature from the output of the temperature sensor $S_2$, b [±μm/°C.] is the internal compensation coefficient, and c [±μm/°C.] is the internal compensation coefficient.

The equation (5) used in the first embodiment is used for calculating the thermal distortion of the machine structure 10 by the outputs of the temperature sensors provided at the two places. The immediate responding characteristic $\Delta Z_1$ is calculated from the temperature change $\Delta T_1$ calculated from the temperature detected by the nose temperature sensor $S_1$ and the temperature change $\Delta T_2$ calculated from the temperature detected by the head temperature sensor $S_2$.

Incidentally, the calculation of the immediate responding characteristic $\Delta Z_1$ only needs at least two mount positions of the temperature sensors but the temperature sensors may be additionally used in response to the number of the heat sources. The position where the temperature sensors are mounted may be selected to the places other than the nose position and the head position if the influence of the heat sources is applied to the places.

On the other hand, an equation for calculating the lagging characteristic $\Delta Z_2$ is given as follows:

$$\Delta Z_2 = e \cdot Y_1 + f \cdot Y_2 \qquad (6)$$

where e [±μm/°C.] is the internal compensation coefficient, f [±μm/°C.] is the internal compensation coefficient, $Y_1$ [°C.] is the first delay temperature change, and $Y_2$ [°C.] is the second delay temperature change.

The equation (6) is used for calculating the thermal distortion of the machine structure 10 by the first and second delay temperature changes.

In the first embodiment, since the number of the delay temperature changes is one, the internal compensation coefficient f becomes zero. Then, the lagging characteristic $\Delta Z_2$ is calculated from the delay temperature change $Y_1$ calculated by predicting the delay to the temperature change $\Delta T_2$ of the temperature detected by the head temperature sensor $S_2$.

In the second embodiment, the number of the delay temperature changes is two. The lagging characteristic $\Delta Z_2$ is calculated from the first delay temperature change $Y_1$ calculated by predicting the delay to the temperature change $\Delta T_1$ of the temperature detected by the nose temperature sensor $S_1$ and the second delay temperature change $Y_2$ calculated by predicting the delay to the temperature change $\Delta T_2$ of the temperature detected by the column temperature sensor $S_3$.

Incidentally, the calculation of the lagging characteristic $\Delta Z_2$ only needs the one or two pieces of temperature information but the number of the pieces of information may be additionally used in response to the number of the heat sources.

FIG. 1 is a block diagram showing the first embodiment of the present invention.

As shown in FIG. 1, each output signal of each temperature sensor $S_1$, $S_2$ is inputted to an analog/digital (A/D) convertor 13 of a thermal distortion compensating unit 12 through each circuit 36 and 37, respectively. The inputted analog signal is converted into a digital signal therein. The digital signal from the A/D convertor 13 is fed into the calculation memory 14 where the thermal distortion is calculated.

The machining error is corrected by a compensating means 33 on the basis of the calculated thermal distortion. The output signal of the compensating means 33 is fed to a numerical control unit 16 through a programmable controller 15 and is fed back to a servo system to thereby carry out the positional compensation.

In other words, the compensating means 33 presents an output of the calculation result to an external offset means for giving an offset from the outside to a movement command of the numerical control unit 16. As a result, the original position of, for example, an orthogonal coordinate system is offset and the numerical control unit 16 controls a locus of the tool 7 of the MC 1.

It should be noted that the programmable controller 15 receives the command of the numerical control unit 16 to thereby supervise or control the operational sequence of the MC 1.

The detection values of each sensor $S_1$, $S_2$ are calculated in the calculation memory 14 through the A/D convertor 13, and are stored in memory addresses designated for each sensor $S_1$, $S_2$ within the RAM 11 in accordance with the commands. Temperature data which are obtained by the sampling operation of each sensor $S_1$, $S_2$ for every constant time are stored in the RAM 11. The temperature data are displayed on a display section of the numerical control unit 16.

The program, compensation coefficients and the like for calculating the thermal distortion according to the present invention are stored in a ROM 17. A clock 18 is an ordinary clock unit for determining the detection time of each sensor $S_1$, $S_2$.

The thermal distortion compensating unit 12 includes a mixed temperature calculating means 31 for calculating a mixed temperature change at a phantom position $P_1$ having substantially the same time constant as the time constant of the thermal distortion by using the temperature change of the temperatures detected by the temperature sensors $S_1$ and $S_2$, a thermal distortion calculating means 32 for calculating the immediate responding characteristic $\Delta Z_1$ (i.e., the thermal distortion) that is changed corresponding to the mixed temperature change calculated by the mixed temperature calculating means 31, and the compensating means 33 for correcting the machining error on the basis of the thermal distortion calculated by the thermal distortion calculating means 32.

Preferably, the thermal distortion compensating unit 12 of the first embodiment is further provided with a delay temperature calculating means 34 for calculating, by predicting the delay to the temperature change, the delay temperature change that appears with a delay due to the temperature change of the temperature detected by the temperature sensor $S_2$.

The thermal distortion calculating means 32 calculates the lagging characteristic $\Delta Z_2$ that changes in correspondence with the delay temperature change calculated by the delay temperature calculating means 34 and adds the lagging characteristic to the immediate responding characteristic $\Delta Z_1$. The compensating means 33 calculates for correcting the machining error on the basis of a total value, i.e., the total thermal distortion and produces an output of its result.

A compensation is given, in the case where the delay temperature calculation is interrupted, by a memory means 35 for simultaneously storing the final calculation result of the delay temperature calculating means 34 and the off-time of the electric power source of the machine tool until the next operation is again started.

The thermal distortion compensating method according to the present invention in the case where the immediate responding characteristic $\Delta Z_1$ is only considered is based upon the equation (3). It is preferable to use the thermal distortion method based upon the equation (2) by considering the lagging characteristic $\Delta Z_2$ to the immediate responding characteristic $\Delta Z_1$ since it is possible to effect the compensation with higher precision.

Figure 2:
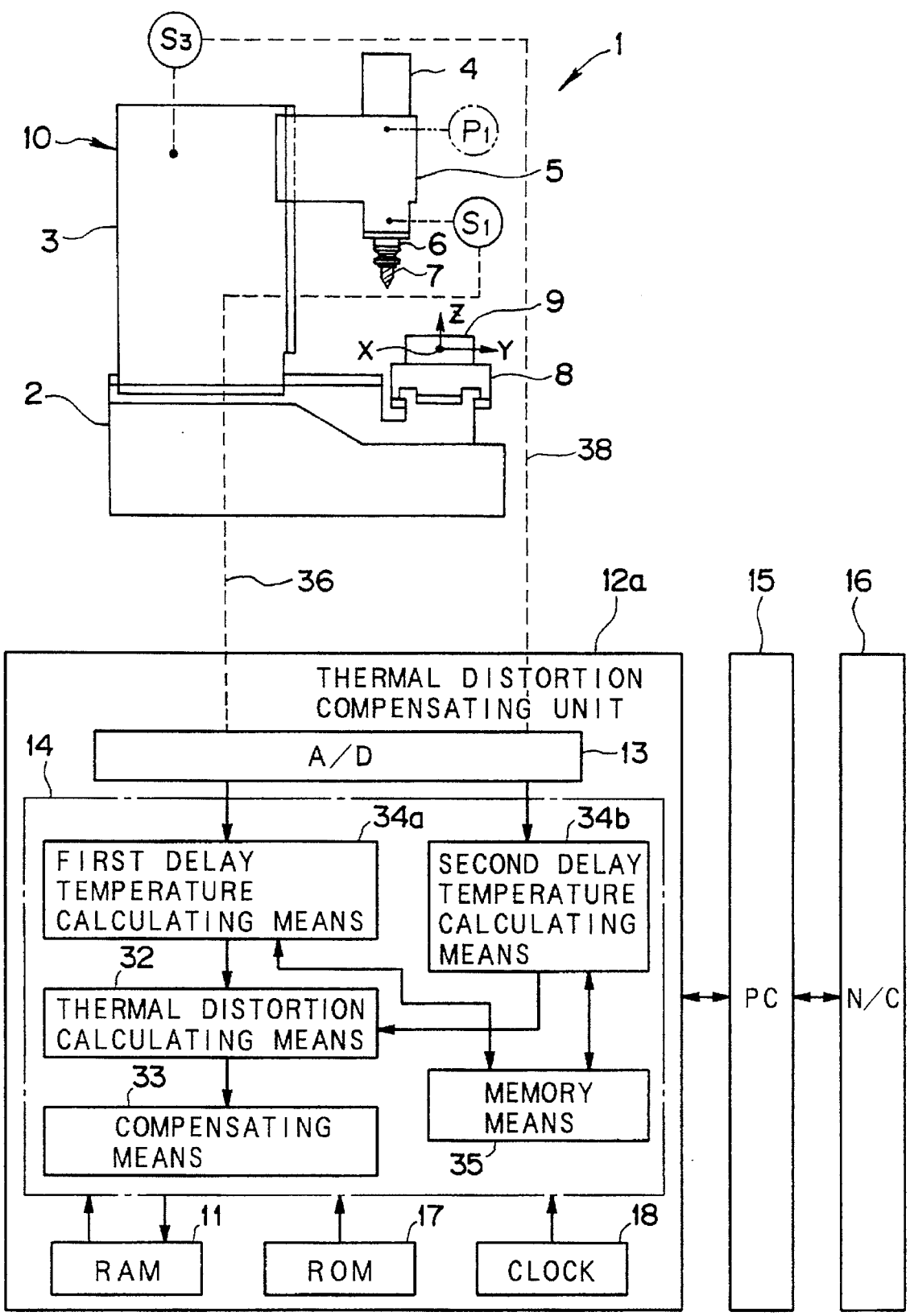
FIG. 2 is a block diagram showing a second embodiment of the invention.

FIG. 2 is a block diagram showing the second embodiment of the present invention. The thermal distortion compensating method in accordance with the second embodiment is based upon the method only based upon the equation (4) used in the case where the lagging characteristic $\Delta Z_2$ is only considered.

A thermal distortion compensating unit 12a according to the second embodiment includes a first delay temperature calculating means 34a for calculating a temperature change at a phantom position $P_1$ having substantially the same time constant as the time constant of the thermal distortion by predicting a time lag of the temperature change of the temperatures detected by the temperature sensor $S_1$, a thermal distortion calculating means 32 for calculating the lagging characteristic $\Delta Z_2$ that is changed corresponding to the first delay temperature change calculated by the first delay temperature calculating means 34a, and the compensating means 33 for correcting the machining error on the basis of the thermal distortion calculated by the thermal distortion calculating means 32.

Preferably, the thermal distortion compensating unit 12a is further provided with a second delay temperature calculating means 34b for calculating, by predicting the delay to the temperature change, the delay temperature change that appears with a delay due to the temperature change of the temperature detected by the temperature sensor $S_3$ provided at the place where the influence of the heat generation of the heat source is imparted slowly to the machine structure 10.

The thermal distortion calculating means 32 calculates the second lagging characteristic that changes in correspondence with the delay temperature change calculated by the second delay temperature calculating means 34a. The calculating means 32 adds the second lagging characteristic to the lagging characteristic $\Delta Z_2$. The compensating means calculates for correcting the machining error on the basis of the total value, i.e., the total thermal distortion and produces an output of its result.

In the second embodiment, it is possible to compensate for the thermal distortion only by the output of the single temperature sensor $S_1$. It is preferable to use the thermal distortion compensating method in view of the output of the temperature sensor $S_3$ that is separately provided because this method ensures the compensation with the higher precision.

The same explanation to the corresponding function parts that are the same as those of the first embodiment will be omitted with respect to the second embodiment.

The specific steps for the first and second embodiments will be explained with reference to FIGS. 3 to 13.

Figure 3:
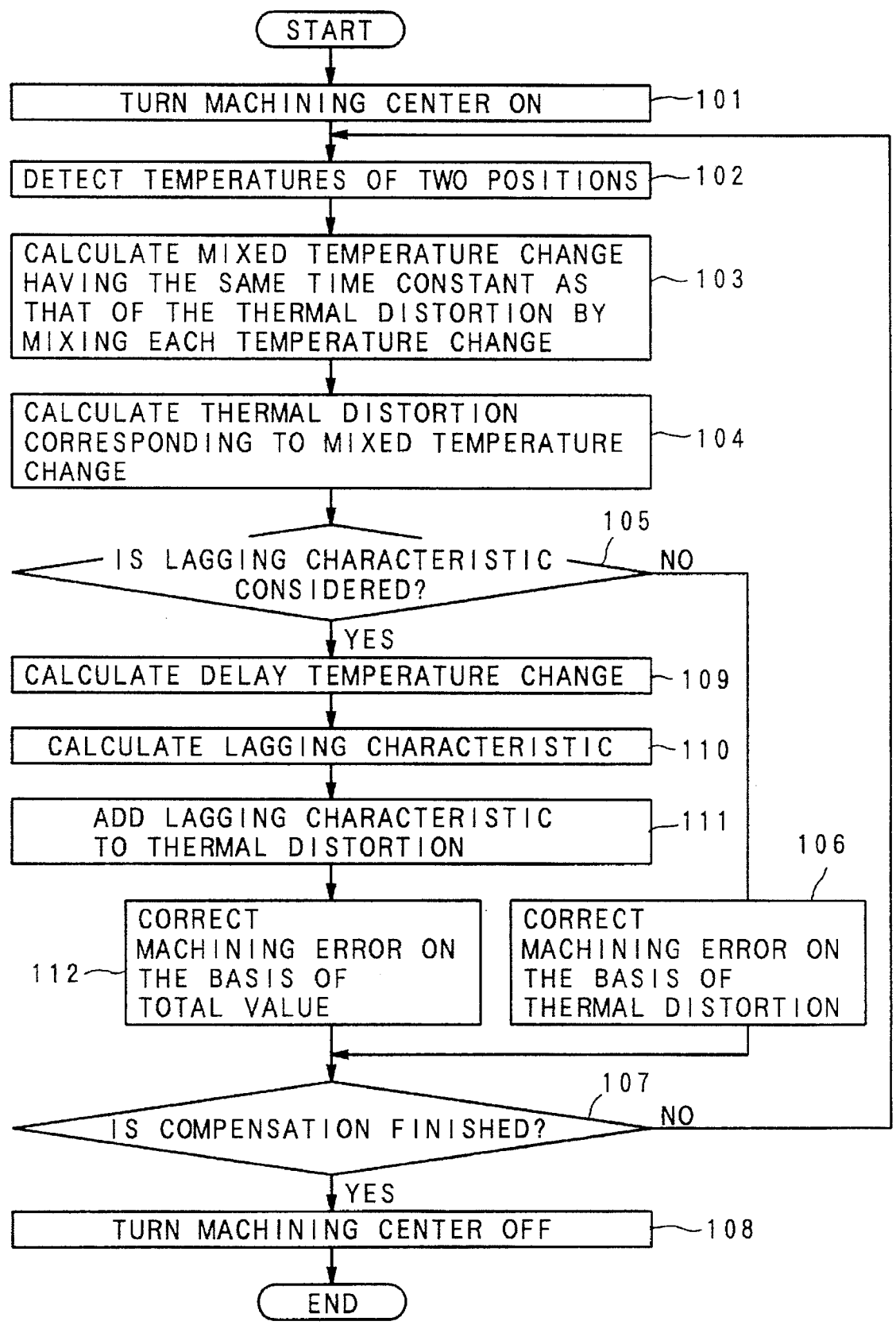
FIG. 3 is a flow chart showing the operation of the first embodiment.
Figure 4:
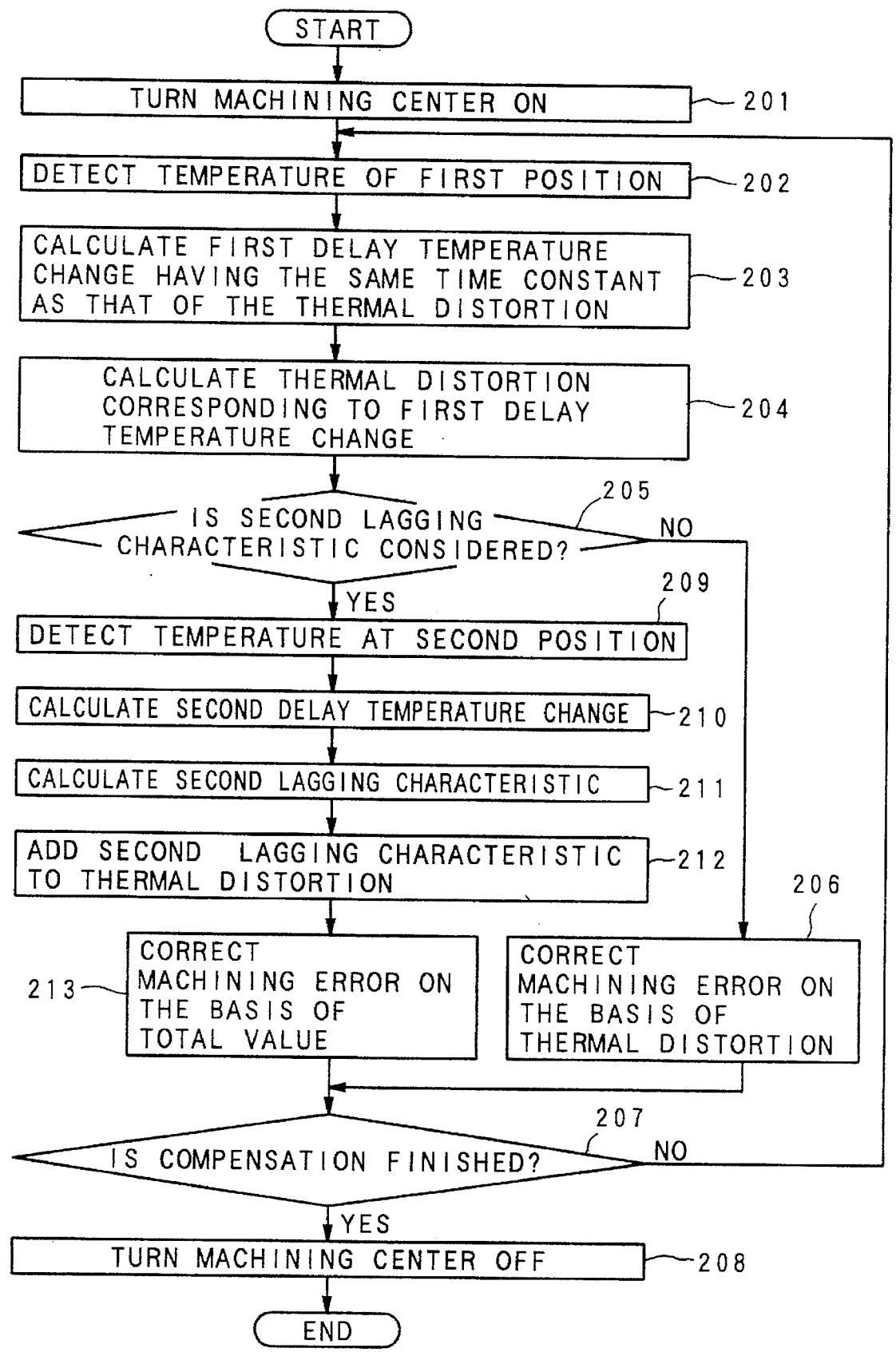
FIG. 4 is a flow chart showing the operation of the second embodiment.
Figure 5:
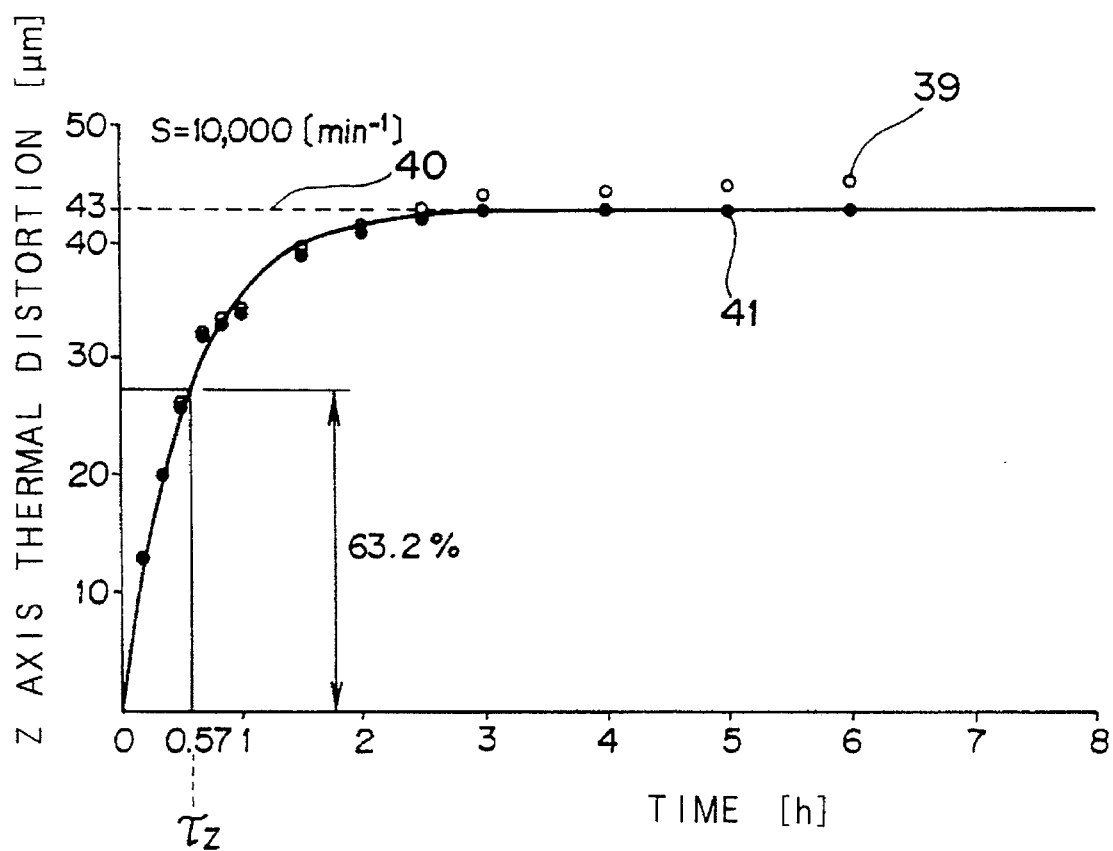
FIG. 5 is a graph showing a change of time in a Z axis thermal distortion.
Figure 6:
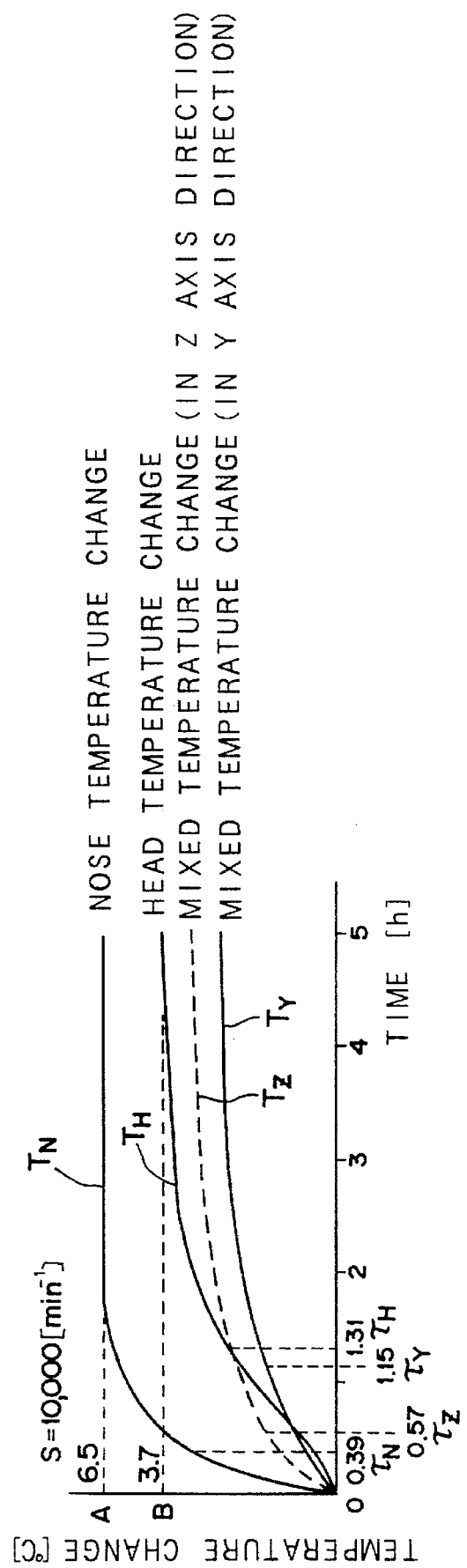
FIG. 6 is a graph showing the temperature change of the temperature detected by the nose position and the head position and the mixed temperature change thereof.

FIG. 3 is a flow chart showing an operation of the first embodiment, FIG. 4 is a flow chart showing an operation of the second embodiment, FIG. 5 is a graph showing a function of time of the Z axis thermal distortion, and FIG. 6 is a graph showing the temperature change of the temperature detected by the nose position and the head position and the mixed temperature change thereof.

Figure 7:
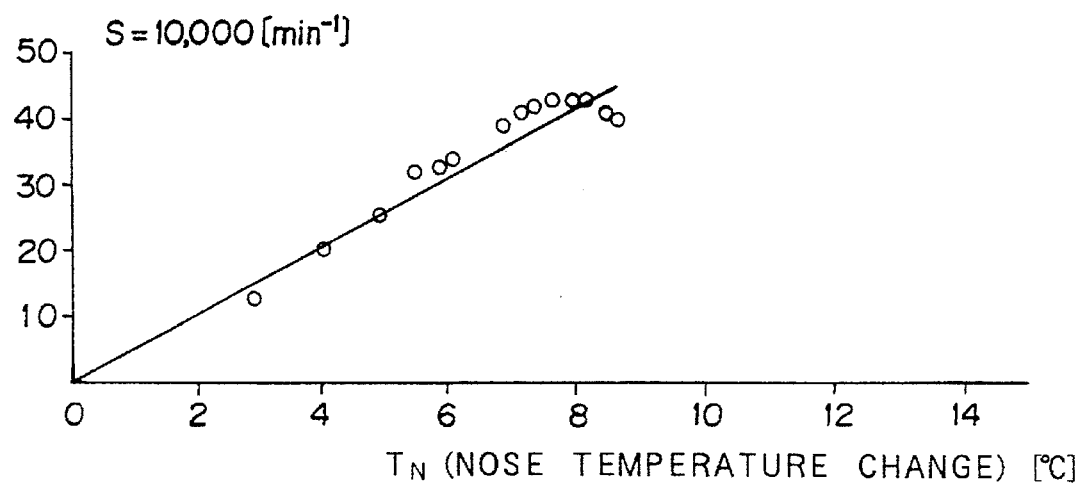
FIG. 7 is a graph showing a relationship between the nose temperature change and the Z axis thermal distortion.
Figure 8:
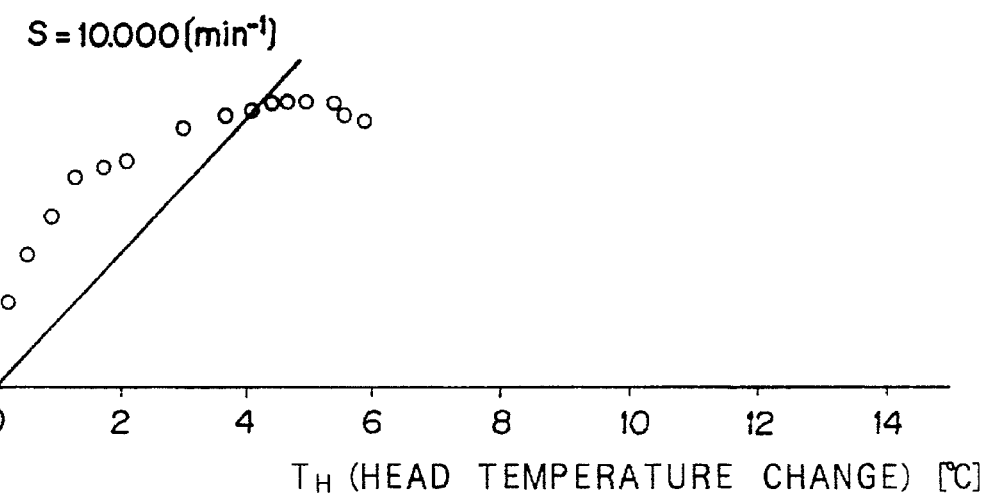
FIG. 8 is a graph showing a relationship between the head temperature change and the Z axis thermal distortion.
Figure 9:
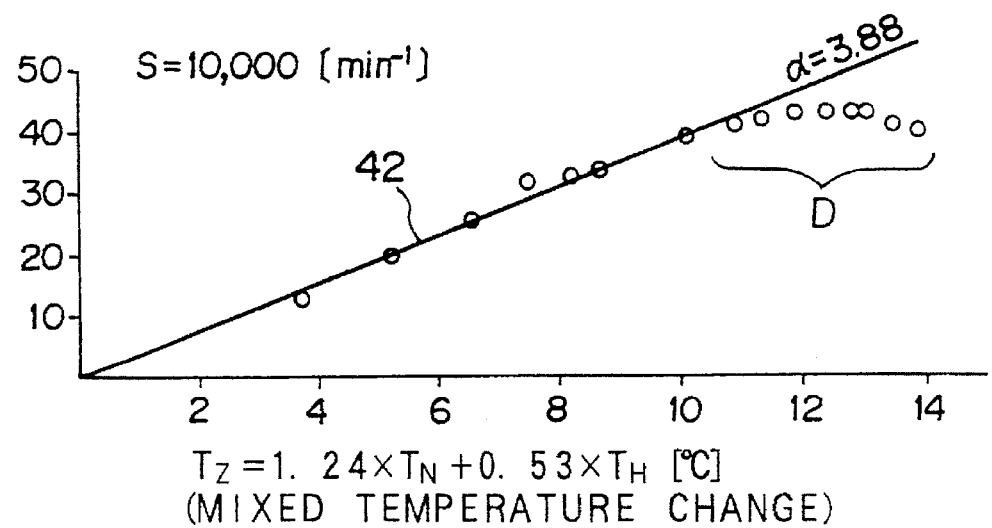
FIG. 9 is a graph showing the Z axis thermal distortion relative to the mixed temperature change.

FIG. 7 is a graph showing a relationship between the nose temperature change and the Z axis thermal distortion, FIG. 8 is a graph showing a relationship between the head temperature change and the Z axis thermal distortion, and FIG. 9 is a graph showing the Z axis thermal distortion relative to the mixed temperature change.

Figure 10:
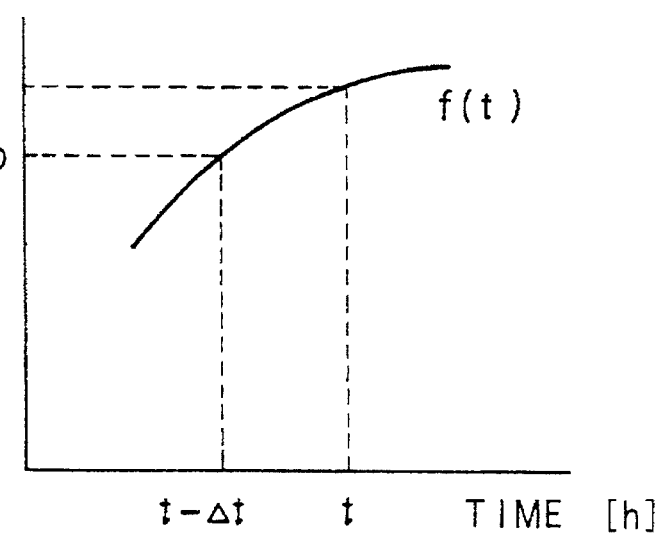
FIG. 10 is a graph illustrating the steps for calculating the delay temperature change.
Figure 11:
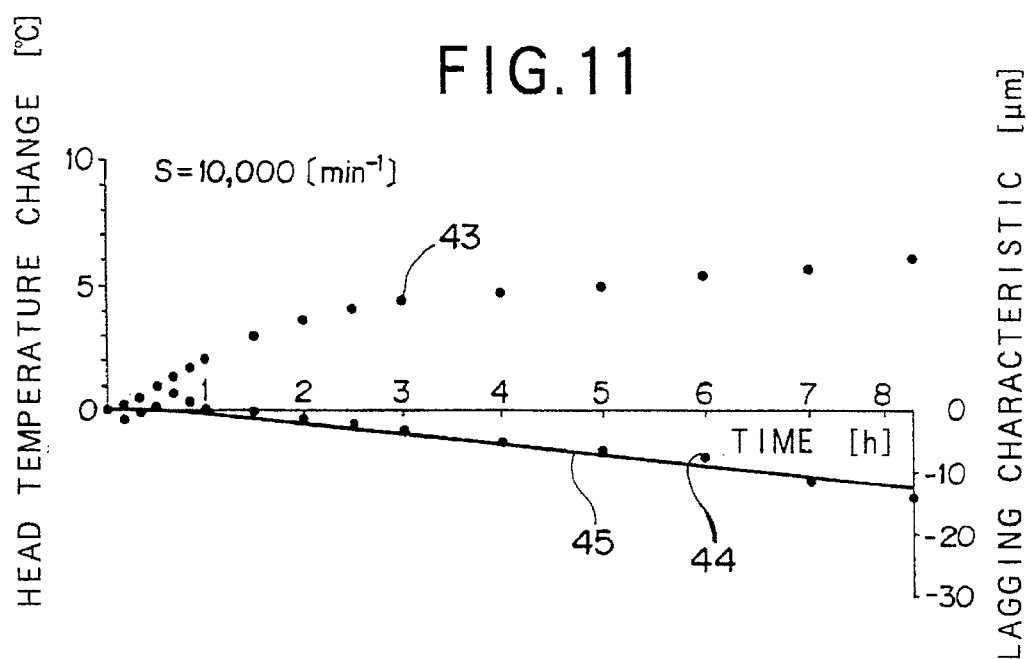
FIG. 11 is a graph showing the steps for calculating the lagging characteristic from the temperature change.
Figure 12:
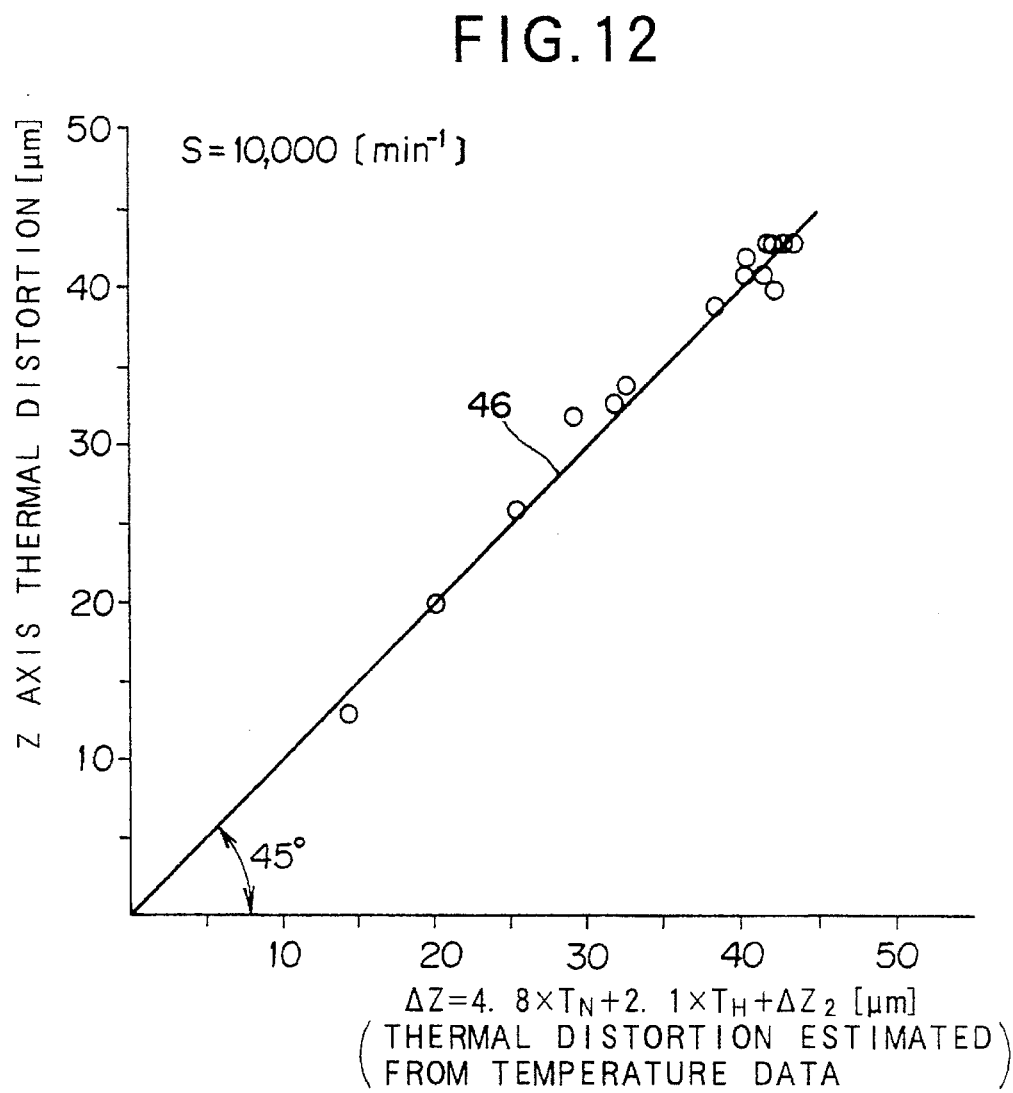
FIG. 12 is a graph showing a relationship between the Z axis thermal distortion that has been calculated and the Z axis thermal distortion that has been actually measured.
Figure 13:
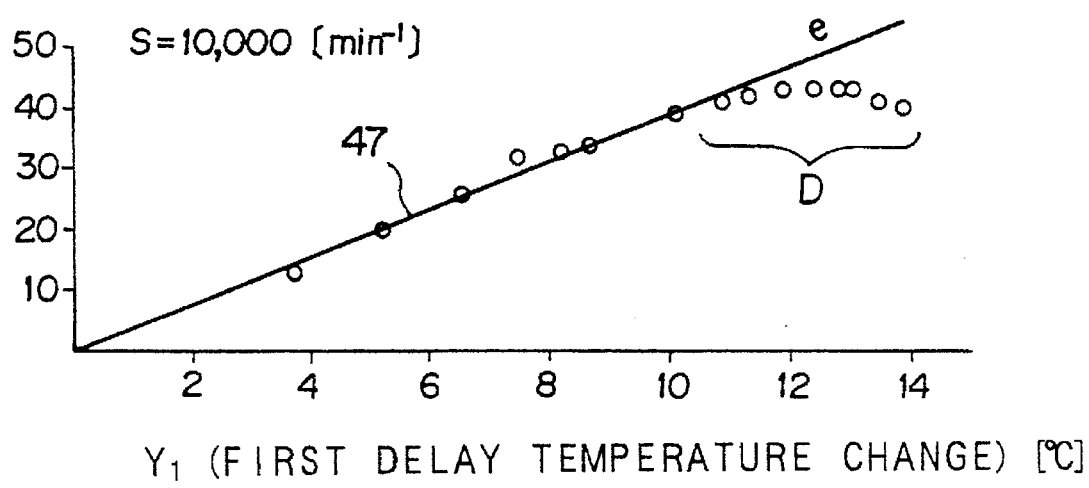
FIG. 13 is a graph showing the Z axis thermal distortion relative to the delay temperature change.

FIG. 10 is a graph illustrating the steps for calculating the delay temperature change, FIG. 11 is a graph showing the steps for calculating the lagging characteristic from the temperature change, FIG. 12 is a graph showing a relationship between the Z axis thermal distortion that has been calculated and the Z axis thermal distortion that has been actually measured, and FIG. 13 is a graph showing the Z axis thermal distortion relative to the delay temperature change.

In the first embodiment, first of all, the time constant of the thermal distortion in, for example, the Z axis direction in the MC 1 is calculated in advance on the basis of the data shown in FIG. 5. In FIG. 5, the abscissa axis represents the time and the ordinate axis represents the thermal distortion in the Z axis direction. In the case where the time constant of the thermal distortion in the Z direction is calculated, the MC 1 is continuously operated at a number of revolutions S (for example, S=10,000 [min$^{-1}$]) of the main spindle. Then, the thermal distortion in the Z axis direction is actually measured as time sequence data 39 at the distal end portion of the main spindle 6 or at a desired position of a test bar that has been temporarily mounted at the distal end portion of the main spindle 6.

In the case where the main spindle is slanted due to the heat generation, it is preferable that the thermal distortion is measured at, for example, the distal end portion and proximal end portion of the test bar.

Since the data 39 (indicated by encircled points in FIG. 5) in general includes influences of the room temperature change, room temperature compensation data 41 (indicated by solid circle points in FIG. 5), having a saturated value 40 (for example, 43[μm]), that has been corrected in respect of the influences of the room temperature are calculated.

The "time constant" means the time "which is required so that the output reaches 63.2% of the saturated value when stepped inputs are effected in a linear first order delay system". Accordingly, a stepped input response function of a first order delay element in a minimum square method is caused to correspond to the room temperature compensation data 41 to thereby obtain a thermal distortion time constant $\tau_z$ (for example, $\tau_z$ =0.57 [h]) in the Z axis direction.

Further, the time constant of each temperature change is calculated on the data of the temperature change of the temperatures detected by the nose temperature sensor $S_1$ and the head temperature sensor $S_2$ at the same time with the moment when the thermal distortion of the machine tool is detected in the Z axis direction. The steps for calculating the time constant are the same as those used for calculating the above-described thermal distortion in the Z axis direction.

The abscissa of FIG. 6 represents the time and the ordinate thereof represents the temperature change. As shown in FIG. 6, since the nose temperature change $T_N$ which is located close to the heat source quickly reaches the saturated temperature change "A" (A=6.5 [°C.]), a time constant $\tau_N$ of the nose temperature is small at 0.39 [h].

On the other hand, a head temperature change $T_H$ which is located far from the heat source is changed in temperature with a time lag. Accordingly, since it takes a long time to reach a saturated temperature change "B" (B=3.7 [°C.]), a time constant $\tau_H$ of the head temperature is large at 1.31 [h].

As shown in FIGS. 1 and 3, the cutting operation of the workpiece 9 with the tool 7 is started by driving the MC 1 (step 101). The temperatures at the nose position and the head position are detected, respectively (step 102), and the detected results are inputted into the mixed temperature calculating means 31.

Subsequently, the nose temperature change $T_N$ and the head temperature change $T_H$ are mixed through the "mix method". A phantom temperature change $T_z$ having the same time constant as the time constant $\tau_z$ ($\tau_z$ =0.57 [h]) of the thermal distortion data in the Z axis direction indicated in FIG. 5 is calculated.

Mixture ratios $M_{NZ}$ and $M_{HZ}$ of temperatures of the nose temperature change $T_N$ and the head temperature change $T_H$ are calculated by using following equations respectively when the mixed temperature is obtained. The following equations represent an example of the mixture method and any other type methods may be used. Since the temperature mixture ratio is the inherent value for every machine tool and the value thereof is kept unchanged even if the operational conditions such as the main spindle rotation speed are changed. Accordingly, it is only necessary to carry out a work to calculate the temperature mixture ratio once.

$$\begin{aligned}
\text{Nose Temperature Mixture Ratio } M_{NZ} &= (\tau_H - \tau_Z)/(\tau_H - \tau_N) \cdot (k/A) \quad (7)\\
&= (1.31 - 0.57) \div (1.31 - 0.39) \times (10/6.5)\\
&= 1.24
\end{aligned}$$

$$\begin{aligned}
\text{Head Temperature Mixture Ratio } M_{HZ} &= (\tau_Z - \tau_N)/(\tau_H - \tau_N) \cdot (k/B) \quad (8)\\
&= (0.57 - 0.39) \div (1.31 - 0.39) \times (10/3.7)\\
&= 0.53
\end{aligned}$$

where k is any desired coefficient (assume that k=10).

Incidentally, if the time constant $\tau_Y$ ($\tau_Y = 1.15$ [h]) of the thermal distortion in the Y axis direction is calculated in the same steps based upon FIG. 5, the mixed temperature change $T_Y$ in the Y axis direction is calculated as shown in FIG. 6.

In this case, the respective temperature mixture ratios $M_{NY}$ and $M_{HY}$ of the nose temperature change $T_N$ and the head temperature change $T_H$ are calculated by the following equations:

Nose temperature mixture ratios $M_{NY}$
$$= (\tau_H - \tau_Y)/(\tau_H - \tau_N) \cdot (k/A) \tag{9}$$
$$= (1.31 - 1.15) \div (1.31 - 0.39) \times (10/6.5)$$
$$= 0.27$$

Head temperature mixture ratios $M_{HY}$
$$= (\tau_Y - \tau_N)/(\tau_H - \tau_N) \cdot (k/B) \tag{10}$$
$$= (1.15 - 0.39) \div (1.31 - 0.39) \times (10/3.7)$$
$$= 2.23$$

where k is any desired coefficient (assume that k=10).

The mixed temperature calculating means 31 calculates the mixed temperature change $T_Z$ by the following equation on the basis of the nose temperature change $T_N$, the head temperature change $T_H$, and the temperature mixture ratios $M_{NZ}$ and $M_{HZ}$ calculated by the equations (7) and (8) (step 103). The equation (11) is the temperature conversion equation, and the ratios $M_{NZ}$ and $M_{HZ}$ are the coefficients of the equation (11).

$$T_Z = M_{NZ} \cdot T_N + M_{HZ} \cdot T_H = 1.24 \times T_N + 0.53 \times T_H \tag{11}$$

The abscissa axis of FIG. 7 represents the nose temperature change $T_N$ and the abscissa axis of FIG. 8 represents the head temperature change $T_H$. The ordinate axes of FIGS. 7 and 8 represent the thermal distortions in the Z axis direction. As shown, there is no corresponding relationship, such as a proportion, between the respective temperature changes $T_N$ and $T_H$ and the Z axis thermal distortions.

In contrast, as shown in FIG. 9, the mixed temperature $T_Z$ and the Z axis thermal distortion have a region having a linear correlation represented by a straight line 42 having a slant $\alpha$ ($\alpha = 3.88$). The slant a is the proportional constant and is used when the immediate responding characteristic $\Delta Z_1$ is calculated from the mixed temperature change $T_Z$. After all, the following equation is given.

$$\Delta Z_1 = \alpha \cdot T_Z \tag{12}$$

The thermal distortion calculating means 32 calculates the immediate responding characteristic $\Delta Z_1$ that changes in correspondence with the mixed temperature change $T_Z$ by using the equation (12) (step 104).

Subsequently, it is judged whether or not the lagging characteristic $\Delta Z_2$ should be considered (step 105). In the case where it is not considered, the compensating means 33 calculates to correct the machining error on the basis of the result calculated in the thermal distortion calculating means 32. Specifically, for example, the original position of the orthogonal coordinate system is offset (step 106).

Thereafter, it is judged whether or not the compensation should be finished (step 107). In the case where it is terminated, the MC 1 is stopped (step 108). All the steps have been finished. If the compensation is not finished, the operation returns back to the step 102.

On the other hand, in the case where the lagging characteristic $\Delta Z_2$ should be considered in the judgement in the step 105, the temperature at the head position detected by the head temperature sensor $S_2$ is inputted into the delay temperature calculating means 34.

Since the column 3 and the like have large masses and are remote from the main spindle 6 which is the main heat source, the temperature change appears with further delay to the head position at which the temperature change is also delayed. The delay temperature change gives the error to the linear correlation between the mixed temperature change $T_Z$ and the Z axis thermal distortion in the region D where a long time has lapsed in, for example, FIG. 9.

In a method for calculating the delay temperature change, i.e., a "dummy" method, the heat capacity C of the dummy is predictively set in view of the behavior of the delay temperature change Y which further appears with time delay to the head temperature change $T_H$.

More specifically, the following approximation solution of the following differential equation (13) is used:

$$C \cdot dY/dt + Y = T_H \tag{13}$$

The abscissa axis of FIG. 10 represents the time and the ordinate axis represents the delay temperature change. From FIG. 10, the following equation is given:

$$Y = Y_O + (dY_O/dt + dY/dt)/2 \cdot \Delta t \tag{14}$$

From the equation (13), dY/dt and $dY_O$/dt are calculated and are substituted into the equation (14), and a formula for calculating the delay temperature change Y is given by the following equation (15). This equation is a temperature conversion formula and C corresponds to its coefficient. The delay temperature change calculated by the equation (15) is a phantom temperature change and is of a kind of the new temperature change in the same manner as the mixed temperature change in accordance with the equation (11).

$$Y = [T_{HO} + T_H + (C/\Delta t) \cdot Y_O - Y_O]/[(C/\Delta t) + 1] \tag{15}$$

where $\Delta t$ is the calculation interval, $T_H$ is the head temperature change input, $T_{HO}$ is the previous head temperature change input, Y is the delay temperature change output, $Y_O$ is the previous delay temperature change output, and C is the heat capacity of the dummy.

Incidentally, since the unit of the delay temperature change output Y is [°C.], in order to calculate the lagging characteristic $\Delta Z_2$, an internal compensation coefficient e that means a conversion coefficient between the temperature and the thermal distortion is used.

$$\Delta Z_2 = e \cdot Y \tag{16}$$

The abscissa axis of FIG. 11 represents the time. The ordinate axis upward from zero on the left side represents the head temperature change, and the ordinate axis downward from zero on the right side represents the lagging characteristic. In FIG. 11, there are shown time basis data 43 of the head temperature change, errors 44 obtained by subtracting the values on the ordinate axis of the straight line 42 from the Z axis thermal distortions in FIG. 9, and the calculation result 45 obtained through the equations (15) and (16) by using the time basis data 43 of the head temperature change. The errors 44 and the above-described calculation results 45 correspond the actual data and the calculated data of the lagging characteristic $\Delta Z_2$, respectively.

Namely, the dummy heat capacity C included in the equation (15) and the internal compensation coefficient e of the equation (16) are suitably selected so that it is possible to approach the calculation data to the actual data to thereby determine the optimum values therefor, respectively. The values of the heat capacity C and the coefficient e to be determined here are intrinsic to every machine tool. Since the values are kept unchanged even if the operational conditions such as a rotation speed of the main spindle are changed, this work should be done once.

For example, if the lagging characteristic $\Delta Z_2$ is calculated by repetitive calculations on the basis of the time basis data 43 of the above-described head temperature change, it is possible to obtain the results shown in Table 1, below, with the heat capacity C (C=900) and the coefficient e (e=−4). The values of the lagging characteristics $\Delta Z_2$ shown in Table 1 are the lagging characteristics of the column 3 and the like and correspond to the errors in the ordinate axis direction between the Z axis thermal distortions and the straight line 42 in FIG. 9.

| Time [min.] | Lagging characteristic $\Delta z_2$ [μm] | Time [min.] | Lagging characteristic $\Delta z_2$ [μm] |
|---|---|---|---|
| 10 | 0 | 150 | −3 |
| 20 | 0 | 180 | −4 |
| 30 | 0 | 240 | −6 |
| 40 | 0 | 300 | −7 |
| 50 | 0 | 360 | −9 |
| 60 | 0 | 420 | −11 |
| 90 | −1 | 480 | −12 |
| 120 | −2 | — | — |

The delay temperature calculating means 34 calculates the delay temperature change Y corresponding to the head temperature change $T_H$ by using the equation (15) in which the dummy heat capacity C is determined (step 109). Subsequently, the delay temperature change Y is substituted in the equation (16) in which the internal compensation coefficient e is determined, so that the lagging characteristic $\Delta Z_2$ is obtained (step 110).

In the thermal distortion calculating means 32 that has calculated the immediate responding characteristic $\Delta Z_1$ by using the equation (12), the thus calculated lagging characteristic $\Delta Z_2$ is added to the immediate responding characteristic $\Delta Z_1$ to thereby calculate the Z axis thermal distortion $\Delta Z$ (step 111).

In FIG. 12, the ordinate axis represents the Z axis thermal distortions actually measured in the same manner as shown in FIG. 5 and the abscissa axis represents the Z axis thermal distortions $\Delta Z$ estimated up to the step 111 by using the temperature data detected by the temperature sensors $S_1$ and $S_2$. In this calculation of the thermal distortion $\Delta Z$, the following equation which is obtained by developing the immediate responding characteristic $\Delta Z_1$ with the equation (11) and the equation (12) assuming that the overall compensation coefficient "a" of the equation (2) as 1 is given:

$$\Delta Z=4.8 \times T_N+2.1 \times T_H+\Delta Z_2 \tag{17}$$

In the equation (17), the coefficient of the item of the nose temperature change $T_N$ and the coefficient of the head temperature change $T_H$ correspond to the internal compensation coefficients b and c of the former equation (5), respectively, and are calculated by the following equation. These coefficient values typically represent the thermal growth of the machine tool in the case where the immediate responding characteristic is calculated by using the temperatures detected from the machine structure 10.

$$b=\alpha \cdot M_{NZ}=3.88 \times 1.24=4.8 \tag{18}$$

$$c=\alpha \cdot M_{HZ} \times 3.88 \times 0.53=2.1 \tag{19}$$

Also, the results shown in Table 1 are used for the lagging characteristic $\Delta Z_2$ of the equation (17).

In FIG. 12, the value of the Z axis thermal distortion, measured actually, in the ordinate and the value of the Z axis thermal distortion $\Delta Z$ obtained by the equation (17) are substantially identical with each other on the straight line 46 having a gradient of 45°. This means that both values are the same. Accordingly, it is possible to accurately predict the Z axis thermal distortion with sufficient high precision by the calculation using the relatively small amount of the temperature data detected from the machine structure 10.

As described above, by correcting the machining error by the compensating means 33 on the basis of the Z axis thermal distortion $\Delta Z$ calculated in the step 111, the compensation for the thermal distortion is effected (step 112) so that the workpiece 9 may be cut with high precision.

Thereafter, in the case where it is judged whether or not the compensation is finished (step 107) and the compensation should be finished, the MC 1 is stopped (step 108) and all the steps are finished. If the compensation is not finished, the operation is returned back to the step 102.

The steps of the second embodiment will now be described. Incidentally, it is unnecessary to calculate the thermal distortion or the time constant of the temperature change in advance in the second embodiment.

As shown in FIGS. 2 and 4, the MC 1 is actuated and the cutting operation of the workpiece 9 is started by the tool 7 (step 201). The temperature of a first place, for example, the nose position is detected (step 202). The detected signal is fed into the first delay temperature calculating means 34a.

Subsequently, in the "dummy" method, the heat capacity $C_1$ of the dummy is predictively set and the behavior of the first delay temperature change $Y_1$ is calculated. The first delay temperature change $Y_1$ has the same time constant as the time constant of the Z axis thermal distortion which appears with time delay to the nose temperature change $T_N$.

If the development is carried out in the same manner as in the foregoing equations (13) and (14), an equation for calculating the first delay temperature change $Y_1$ is given as follows:

$$Y_1=[T_{NO}+T_N+(C_1/\Delta t) \cdot Y_{10}-Y_{10}]/[(C_1/\Delta t)+1] \tag{20}$$

where $\Delta t$ is the calculation interval, $T_N$ is the nose temperature change input, $T_{NO}$ is the previous nose temperature change input, $Y_1$ is the first delay temperature change output, $Y_{10}$ is the previous delay temperature change output, and $C_1$ is the dummy heat capacity.

As shown in FIG. 13, the Z axis thermal distortion and the first delay temperature change $Y_1$ have a region having the linear correlation represented by the straight line 47 having the slant e. The slant e is the proportional constant for calculating the Z axis thermal distortion corresponding to the first delay temperature change $Y_1$. The Z axis thermal distortion to be calculated here corresponds to the first item of the foregoing equation (6).

The dummy heat capacity $C_1$ and the internal compensation coefficient e are suitably selected so that the repetitive calculation result of the first item of the equation (6) is coincident with the time basis data of the Z axis thermal distortion shown in FIG. 5. The values of the heat capacity $C_1$ and the coefficient e to be determined here are intrinsic to every machine tool. Since the values are kept unchanged, this work should be done once.

The first delay temperature change $Y_1$ corresponding to the nose temperature change $T_N$ is calculated in the first delay temperature calculating means 34a by using the equation (20) in which the dummy heat capacity $C_1$ is determined (step 203).

The thermal distortion calculating means 32 calculates the first lagging characteristic that is obtained by substituting the delay temperature change $Y_1$ into the first item of the equation (6) in which the internal compensation coefficient e is determined (step 204).

Subsequently, it is judged whether or not the second lagging characteristic should be considered (step 205). In the case where it is not considered, the compensating means 33 calculates to correct the machining error on the basis of the result calculated by the thermal distortion calculating means 32 (step 206).

Thereafter, it is judged whether or not the compensation should be finished (step 207). In the case where it is terminated, the MC 1 is stopped (step 208). All the steps have been finished. If the compensation is not finished, the operation returns back to the step 202.

On the other hand, in the case where the second lagging characteristic should be considered in the judgement in the step 205, the temperature change $T_C$ of the second position, for example, the column position detected (step 209) by the temperature sensor $S_3$ is inputted into the second delay temperature calculating means 34b.

The temperature change $T_C$ that appears in the column position would give an error to the linear correlation between the first delay temperature change $Y_1$ and the Z axis thermal distortion in the region D where a long time has been passed in, for example, FIG. 13.

In the "dummy" method, the dummy heat capacity $C_2$ is predictively set and the behavior of the second delay temperature change $Y_2$ which is obtained from the column temperature change $T_C$ is calculated.

An equation for calculating the second delay temperature change $Y_2$ is given as follows:

$$Y_2 = [T_{CO} + T_C + (C_2/\Delta t) \cdot Y_{20} - Y_{20}]/[(C_2/\Delta t) + 1] \quad (21)$$

where $\Delta t$ is the calculation interval, $T_C$ is the column temperature change input, $T_{CO}$ is the previous column temperature change input, $Y_2$ is the second delay temperature change output, $Y_{20}$ is the previous second delay temperature change output, and $C_2$ is the dummy heat capacity.

Incidentally, the Z axis thermal distortion corresponding to the second delay temperature change $Y_2$ corresponds to the second item of the foregoing equation (6) including the conversion coefficient f between the temperature and the thermal distortion.

The dummy heat capacity $C_2$ and the coefficient f are suitably selected so that the repetitive calculation result of the second item of the equation (6) is coincident with the error that has been obtained by subtracting the straight line 47 from the Z axis thermal distortion shown in FIG. 13. The values of the heat capacity $C_2$ and the coefficient f to be determined here are intrinsic to every machine tool. Since the values are kept unchanged, this work should be done once.

The second delay temperature change $Y_2$ corresponding to the column temperature change $T_C$ is calculated in the second delay temperature calculating means 34b by using the equation (21) in which the dummy heat capacity $C_2$ is determined (step 210). Subsequently, the second delay temperature change $Y_2$ is substituted into the second item of the equation (6) in which the internal compensation coefficient f is determined to thereby calculate the second lagging characteristic (step 211).

The thermal distortion calculating means 32 that has calculated the first lagging characteristic corresponding to the first item of the foregoing equation (6) calculates the Z axis thermal distortion $\Delta Z_2$ by adding the thus calculated second lagging characteristic (step 212).

The machining error is corrected by the compensating means 33 on the basis of the Z axis thermal distortion $\Delta Z_2$ calculated in the step 212 so that the compensation for the thermal distortion is effected (step 213) and the workpiece 9 may be machined with high precision.

Thereafter, it is judged whether or not the compensation should be finished (step 207). In the case where it is terminated, the MC 1 is stopped (step 208). All the steps have been finished. If the compensation is not finished, the operation returns back to the step 202.

FIGS. 14 to 17 show the actually measured data in the case where the MC 1 was actually operated.

Figure 14:
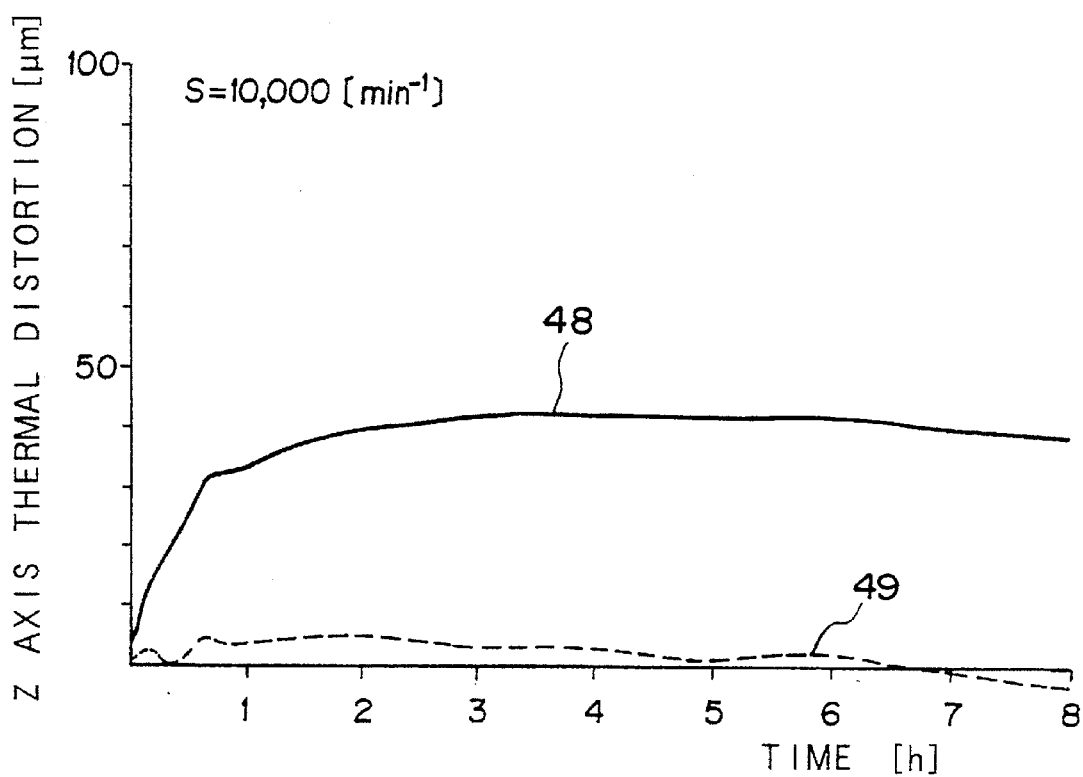
FIG. 14 is a graph showing the actually measured data of the Z axis thermal distortion.
Figure 15:
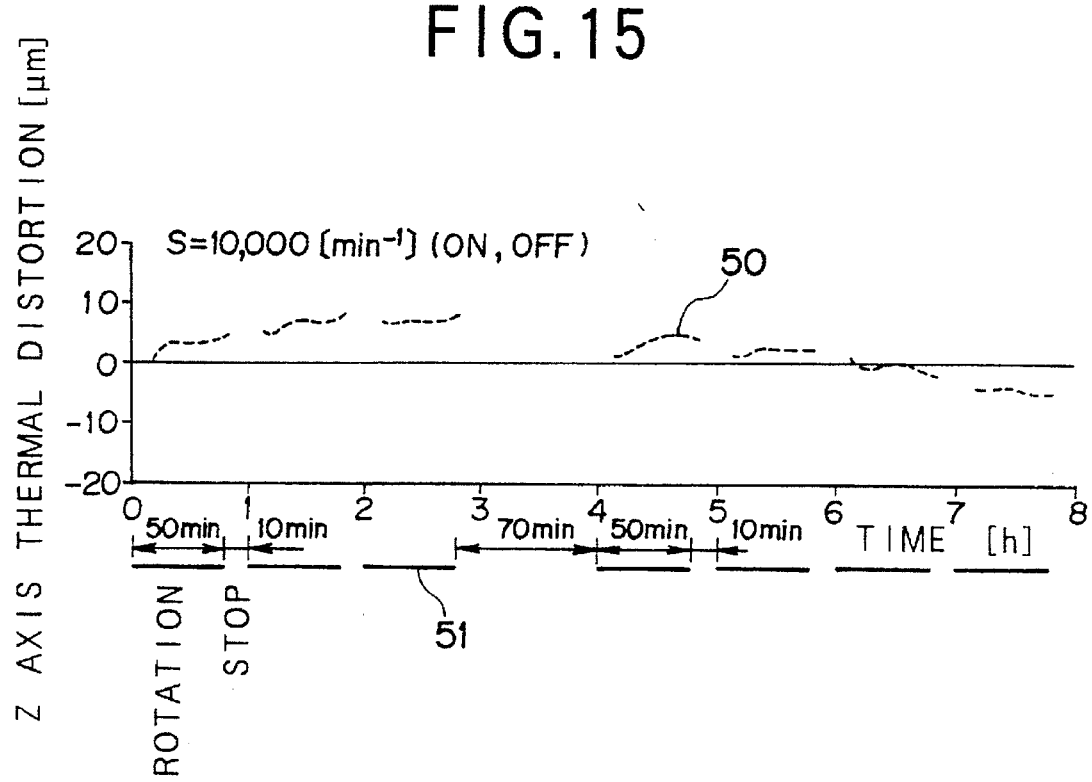
FIG. 15 is a graph showing another actually measured data of the Z axis thermal distortion.
Figure 16:
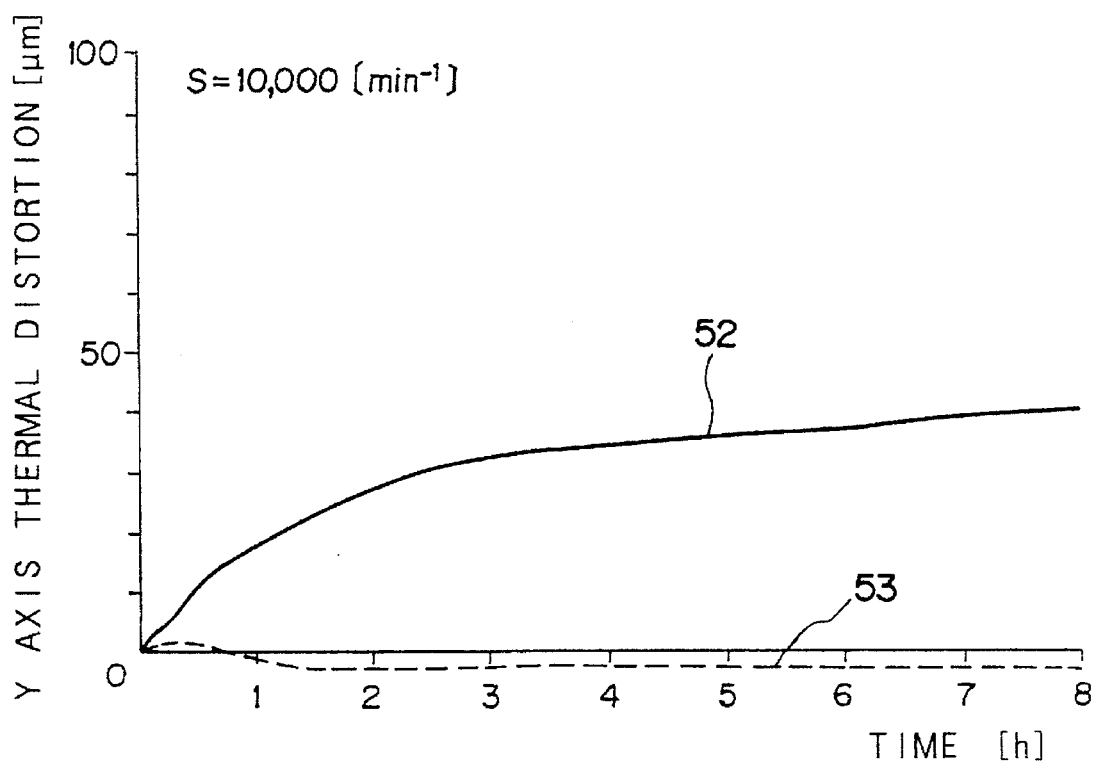
FIG. 16 is a graph showing the actually measured data of a Y axis thermal distortion.
Figure 17:
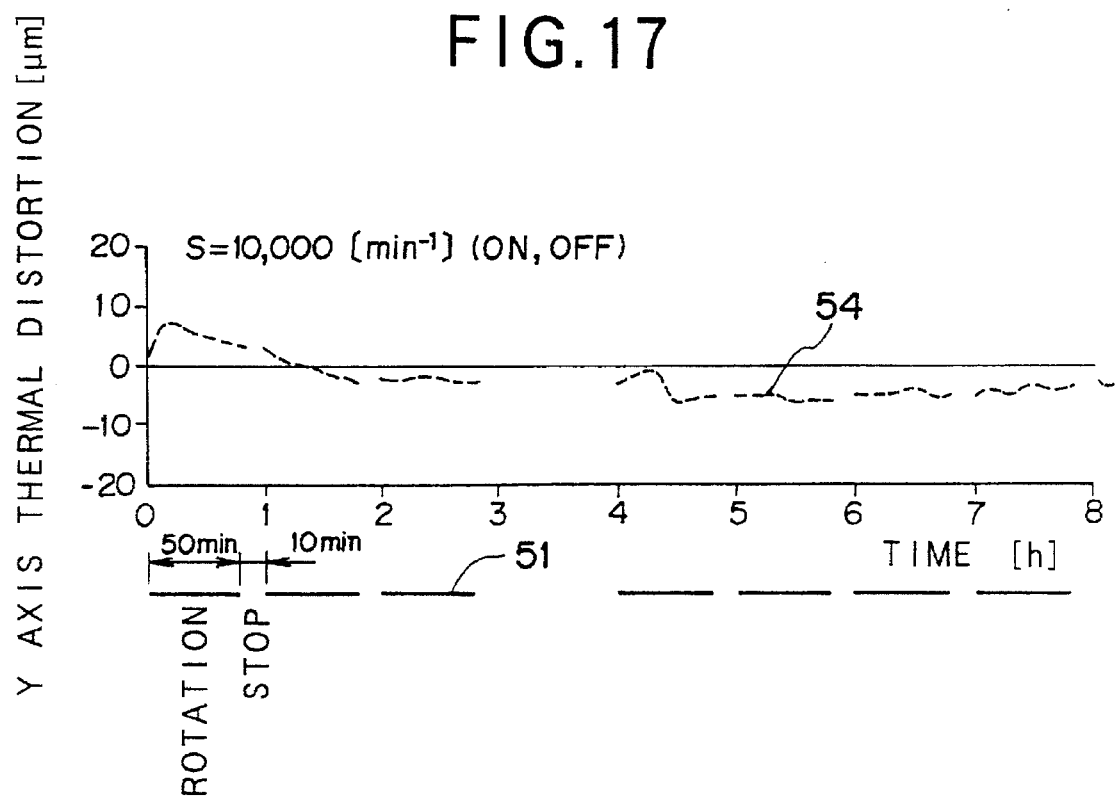
FIG. 17 is a graph showing another actually measured data of the Y axis thermal distortion.

FIG. 14 is a graph showing data of the Z axis thermal distortion, FIG. 15 is a graph showing other data of the Z axis thermal distortion, FIG. 16 is a graph showing data of Y axis thermal distortion, and FIG. 17 is a graph showing other data of the Y axis thermal distortion.

In any case, the number of revolutions S of the main spindle 6 was S=10,000 [min$^{-1}$], and FIGS. 14 and 16 show cases of the continuous operation. FIGS. 15 and 17 show the thermal distortions in the case where the operation is continued for about 50 minutes and the rest is for 10 minutes (including one 70 minute stop) as indicated by a time chart line 51. The abscissa axes of FIGS. 14 to 17 represent the time.

As shown in FIGS. 14 and 16, the thermal distortions without the compensation were about 40 μm at maximum as indicated by solid lines 48 and 52, respectively. In contrast, according to the present invention, it is possible to cause the target value of the thermal distortion to approach zero by using the compensating method. Namely, in the case where the compensation for the thermal distortion according to the present invention is effected, as indicated by dotted lines 49 and 53 in FIGS. 14 and 16, it is possible to suppress the residual thermal distortion down to ±5 μm or less.

Incidentally, it is confirmed that, also in the case where the thermal distortion without the compensation exceeded 100 μm, it is possible to suppress the residual thermal distortion down to ±5 μm or less according to the present invention. Thus, according to the invention, it is possible to carry out the compensation for the thermal distortion with high precision.

Also, in the case where the machine tool is intermittently operated as shown in FIGS. 15 and 17, as indicated by dotted lines 50 and 54, it is possible to suppress the residual thermal distortion down to ±5 μm or less by using the compensating method.

(Third Embodiment)

FIGS. 18 to 28 are views illustrating the third embodiment of the invention.

Figure 18:
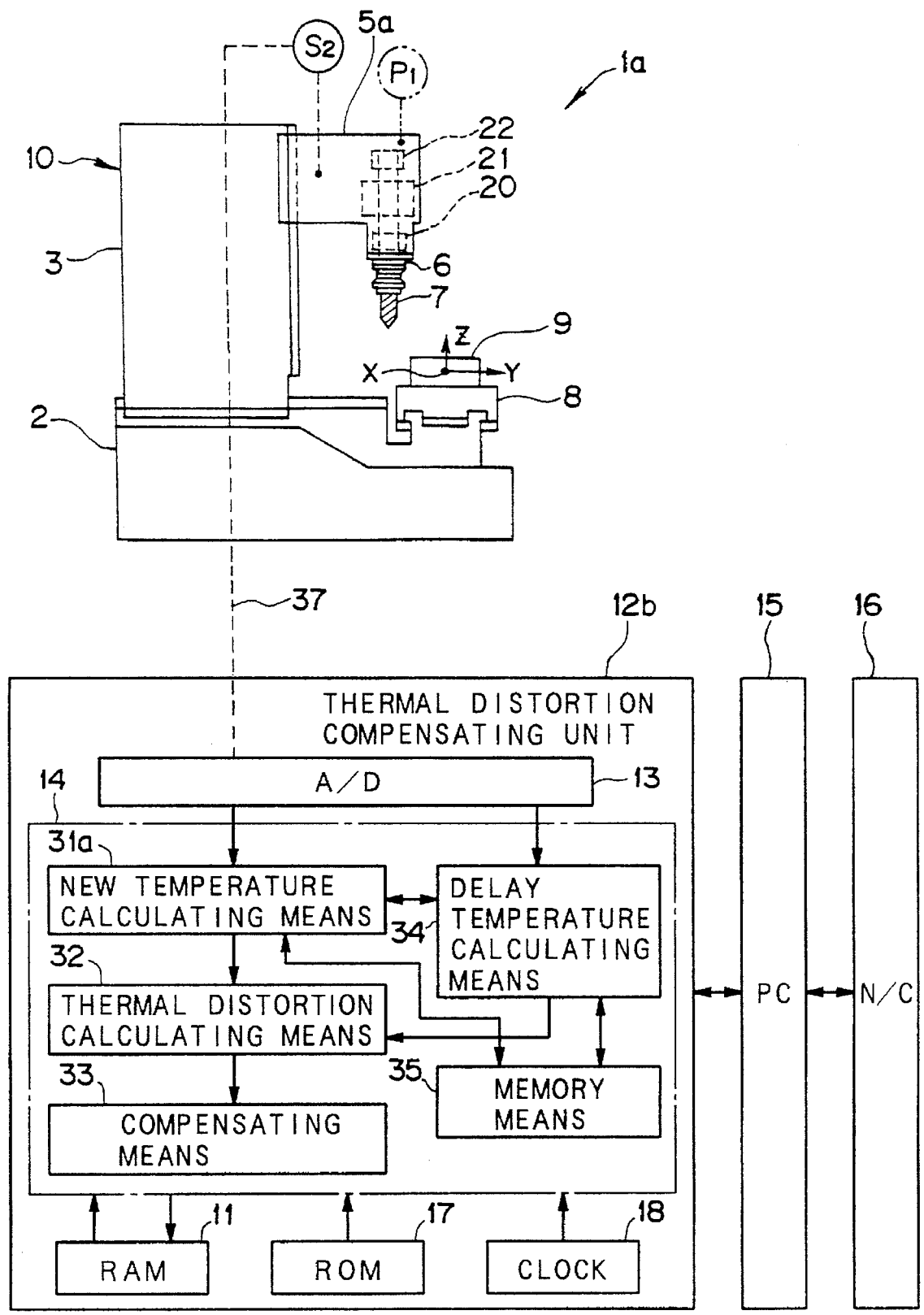
FIG. 18 is a block diagram showing a third embodiment of the invention.

For instance, as shown in FIG. 18, the MC 1a is provided with a main spindle 6 on which a tool 7 is carried and a main spindle head 5a for rotatably supporting the main spindle 6 through a main bearing 20 and an upper bearing 22 (the other bearing). A built-in motor 21 for driving to rotate the main spindle 6 is disposed between both bearings 20 and 22 and incorporated into the spindle head 5a together with both bearings 20 and 22.

The main bearing 20 is used to position the main spindle 6 in the central axial direction. The upper bearing 22 is used for slidingly supporting the main spindle 6 in the central axial direction. The main spindle 6 is elongated or contracted by a thermal distortion. Accordingly, even if the upper bearing 22 and the motor 21 are heated by the rotation, the main spindle 6 is elongated upwardly so that the tool 7 is free from the adverse influence thereof.

As a result, it is sufficient that the thermal distortion compensation is carried out only in view of the main bearing 20 which is one of heat sources in case of the MC 1a. A head temperature sensor $S_2$ which is used as a temperature detecting means for detecting the temperature change of the main bearing 20 is mounted on the spindle head 5a.

Incidentally, it is possible to detect a temperature at positions other than the head position, for example, the nose or the column if the position represent the temperature change caused by the main bearing 20 which is the heat source. Also, it is possible to use other type machine tool in which the main spindle holds the workpiece.

In the third embodiment, the same reference numerals are used to indicate the same members or components as those of the first and second embodiments and the explanation therefor will be omitted.

A principle of the thermal distortion compensation in the third embodiment will now be described.

The compensation in the Z axis direction will be exemplified and explained in the same manner as in the first and second embodiments. An equation for calculating the thermal distortion in the Z axis direction in the third embodiment is given as follows:

$$\Delta Z = a \cdot (\Delta Z_3 + \Delta Z_4) \quad (22)$$

where $\Delta Z$ is the Z axis thermal distortion, "a" is the overall compensation coefficient (the same as that of the equation (2)), $\Delta Z_3$ is the new thermal distortion characteristic of the Z axis thermal distortion, and $\Delta Z_4$ is the lagging characteristic of the Z axis thermal distortion.

Namely, the calculation equation (22) includes the new thermal distortion characteristic $\Delta Z_3$ calculated from the temperature change on the basis of the new temperature change having the same time constant as the time constant of the thermal distortion, and the lagging characteristic $\Delta Z_4$. The thermal distortion of the lagging characteristic will appear with a time lag to the temperature change.

The temperature change to be handled here is calculated with the difference between the output temperature from each temperature sensor and the reference temperature. The same reference temperature as that considered in the foregoing first and second embodiments is adopted.

Incidentally, according to the invention, it is possible to use a calculation equation only based upon the new thermal distortion characteristic $\Delta Z_3$ as shown in the equation (23).

$$\Delta Z = a \cdot \Delta Z_3 \quad (23)$$

The new thermal distortion characteristic $\Delta Z_3$ is calculated by the following equation:

$$\Delta Z_3 = g \cdot Y_3 \quad (24)$$

where $Y_3$ [°C.] is the new temperature change, and g [±µm/°C.] is the internal compensation coefficient.

The equation (24) used in the third embodiment is a formula for calculating the thermal distortion of the machine structure 10 by the output of the temperature sensor provided at one place. The new thermal distortion characteristic $\Delta Z_3$ is calculated from the new temperature change $Y_3$ obtained by developing the temperature change T of the temperature detected by the head temperature sensor $S_2$.

Incidentally, it is sufficient to provide at least one place where the temperature sensor is located but it is possible to increase the number of the places in conformity with the number of the heat sources. The temperature sensor mount positions may be those other than the spindle head 5a if the positions may be influenced by the heat generation of the heat source.

On the other hand, an equation for calculating the lagging characteristic $\Delta Z_4$ is given as follows:

$$\Delta Z_4 = h \cdot Y_4 \quad (25)$$

where $Y_4$ [°C.] is the delay temperature change, and h [±µm/°C.] is the internal compensation coefficient.

In the equation (25), the lagging characteristic $\Delta Z_4$ is calculated from the delay temperature change $Y_4$ calculated by predicting the delay to the temperature change T of the temperature detected by the head temperature sensor $S_2$.

Incidentally, it is sufficient to provide at least one place where the temperature sensor is located but it is possible to increase the number of the places in conformity with the number of the heat sources.

FIG. 18 is a block diagram showing the third embodiment of the invention.

The thermal distortion compensating unit 12b according to the third embodiment includes a new temperature calculating means 31a for calculating the temperature change, in a phantom position $P_1$, having substantially the same time constant as the time constant of the thermal distortion by developing the temperature detected by the temperature sensor $S_2$, the thermal distortion calculating means 32 for calculating the new thermal distortion characteristic $\Delta Z_3$ which changes in response to the new temperature change calculated in the new temperature calculating means 31a, and the compensating means 33 for correcting a machining error on the basis of the thermal distortion calculated in the thermal distortion calculating means 32.

In a preferred embodiment, the thermal distortion compensating unit 12b is further provided with a delay temperature calculating means 34. The delay temperature calculating means 34 calculate the delay temperature change which will appear with a time lag to the temperature change of the temperature detected by the temperature sensor $S_2$, while predicting the delay to the temperature change.

The thermal distortion calculating means 32 calculates the lagging characteristic $\Delta Z_4$ which will change in response to the delay temperature change calculated in the delay temperature calculating means 34 and adds the characteristic $\Delta Z_4$ to the foregoing new distortion characteristic $\Delta Z_3$. The compensating means 33 calculates to correct the machine error on the basis of the total thermal distortion (total value) and produces its output signal.

In the third embodiment, the same members or components and functions as those of the first and second embodiments will not be explained to avoid the duplication.

The steps of the third embodiments will now be explained with reference to FIGS. 19 to 28.

Figure 19:
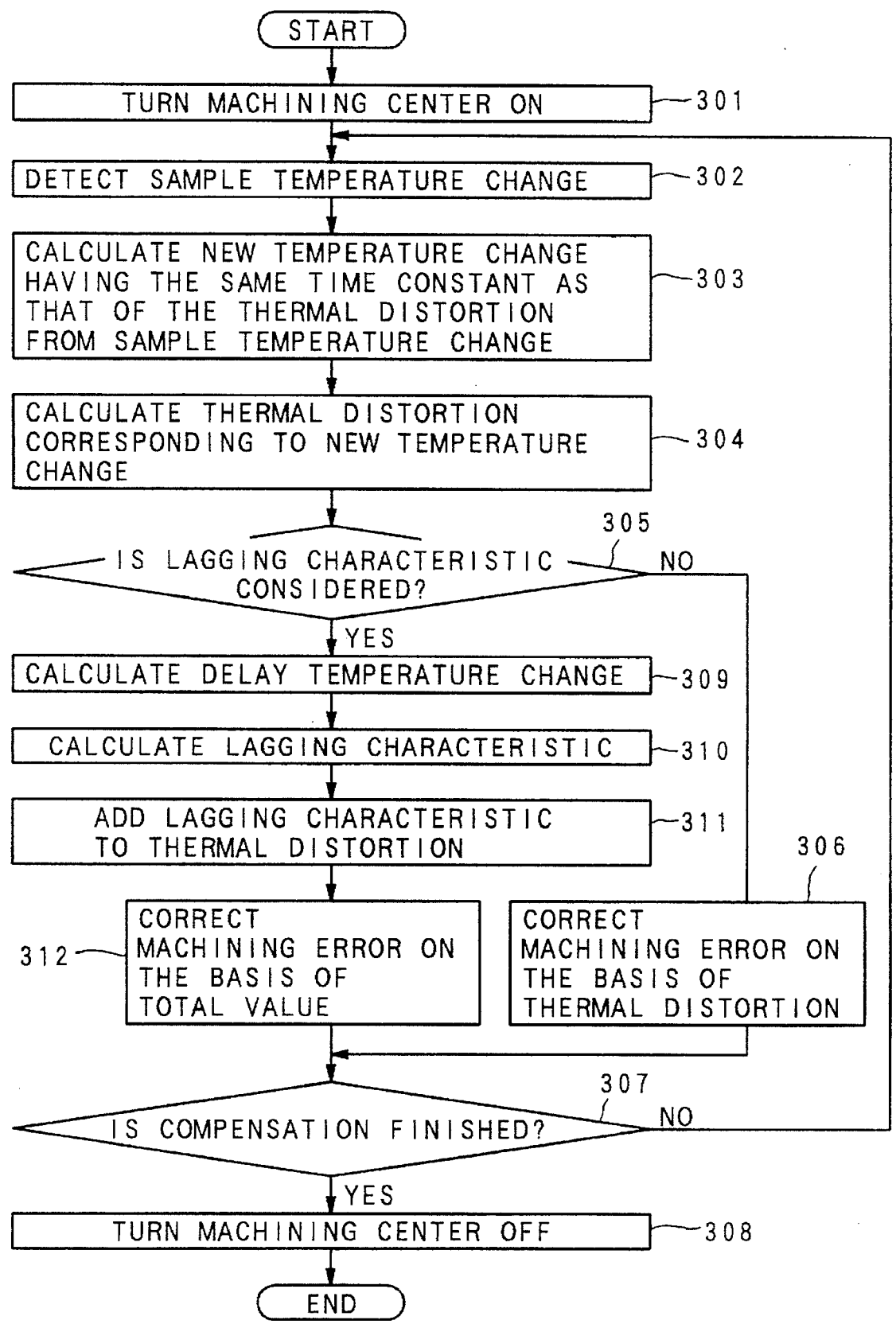
FIG. 19 is a flow chart showing the operation of the third embodiment.
Figure 20:
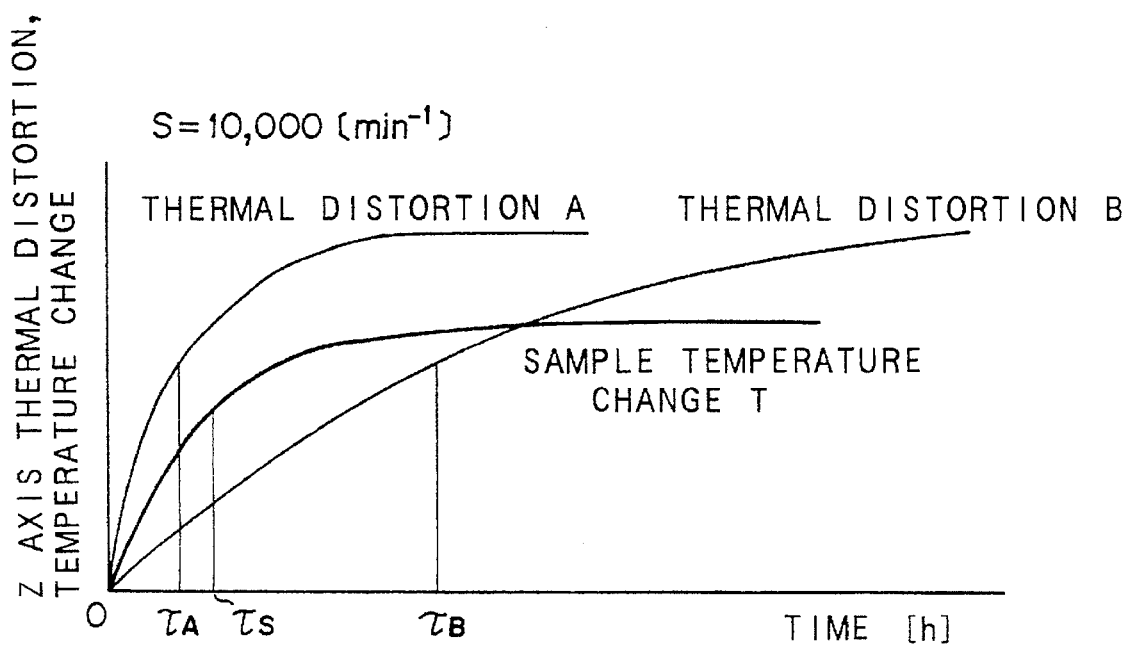
FIG. 20 is a graph showing a sample temperature change and a Z axis thermal distortion.
Figure 21:
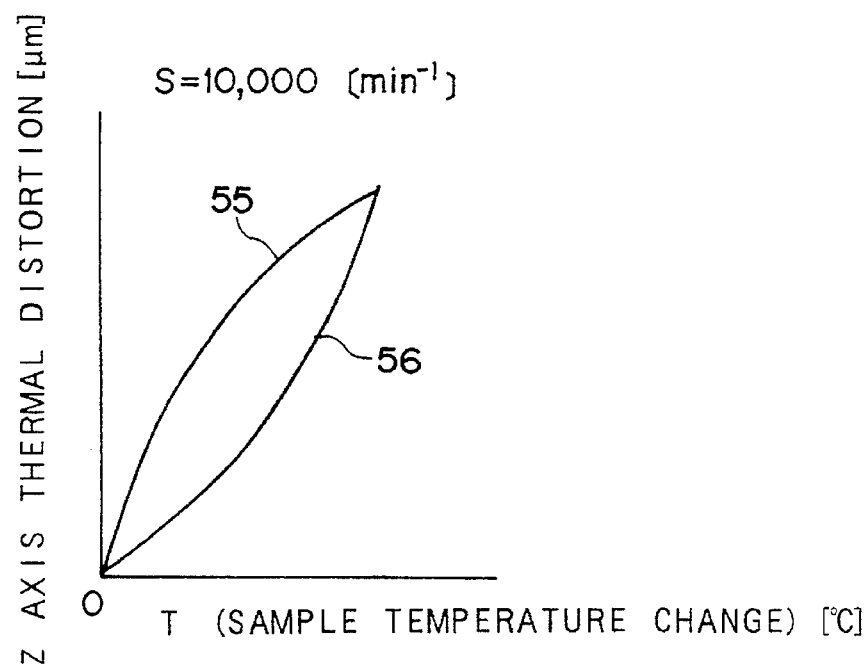
FIG. 21 is a graph showing a relationship between the sample temperature change and the Z axis thermal distortion.

FIG. 19 is a flow chart showing the operation of the third embodiment. FIG. 20 is a graph showing the time functions of the Z axis distortions and a typical example (sample temperature change) of the temperature change T of the temperature detected at the head position. FIG. 21 is a graph showing a reference relationship between the sample temperature change and the Z axis thermal distortion.

Figure 22:
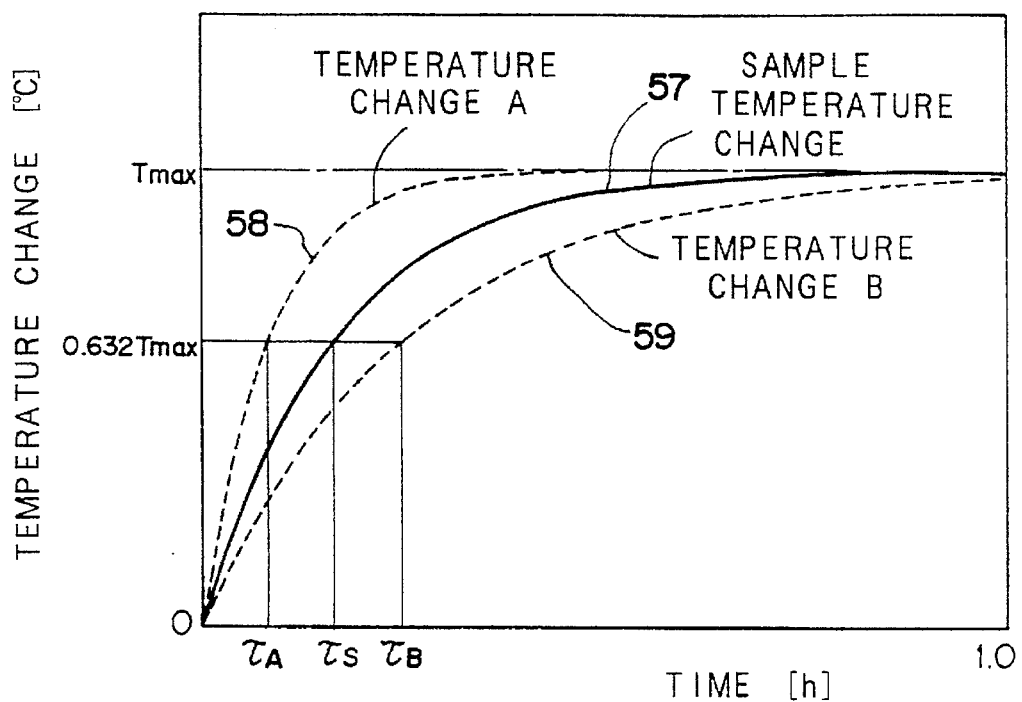
FIG. 22 is a graph showing the sample temperature change, a temperature change "A" and a temperature change "B"
Figure 23:
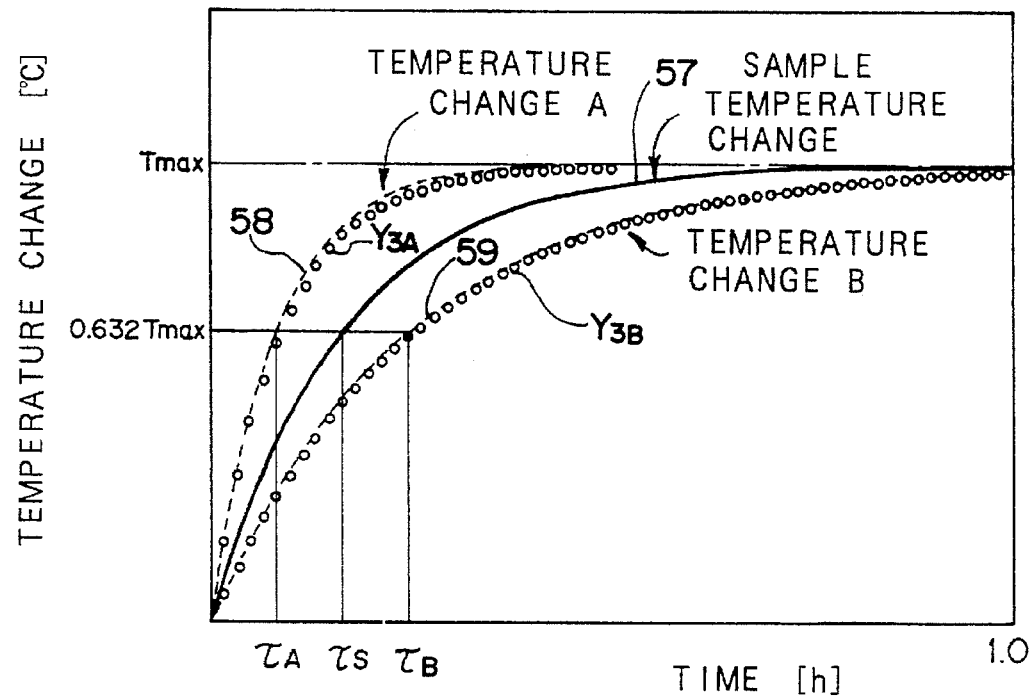
FIG. 23 is a graph showing the sample temperature change, the temperature changes "A" and "B" and a new temperature change.

FIG. 22 is a graph showing the sample temperature change, a temperature change "A" having a smaller time constant than the sample temperature change and a temperature change "B" having a larger time constant than the sample temperature change. FIG. 23 is a graph showing the new temperature changes $Y_{3A}$ and $Y_{3B}$ (indicated by encircled points in FIG. 23) created by using the sample temperature change in addition to the temperature change shown in FIG. 22.

Figure 24:
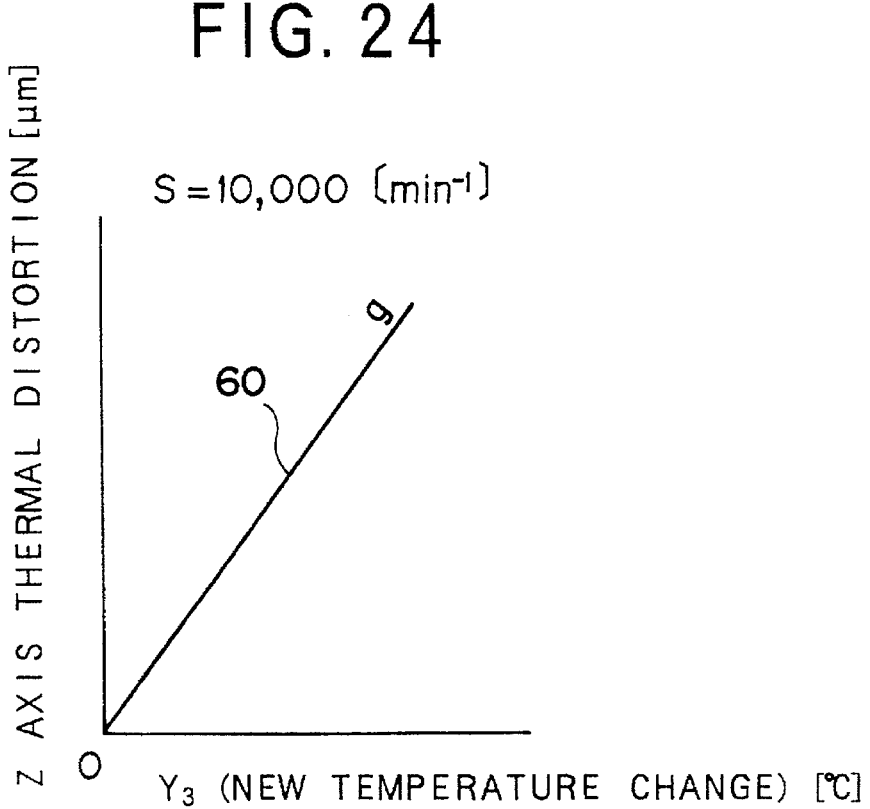
FIG. 24 is a graph showing the Z axis thermal distortion relative to the new temperature change.
Figure 25:
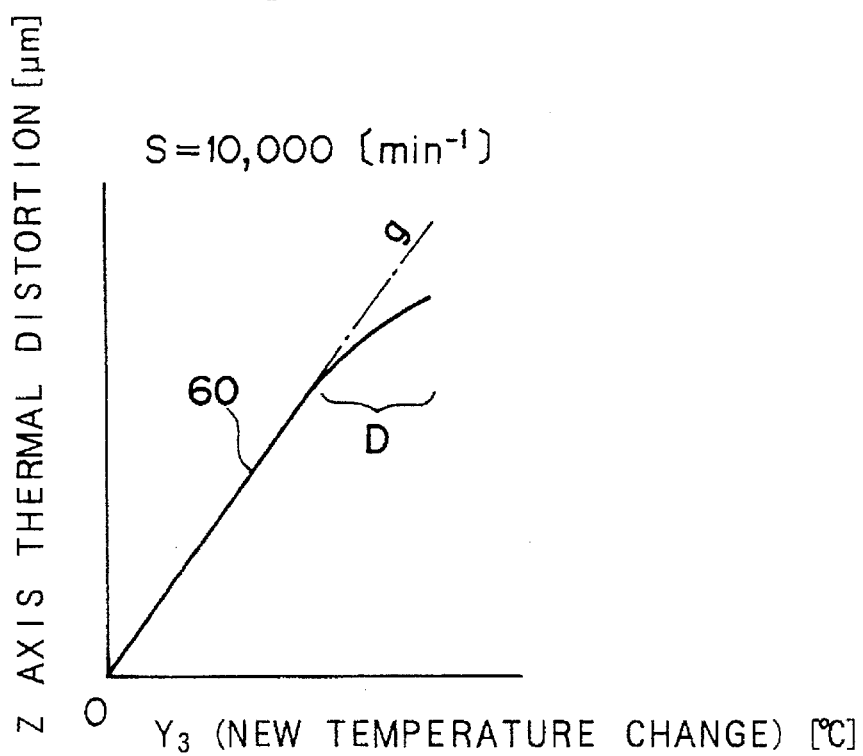
FIG. 25 is a graph showing the Z axis thermal distortion relative to the new temperature change in the case where the Z axis thermal distortion includes a lagging characteristic.

FIG. 24 is a graph showing the Z axis thermal distortion relative to the new temperature change. FIG. 25 is a graph showing the Z axis thermal distortion relative to the new temperature change in the case where the Z axis thermal distortion includes a lagging characteristic.

Figure 26:
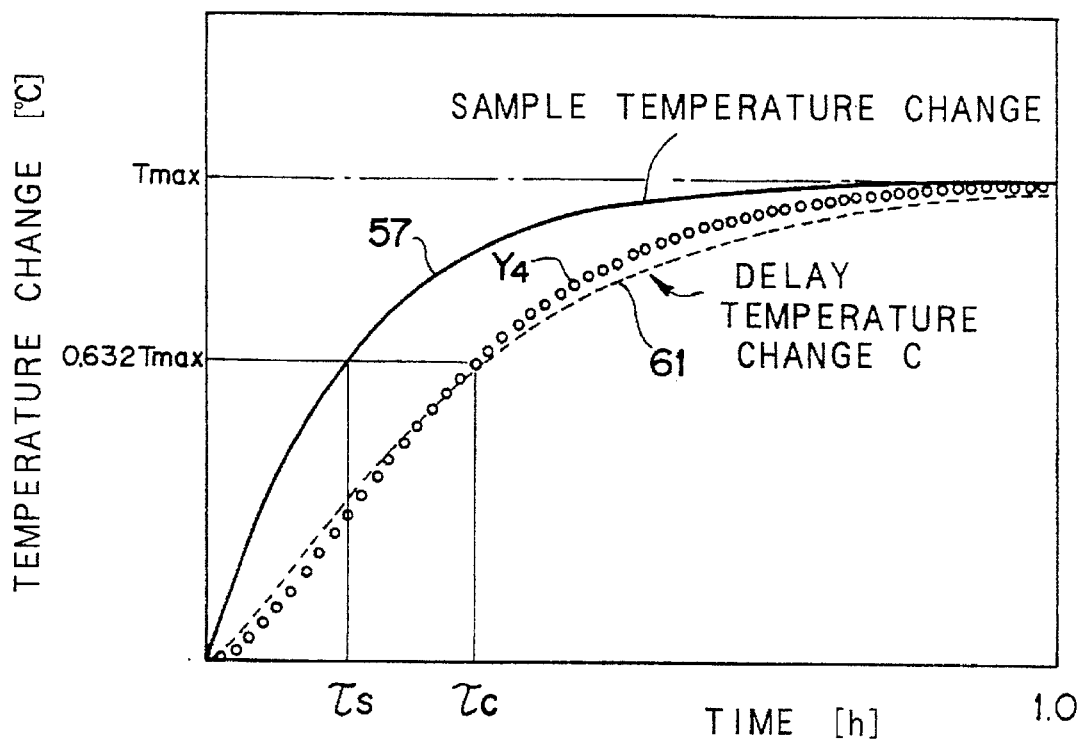
FIG. 26 is a graph showing the sample temperature change, a delay temperature change "C", and the new delay temperature change $Y_4$ (indicated by encircled points in FIG. 26) created by using the sample temperature change.
Figure 27:
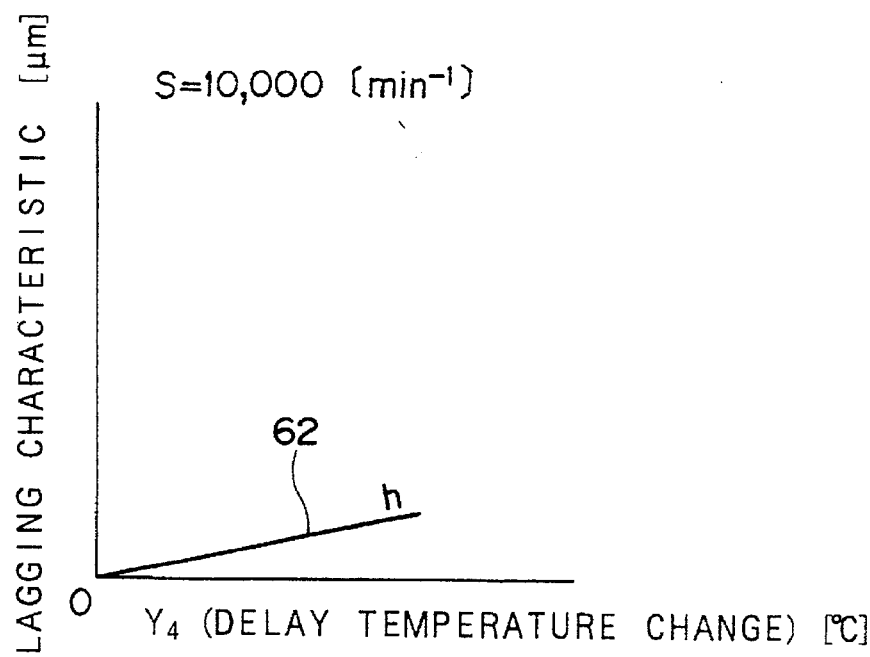
FIG. 27 is a graph showing the sample temperature change, the temperature changes and the new temperature changes.
Figure 28:
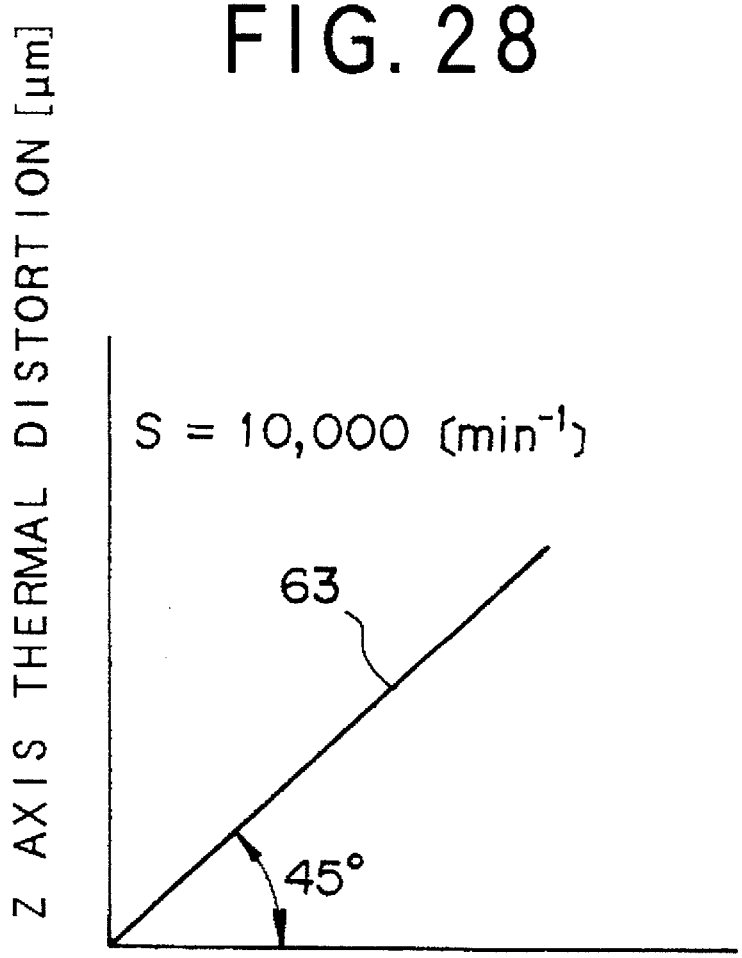
FIG. 28 is a graph showing the Z axis thermal distortion relative to the thermal distortion estimated from the new temperature change and the delay temperature change.

FIG. 26 is a graph showing the sample temperature change, a delay temperature change "C" which will appear with a time lag to the sample temperature change, and the delay temperature change $Y_4$ (indicated by encircled points in FIG. 26) created by using the sample temperature change. FIG. 27 is a graph showing the lagging characteristic relative to the delay temperature change. FIG. 28 is a graph showing the Z axis thermal distortion relative to the thermal distortion estimated from the new temperature change and the delay temperature change.

In the third embodiment, the thermal distortion in the Z axis direction is detected in advance. At the same time, the respective time constants are calculated on the basis of the data of the temperature change of the temperature detected by the head temperature sensor $S_2$. The steps for calculating the time constants are the same as those for calculating the time constants of the thermal distortion in the Z axis direction in the foregoing first embodiment.

FIG. 20 shows a typical example (sample temperature change) of the temperature change T of the temperature detected by the head temperature sensor $S_2$, and the time basis data of the Z axis thermal distortions (thermal distortions A and B) of two examples under the condition that the main spindle is rotated at a constant rotation speed (the number of revolutions S=10,000 [min$^{-1}$]).

In the case where the time constant of the Z axis thermal distortion is less than the time constant $\tau_S$ of the sample temperature change T, that is, in the case where the thermal distortion will appear soon, the Z axis thermal distortion is the thermal distortion "A" (time constant $\tau_A$). On the other hand, in the case where the time constant of the Z axis thermal distortion is greater than the time constant $\tau_S$ of the sample temperature change T, that is, in the case where the thermal distortion will appear slowly, the Z axis thermal distortion is the thermal distortion "B" (time constant $\tau_B$). Accordingly, the data of either thermal distortions A or B is actually used depending upon the thermal distortion characteristics of the MC 1a.

The balance of the values between the time constant of the extracted Z axis thermal distortion and the time constant of the sample temperature change T represents the thermal growth intrinsic to every machine tool and is kept unchanged even if the operational conditions such as the rotation speed of the main spindle are changed. Accordingly, it is sufficient to once carry out the calculation work for the both time constants.

Subsequently, as shown in FIGS. 18 and 19, the MC 1a is actuated and the workpiece 9 is cut by the tool 7 (step 301). Also, the temperature of the head position is detected (step 302) and is fed into the new temperature calculating means 31a.

However, if the relationship between the sample temperature change T and the thermal distortion A and the relationship between the sample temperature change T and the thermal distortion B are shown on the basis of the data of FIG. 20, these relationships are shown in curved forms 55 and 56 in FIG. 21.

Namely, since the sample temperature change T and the Z axis thermal distortions are not under the simple linear relation, it is impossible to immediately estimate the thermal distortions from the temperature change of the temperature detected timely at the head position.

Therefore, the new temperature change having substantially the same time constant as the time constant of the thermal distortion is calculated by using the temperature change of the temperature detected from the head position in accordance with the "linearizing method".

FIG. 22 shows the sample temperature change 57 having the time constant $\tau_S$, a model example 58 having the temperature change "A" having the same time constant $\tau_A$ as that of the thermal distortion "A", and a model example 59 having the temperature change "B" having the same time constant $\tau_B$ as that of the thermal distortion "B".

The temperature changes indicated by curves 57 to 59 are all saturated at a value $T_{max}$. The examples of each time constant are shown as follows.

$\tau_A$=5 [min]

$\tau_S$=10 [min]

$\tau_B$=15 [min]

Also, the behavior relationship among the respective temperature changes 57 to 59 may be represented by the following differential equations (26) to (28), respectively.

$$\tau_S \cdot dT/dt + T = X \quad (26)$$

$$\tau_A \cdot dY_{3A}/dt + Y_{3A} = X \quad (27)$$

$$\tau_B \cdot dY_{3B}/dt + Y_{3B} = X \quad (28)$$

Incidentally, the equations (27) and (28) may be represented by a general differential equation (29).

$$\tau_Z dY_3/dt + Y_3 = X \quad (29)$$

where T [°C.] is the temperature change detected by the head temperature sensor $S_2$, X [°C.] is the temperature change of the heat source, $Y_3$ [°C.] is the new temperature change, $Y_{3A}$ [°C.] is the new temperature change for creating the temperature change A, $Y_{3B}$ [°C.] is the new temperature change for creating the temperature change B, and $\tau_Z$ [min] is the time constant of the Z axis thermal distortion.

According to the equation (26), it is possible to calculate the temperature change X of the heat source from the sample temperature change T. The value X is substituted into the equation (29). Then, the new temperature change $Y_3$ having the time constant $\tau_2$ different from the time constant $\tau_S$ of the sample temperature change may be obtained. The time constant $\tau_Z$ is determined by the thermal growth of the MC 1a and is intrinsic to every machine tool.

Actually, in case of the calculation in the new temperature calculating means 31a (see FIG. 18), the solution is sought by the repetitive calculation of the following respective discrete equations (30) and (31) derived from differential equations (26) and (29) (step 303).

$$X = \tau_S \cdot (T - T_0)/\Delta t + T_0 \quad (30)$$

$$Y_3 = (2X + 2\tau_Z \cdot Y_{30}/\Delta t - Y_{30})/(2\tau_Z/\Delta t + 1) \quad (31)$$

where $\Delta t$ [min] is the calculation interval, $T_O$ [°C.] is the output of the previous sample temperature change T, and $Y_{30}$ [°C.] is the output of the previous new temperature change $Y_3$.

In FIG. 23, in addition to the sample temperature change T and the temperature changes A and B, the new temperature change $Y_3$ (specifically, the new temperature change $Y_{3A}$ or $Y_{3B}$) created by using the sample temperature change T in accordance with the equations (30) and (31) are indicated by encircled points. The encircled points show the case where the measurement interval, i.e., calculation interval $\Delta t$ is 1.0 [min].

Thus, through the repetitive calculation using the equations (30) and (31), the new temperature change having substantially the same time constant as any desired time constant of the thermal distortion may be created.

Since the new temperature change $Y_3$ has the same time constant as that of the thermal distortion, as shown in a straight line 60 in FIG. 24, it is kept in the linear relation with the Z axis thermal distortion. The gradient g of the straight line 60 represents the correlation between the new temperature change $Y_3$ and the thermal distortion. The thermal distortion calculating means 32 calculates the thermal distortion (i.e., new thermal distortion characteristic $\Delta Z_3$) from the new temperature change $Y_3$ by using the equation (24) (step 304).

As described above, the linearizing method is used when the sensitive thermal distortion basically having the small time constant is estimated from the temperature change T of the temperature detected at, for example, the head position remote from the heat source. The new thermal distortion characteristic $\Delta Z_3$ calculated by this method correspond to the immediate responding characteristic $\Delta Z_1$ of the equation (2). It is possible to carry out the compensation for a high precision thermal distortion by the method solely.

Subsequently, it is judged whether or not the lagging characteristic $\Delta Z_4$ should be considered (step 305). In the case where it is not considered, the thermal distortion compensating means 33 calculates to correct the machining error on the basis of the result calculated in the thermal distortion calculating means 32 (step 306).

Thereafter, it is judged whether or not the compensation should be finished (step 307). In the case where it should be finished, the MC 1 is stopped (step 308). All the steps have been finished. If the compensation is not finished, the operation returns back to the step 302.

On the other hand, in the case where the lagging characteristic $\Delta Z_4$ should be considered in the judgement in the step 305, the temperature of the head position detected by the head temperature sensor $S_2$ is inputted into the delay temperature calculating means 34.

Since the column 3 and the like have large masses and are located away from the main spindle 6 that is the main heat source, the temperature change will appear with a further time lag to the head position where the temperature change will appear with a time lag. In the same way as in the first and second embodiments in conjunction with FIGS. 9 and 13, the delay temperature change gives an adverse influence to the linear correlation between the new temperature change $Y_3$ and the Z axis thermal distortion in the region D where a long time has passes in FIG. 25.

In the case where the lagging characteristic $\Delta Z_4$ should be considered, the behavior of the delay temperature change $Y_4$ which will appear with a time lag to the temperature change T of the temperature detected by the head temperature sensor $S_2$ is estimated by setting a heat capacity $C_4$ of the dummy by using the above-described "dummy method".

An equation for calculating the delay temperature change $Y_4$ is given as follows:

$$Y_4 = [T_O + T + (C_4/\Delta t) \cdot Y_{40} - Y_{40}]/[(C_4/\Delta t) + 1] \quad (32)$$

where $\Delta t$ [min] is the calculation interval, T [°C.] is the input of the temperature change detected by the head temperature sensor $S_2$, $T_O$ [°C.] is the input of the previous temperature change T, $Y_4$ [°C.] is the output of the delay temperature change, $Y_{40}$ [°C.] is the output of the previous delay temperature change $Y_4$, and $C_4$ [min] is the dummy heat capacity.

FIG. 26 shows the sample temperature change 57 which is a typical example of the temperature change T of the temperature detected by the foregoing head temperature sensor $S_2$ and a model example 61 (temperature change C, time constant $\tau_C$) of the delay temperature change showing the same thermal behavior as that of the lagging characteristic. Further, in FIG. 26, the delay temperature change $Y_4$ created by using the sample temperature change T in accordance with the equation (32) is indicated by encircled points.

There is a prerequisite condition that the temperature change C becomes to be equal to the sample temperature change T at the saturation value $T_{max}$ after a long time lapses. The encircled points represent the case where the measurement interval, i.e., the calculation interval $\Delta t$ is 1.0 [min].

Thus, by the repetitive calculation for suitably selecting the heat capacity $C_4$ in the equation (32), the delay temperature change $Y_4$ representing the behavior for substantially the same temperature change as the temperature change C of any desired time constant $\tau_C$ ($\tau_C > \tau_S$) may be created.

The delay temperature change $Y_4$ is in linear relation with the lagging characteristic as shown by the straight line 62 in FIG. 27. Thus, the foregoing equation (25) is established. Actually, it is unnecessary to carry out the steps for extracting the temperature change C. For example, the optimum values of the heat capacity $C_4$ and the coefficient h are determined so that the repetitive calculation result for suitably selecting the internal compensation coefficient h of the equation (25) and the dummy heat capacity $C_4$ of the equation (32) by using the sample temperature change T is coincident with the error which is obtained by subtracting the straight line 60 from the Z axis thermal distortion (line including the region D) in FIG. 25. The values of the heat capacity $C_4$ and the coefficient h which have been determined are intrinsic to every machine tool, and it is sufficient to once carry out this work.

The delay temperature change $Y_4$ corresponding to the temperature change T of the temperature detected by the head temperature sensor $S_2$ is calculated in the delay temperature calculating means 34 by using the equation (32) in which the dummy heat capacity $C_4$ is determined (step 309). Subsequently, the delay temperature change $Y_4$ is substituted into the equation (25) in which the internal compensation coefficient h is determined to thereby calculate the lagging characteristic $\Delta Z_4$ (step 310).

The thermal distortion calculating means 32 which has calculated the new thermal distortion characteristic $\Delta Z_3$ by using the equation (24) calculates the Z axis thermal distortion $\Delta Z$ by adding the lagging characteristic $\Delta Z_4$ thus calculated to the new thermal distortion characteristic $\Delta Z_3$ (step 311).

The ordinate axis of FIG. 28 represents the measured Z axis thermal distortion, and the abscissa axis represent the Z axis thermal distortion $\Delta Z$ estimated through the steps up to the step 311 by using the sample temperature change T. In the calculation of the thermal distortion ΔZ, the following equation in which the overall compensation coefficient "a" is one is used.

$$\Delta Z = g \cdot Y_3 + h \cdot Y_4 \tag{33}$$

The measured Z axis thermal distortion of the ordinate axis shown in FIG. 28 and the value of the Z axis thermal distortion ΔZ of the abscissa axis obtained by the equation (33) are substantially coincident with each other on the straight line 63 having a gradient of 45°. This means that both values are the same.

Accordingly, it is possible to predict the Z axis thermal distortion with sufficiently high precision by the temperature data of the head temperature sensor $S_2$ provided at the position which is influenced by the heat generation of the main bearing 20 of the machine structure 10.

In the step 312, it is possible to compensate for the thermal distortion so as to correct the machining error by the compensating means 33 on the basis of the Z axis thermal distortion ΔZ calculated in the step 311 and the workpiece 9 can be cut with high precision.

Thereafter, it is judged whether or not the compensation should be finished (step 307). In the case where it is finished, the MC 1a is stopped (step 308). All the steps have been finished. If the compensation is not finished, the operation returns back to the step 302.

(Fourth Embodiment)

A fourth embodiment in which a linearizing method is applied will be explained with reference to FIGS. 29 to 32.

In the first to third embodiments, the case where the number of the heat sources which causes the thermal distortion is one has been mainly explained. In the case where the number of the heat sources which cause the thermal distortion is plural and the influences of the heat sources are independent of each other, according to the present invention, the equation structure may be developed.

In the fourth embodiment, a plurality of heat sources (i.e., so-called multi-heat source) of the machine tool cause the thermal distortion while influencing each other. Accordingly, the explanation which has not been applied to the foregoing embodiments will now be made.

Figure 29:
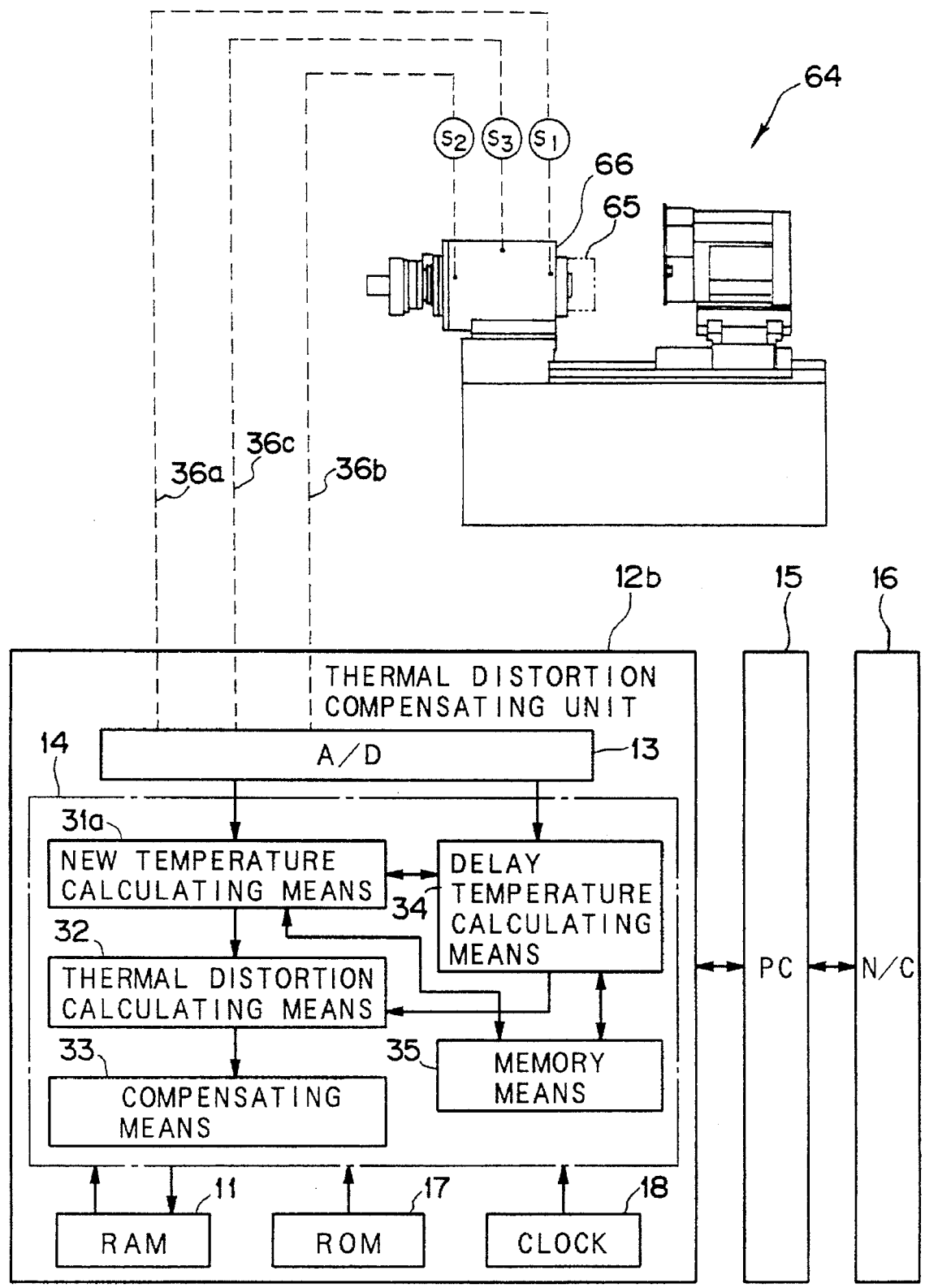
FIG. 29 is a block diagram showing a fourth embodiment of the invention.
Figure 30:
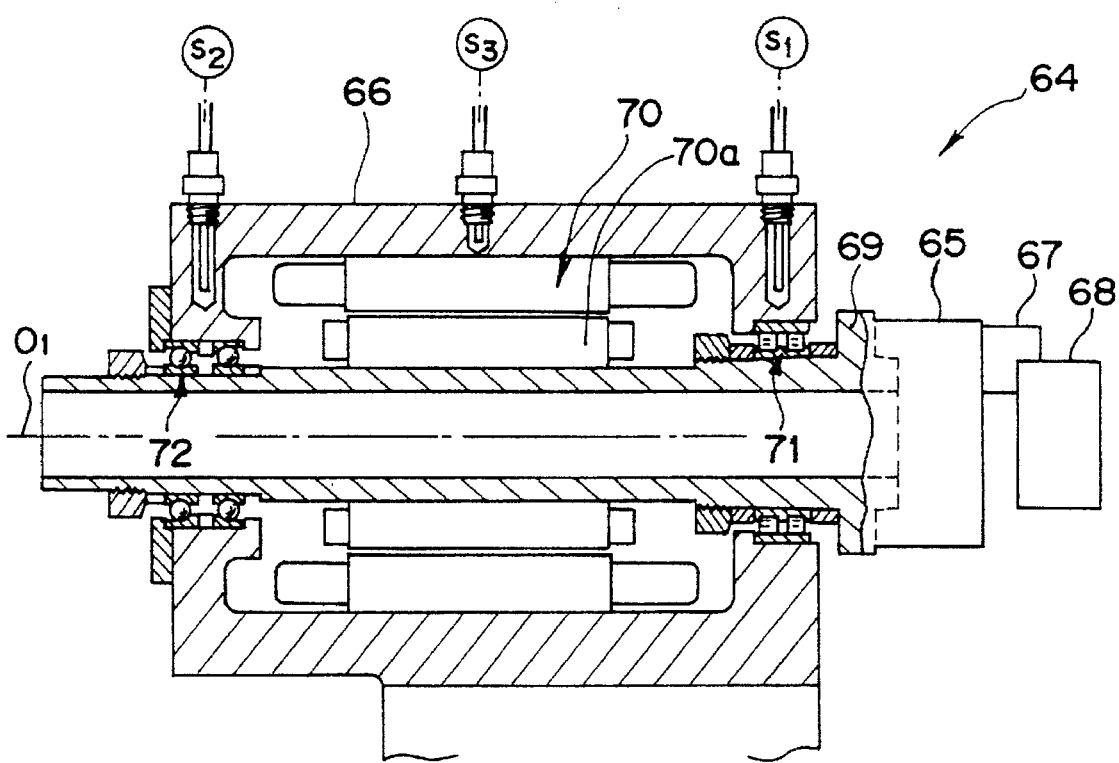
FIG. 30 is a cross-sectional view of a headstock of an NC lathe.

FIG. 29 is a block diagram and FIG. 30 is a cross-sectional view of a headstock.

An NC lathe 64 is a machine tool in which the headstock 66 as a machine structure is a heat source. As shown in FIGS. 29 and 30, the NC lathe 64 is provided with a main spindle 69 for gripping a workpiece 68 through chuck 65 and claws 67, the headstock 66 and a built-in motor 70. The headstock 66 rotatably supports the main spindle 69 through a front bearing 71 located on a machining position side and a rear bearing 72 on the opposite machining position side. These bearings 71 and 72 support the spindle 69.

The motor 70 including a rotor 70a is interposed between the front and rear bearings 71 and 72 and incorporated in the headstock 66 to drivingly rotate the main spindle 69.

An angular ball bearing for positioning the main spindle 69 relative to the central axial direction $O_1$ is used in the rear bearing 72. The main spindle 69 that is elongated or contracted by the thermal distortion may be elongated or contracted in the central axial direction $O_1$ within the front bearing 71. A large load is applied to the front bearing 71 close to the workpiece 68. Accordingly, in order to enhance the cutting performance while standing the large load, a plurality of rows of cylindrical bearings which have a large rated load are used in the front bearing 71.

Incidentally, the structure shown in FIG. 30 may attain a high speed rotational operation in comparison with a structure in which the main spindle 69 is driven by a belt since the main spindle 69 is driven directly by the built-in motor 70. Also, since the vibration of the spindle 69 may be suppressed, the high precision cutting may be attained.

When the NC lathe 64 is actuated to rotate the rotor 70a of the built-in motor 70 and the front and rear bearings 71 and 72 and the rotor 70a are heated, respectively, the main spindle 69 is extended forwardly (in the right direction in FIG. 30) so that the workpiece 68 is moved in the central axial direction $O_1$ to thereby degrade the machining precision.

For this reason, in the thermal distortion compensating unit 12b, three temperature sensors $s_1$, $s_2$ and $s_3$ are mounted on the headstock 66 so as to be located close to the front and rear bearings 71 and 72 and the stator, which are the heat sources, of the motor 70, respectively.

Thus, in the case where a plurality of heat sources that influence the thermal distortion in the Z axis direction (i.e., the central axial direction $O_1$) are present, for example, it is possible to compensate the thermal distortion with high precision by applying the above-described linearizing method.

The respective output signals of the temperature sensors $s_1$, $s_2$ and $s_3$ as the temperature detecting means are inputted into the A/D convertor 13 through circuits 36a, 36b and 37c. The output signals from the A/D convertor 13 are inputted into the new temperature calculating means 31a and the delay temperature calculating means 34. The other structures thereof are the same as those of the third embodiment and their explanation will be omitted.

In case of the multi-heat sources, the thermal distortion influenced by each heat source is individually calculated by the thermal distortion calculating means 32. The total thermal distortion Δz in the Z axis direction is given by the following general equation:

$$\Delta z = a \cdot (\Delta z_1 + \Delta z_2 + \ldots + \Delta z_n) \tag{34}$$

$$\Delta z_1 = \beta_1 \cdot Y_{A1} + \gamma_1 \cdot Y_{B1}$$
$$\Delta z_2 = \beta_2 \cdot Y_{A2} + \gamma_2 \cdot Y_{B2}$$
$$\ldots$$
$$\Delta z_n = \beta_n \cdot Y_{An} + \gamma_n \cdot Y_{Bn}$$

where Δz is the total thermal distortion in the Z axis direction, $\Delta z_1$ to $\Delta z_n$ are the thermal distortions in the Z axis direction by the first through the n-th heat source, "a" is the overall compensation coefficient (the same as the equation (2)), $\beta_1$ to $\beta_n$ are the internal compensation coefficients relating to the new temperature changes, $\gamma_1$ to $\gamma_n$ are the internal compensation coefficients relating to the delay temperature changes, $Y_{A1}$ to $Y_{An}$ are the new temperature changes, and $Y_{B1}$ to $Y_{Bn}$ are the delay temperature changes.

Accordingly, the equation (33) of the third embodiment corresponds to the thermal distortion $\Delta z_1$ of the first item of the equation (34). Also, since the number of the heat sources is one in the third embodiment, the calculation is carried out while the items of the second item onward of the equation (34) are zero.

In the fourth embodiment, since the number of the heat source is three, n=3 is established, and the equation (34) may be developed as follows:

$$\Delta z = a \cdot (\Delta z_1 \Delta z_2 + \Delta z_3) \tag{35}$$

$$\Delta z_1 = K_1 \cdot \Delta z$$

$$\Delta z_2 = K_2 \cdot \Delta z \tag{36}$$

$$\Delta z_3 = K_3 \cdot \Delta z$$

$$K_1 = P \cdot T_1/(P \cdot T_1 + Q \cdot T_2 + R \cdot T_3)$$

$$K_2 = Q \cdot T_2/(P \cdot T_1 + Q \cdot T_2 + R \cdot T_3) \quad (37)$$

$$K_3 = R \cdot T_3/(P \cdot T_1 + Q \cdot T_2 + R \cdot T_3)$$

where $T_1$ is the temperature change of the temperature detected by the temperature sensor $s_1$, $T_2$ is the temperature change of the temperature detected by the temperature sensor $s_2$, $T_3$ is the temperature change of the temperature detected by the temperature sensor $s_3$, and P, Q and R are the internal compensation coefficients.

The internal compensation coefficients P, Q and R in three equations (37) are determined in view of influence of the respective temperature changes $T_1$ to $T_3$, and are determined by the following equation (38) from the difference in saturated values of the sample temperature change in the test in which the heat generating conditions are changed over three times.

The balance of the values of the determined coefficients P, Q and R here are representative of the thermal growth intrinsic to every type of the machine tool and is not changed even if the operational conditions are changed. Accordingly, this determining work is carried out once.

$$P \cdot T_{1S} + Q \cdot T_{2S} + R \cdot T_{3S} = \Delta z \quad (38)$$

where $T_{1S}$ is the saturated value of the sample temperature change $T_1$, $T_{2S}$ is the saturated value of the sample temperature change $T_2$, and $T_{3S}$ is the saturated value of the sample temperature change $T_3$.

Figure 31:
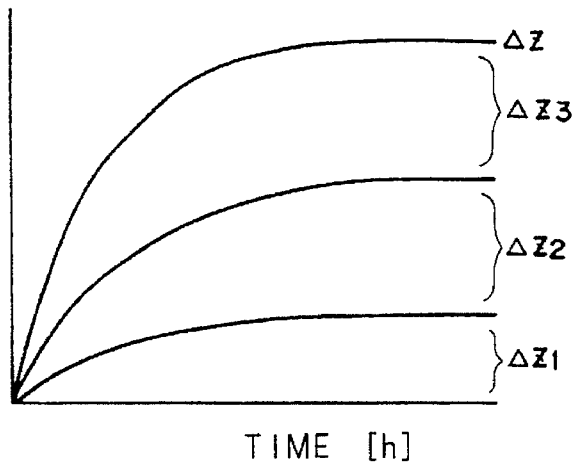
FIG. 31 is a graph showing the Z axis thermal distortion of each heat source.

Since the values of the internal compensation coefficients P, Q and R are substituted into the equation (37) so that the coefficients $K_1$, $K_2$ and $K_3$ are determined, three equations (36) are represented as shown in FIG. 31. As a result, the correlation between respective thermal distortions $\Delta z_1$, $\Delta z_2$ and $\Delta z_3$ under influences of the heat sources 71, 72 and 70a and the respective sample temperature changes may be made linear by the linearizing method or the like. FIG. 31 is a graph showing the Z axis thermal distortion of each heat source.

Since the lathe machine tool such as an NC lathe generally has a small heat capacity, the thermal distortion is sensitively exhibited in comparison with the MC. Accordingly, the method according to the third embodiment in which the mount position of the temperature sensor is not limited is particularly effective.

Also, if the method according to the third embodiment is used, it is sufficient to provide a single temperature sensor to a single heat source.

Accordingly, it is possible to reduce the number of the temperature sensors in case of the NC lathe 64 having multi-heat sources.

Figure 32:
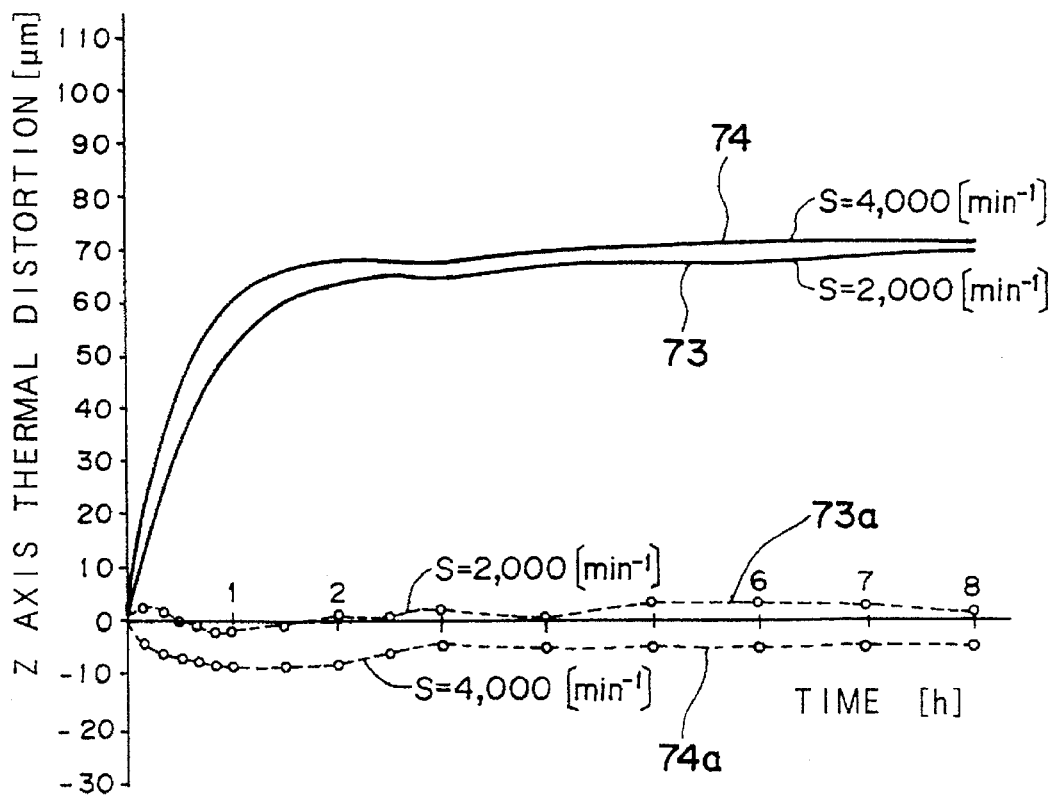
FIG. 32 is a graph showing actually measured data of the Z axis thermal distortion.

FIG. 32 is a graph showing actually measured data of the Z axis thermal distortion in case of the actually operation of the NC lathe 64 in combination of the linearizing method and the dummy method.

As shown in FIG. 32, the thermal distortion without the compensation as indicated by the solid lines 73 and 74 was about 70 μm. In contrast, in the case where the compensation for the thermal distortion according to the present invention is carried out, the thermal distortion is suppressed to ±10 μm or less as indicated by dotted lines 73a and 74a. Reference character S used in FIG. 32 denotes the number of revolutions of the main spindle.

(Fifth Embodiment)

A fifth embodiment will now be described with reference to FIGS. 33 to 37.

In the fifth embodiment, any one method of the above-described methods according to the present invention is applied to a machine tool having a plurality of main spindles for performing the thermal distortion compensation.

Each main spindle holds either the workpiece or the tool. The thermal distortion of each main spindle is made substantially uniform by adjusting the temperature of the main spindle with the temperature adjusting unit. The temperature change of the machine structure with respect to at least one main spindle is detected for the thermal distortion compensation by the temperature detecting means.

Incidentally, in the fifth embodiment, the same reference numerals are used to indicate the same members or components as those of the forgoing embodiments and the explanation therefor will be omitted.

Figure 33:
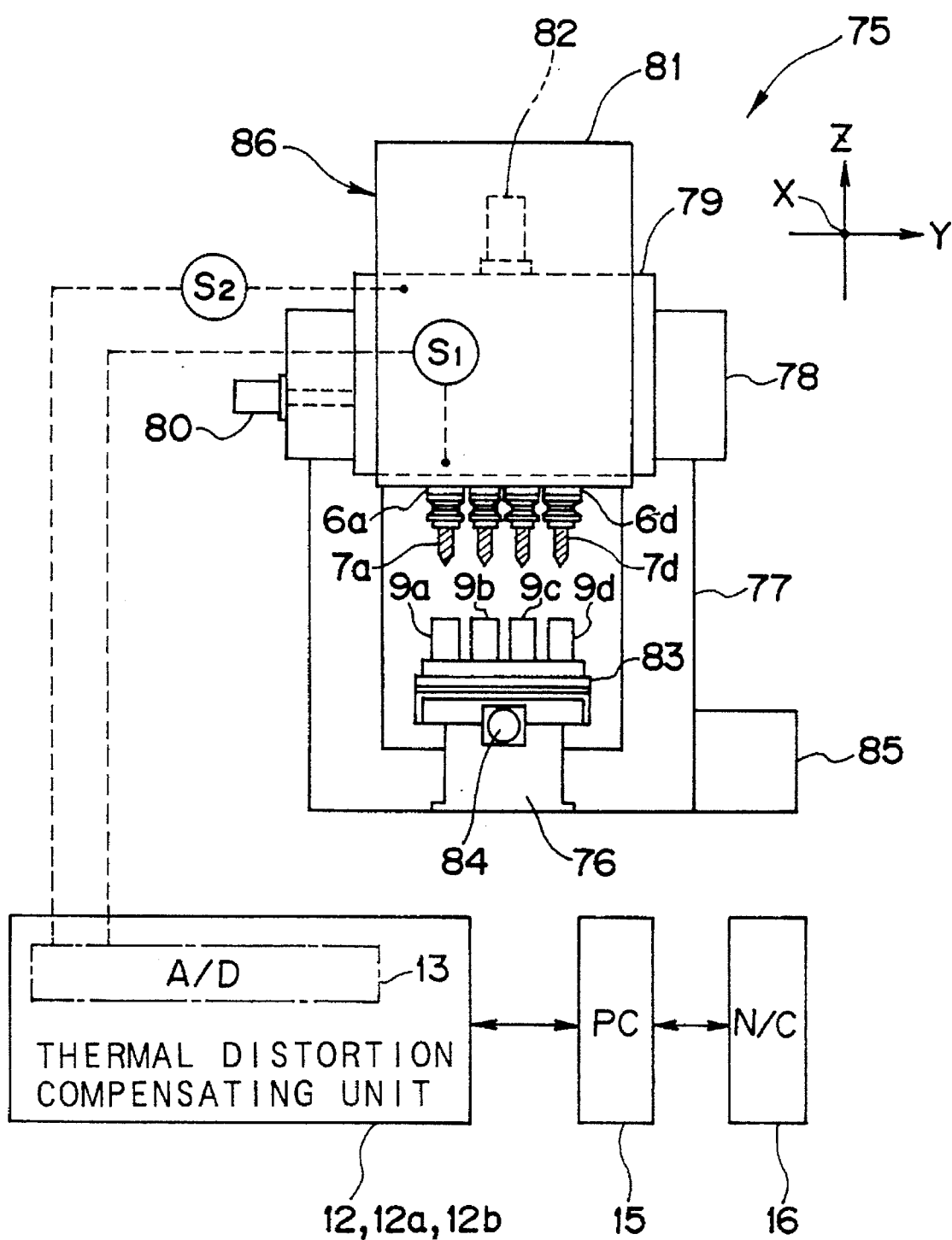
FIG. 33 is a block diagram showing a fifth embodiment of the invention.

For instance, a machine tool shown in FIG. 33 is a vertical MC 75 having a plurality of main spindles and is used for simultaneously machining the four workpieces into the same shape by the four tools. A cross rail 78 disposed in the Y axis direction, i.e., in the horizontal direction is fixed to a top portion of a column 77 fixed to a bed 76 and vertically extending from a floor.

A saddle 79 is mounted on the cross rail 78 movably in the Y axis direction and is reciprocated by a Y axis servo motor 80 provided on the cross rail 78.

A main spindle head 81 is mounted on the saddle 79 to be movable in the Z axis direction. The spindle head 81 is reciprocated in the Z axis direction relative to the saddle 79 by a Z axis servo motor 82 provided on the saddle 79 and is movable to-and-fro in the Y axis direction together with the saddle 79 relative to the cross rail 78.

A plurality (for example, four) of main spindles 6a to 6d each extending in the Z axis direction are juxtaposed in the spindle head 81, and tools 7a to 7d are mounted on distal ends of the respective main spindles.

A table 83 on which a plurality (for example, four which is the same number as that of the main spindles) of workpieces 9a to 9d are laid is mounted on the bed 76 to be movable in the X axis direction. The table 83 is reciprocated by an X axis servo motor 84 provided on the bed 76.

A coolant feeder 85 is provided beside the column 77. The coolant feeder 85 constitutes a main spindle cooling unit as a temperature adjustment unit for making substantially uniform the thermal distortion of each main spindle by adjusting the temperature of each of the main spindle 6a to 6d.

Figure 34:
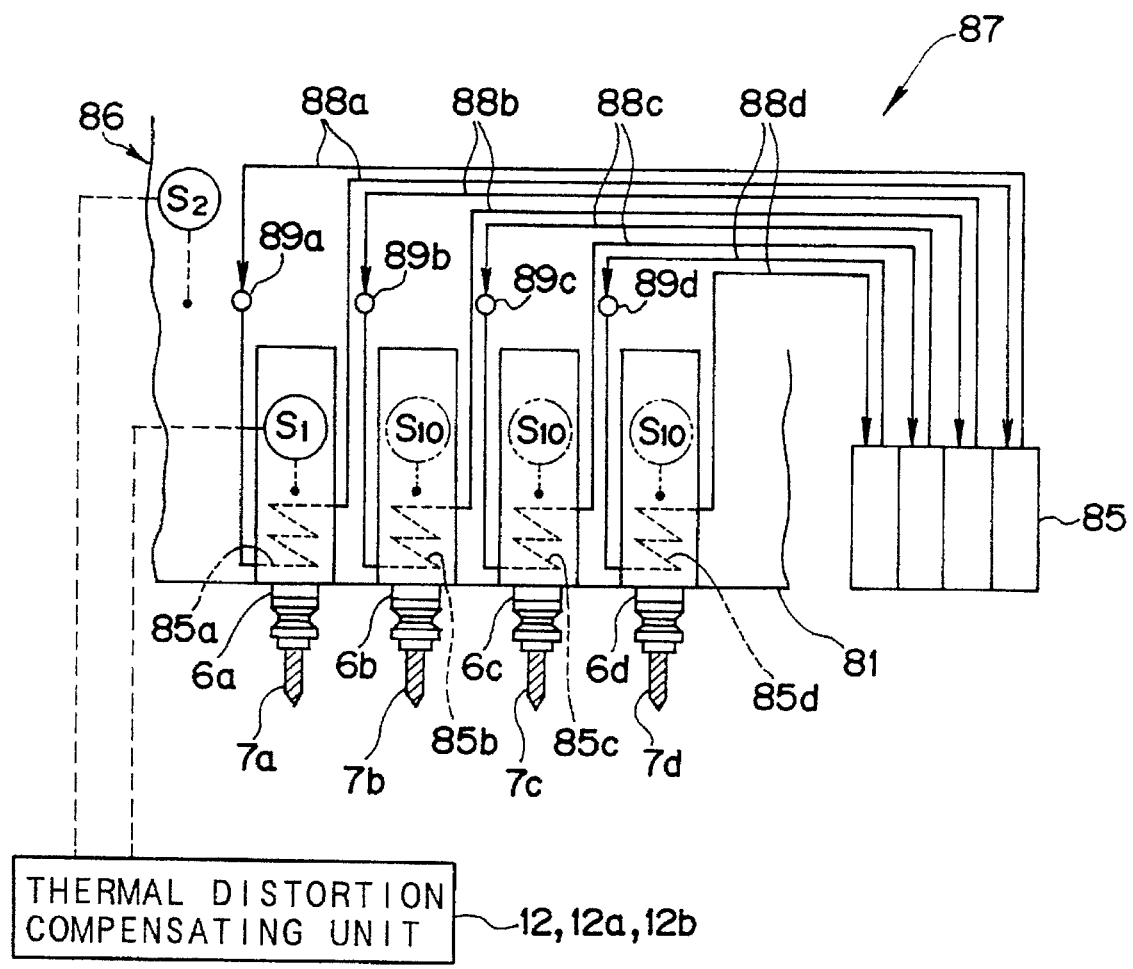
FIG. 34 is an illustration of a main spindle cooler.

FIG. 34 is a view for illustrating the main spindle cooling unit 87.

As shown, flow paths 85a to 85d for flowing the coolant oil to cool the bearings are formed in the vicinity of the bearings of the main spindles 6a to 6d. The coolant oil fed from the coolant feeder 85 is caused to flow pipes 88a to 88d, respectively, and its flow rate is adjusted manually or automatically by flow rate adjusting valves 89a to 89d. Thus, the temperatures of the respective main spindles 6a to 6d are independently adjusted. The coolant oil is caused to flow the flow paths 85a to 85d to cool the bearings of the main spindles 6a to 6d and is returned back to the coolant feeder 85 where the coolant oil is cooled and recirculated for reuse.

Incidentally, instead of or in addition to the flow rate adjustment, the temperature of the coolant oil may be adjusted by the feeder 85 to thereby adjust the temperature of every main spindle. Also, it is possible to use water or another coolant (cutting oil agent) instead of the above coolant oil.

By the way, comparing the thermal distortions in the case where the four main spindles are rotated, in general, the thermal distortions of the main spindles 6a and 6b on the right and left outsides are smaller than those of the main spindles 6b and 6c on the inside. This is due to the difference of the places where the respective main spindles are mounted. Namely, this is because the heat generated in the bearings of the main spindles 6a and 6d on both sides is quickly conducted to the spindle head 81 to thereby suppress the temperature elevation of the main spindles 6a and 6d.

Therefore, the nose temperature sensor $S_1$ as the temperature detecting means is mounted on the spindle head 81 so as to be positioned in the vicinity of the heat source of the typical main spindle 6a which has the smallest thermal distortion. The sensor $S_1$ detects the temperature change of the machine structure 86 whereby the method using the thermal distortion compensating units 12, 12a and 12b in the foregoing embodiments is used to compensate for the thermal distortion relative to the typical main spindle 6a.

By cooling each main spindle by adjusting the flow rate (and/or adjusting the temperature of the oil) with the flow rate adjustment valve 89a to 89d, the thermal distortions of the other three main spindles 6b to 6d are made substantially coincident with the thermal distortion of the typical main spindle 6a. Thus, the non-uniformity of the thermal distortions among the main spindles is canceled.

Incidentally, since the thermal distortion of the typical main spindle 6a is at minimum, if the main spindle 6a is not cooled or somewhat cooled and the flow rate of the coolant for the other main spindles 6b to 6d are adjusted, the feed amount of the oil from the feeder 85 is small as a whole, accordingly, this is preferable.

Figure 35:
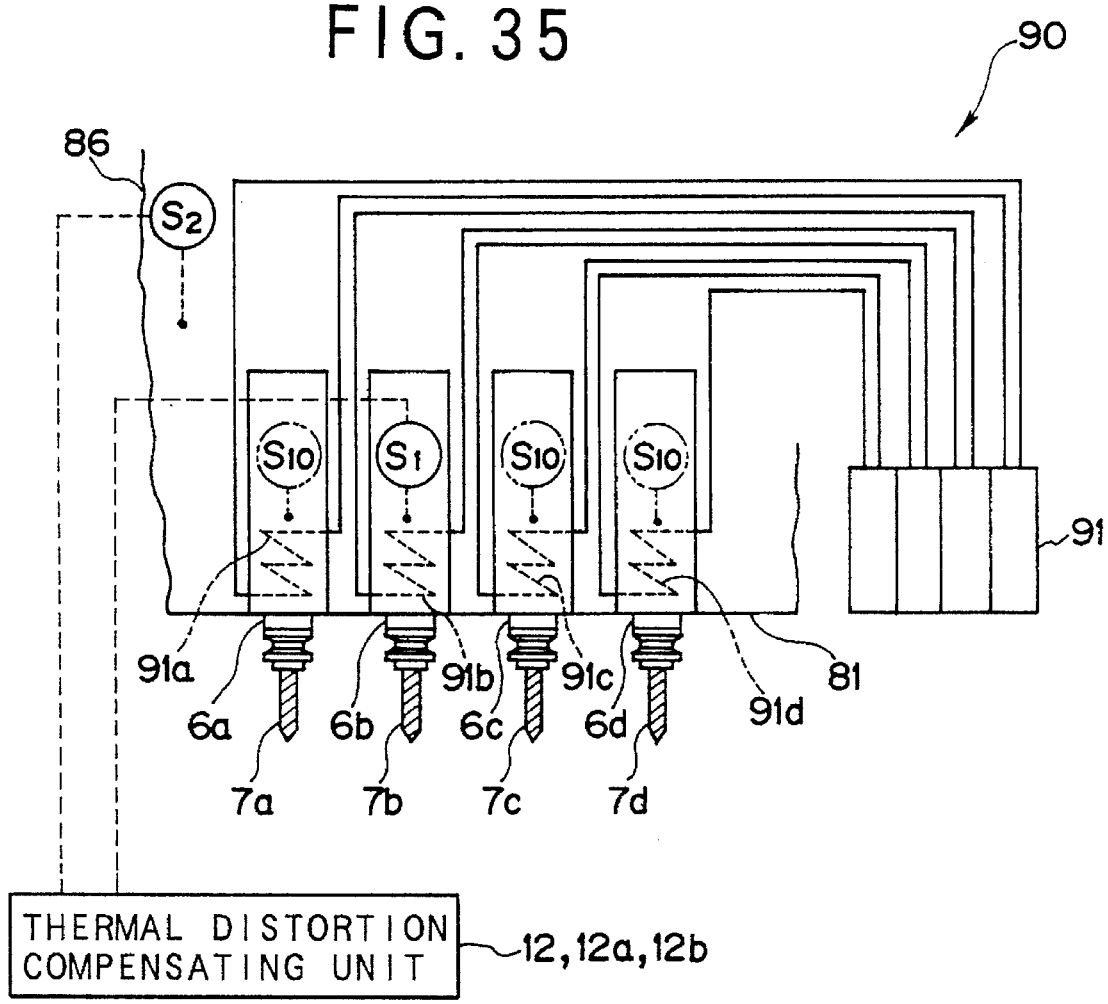
FIG. 35 is an illustration of a main spindle heater.

FIG. 35 shows the case where the main spindle heating unit 90 is used as a temperature adjusting unit instead of the main spindle cooling unit 87.

As shown in FIG. 35, heating members such as heaters 91a to 91d and the like are provided in the vicinity of the main spindles 6a to 6d. By controlling independently currents that flow through each heater 91a to 91d by a current controller 91, the heat amount of the heaters 91a to 91d is adjusted. The current control is quicker in response and easier than the control of the amount of the coolant and the temperature. In addition, the main spindle heating unit as a whole is compact. This method is preferable.

In this case, the main spindle (for example, the main spindle 6b) having the maximum thermal distortion is selected as a typical spindle, and the nose temperature sensor $S_1$ is mounted in the vicinity of the main spindle 6b for detecting the temperature change of the machine structure 86. Then, by heating each main spindle by controlling the current with the current controller 91, the thermal distortions of the other three main spindles 6a, 6c and 6d are kept substantially at the same level as that of the typical main spindle 6b so as to cancel the non-uniformity of the thermal distortions among the main spindles.

Incidentally, it is preferable that the typical main spindle 6b is not heated or somewhat heated and the temperatures of the other main spindles are adjusted to thereby reduce the current for the main spindle heater 90 as a whole.

In this embodiment, the head temperature sensor $S_2$ for detecting the temperature change of the machine structure 86 is disposed at any desired position (for example, a suitable position of the spindle head 81) away from the main spindle position in addition to the sensor $S_1$ as desired. It is therefore possible to compensate for the thermal distortions in accordance with a mix method solely or the respective method combining the mix method and the dummy method.

The output signals of the respective sensors $S_1$ and $S_2$ are inputted into the A/D convertor 13 of the thermal distortion compensating units 12, 12a and 12b, and thereafter are processed in the same way as the foregoing embodiments.

Incidentally, as shown by two dot and dash lines, it is preferable to provide temperature sensors $S_{10}$ in the vicinity of the respective main spindles except the typical main spindle 6b to detect the temperature of each main spindle. The temperature change of the temperature detected by each sensor $S_{10}$ is not used for thermal distortion compensation. However, the thermal distortion of each main spindle is predicted from the temperature change. It is possible to control the uniformity of the thermal distortions among the main spindles by the main spindle cooler 87 or the main spindle heater 90.

Figure 36:
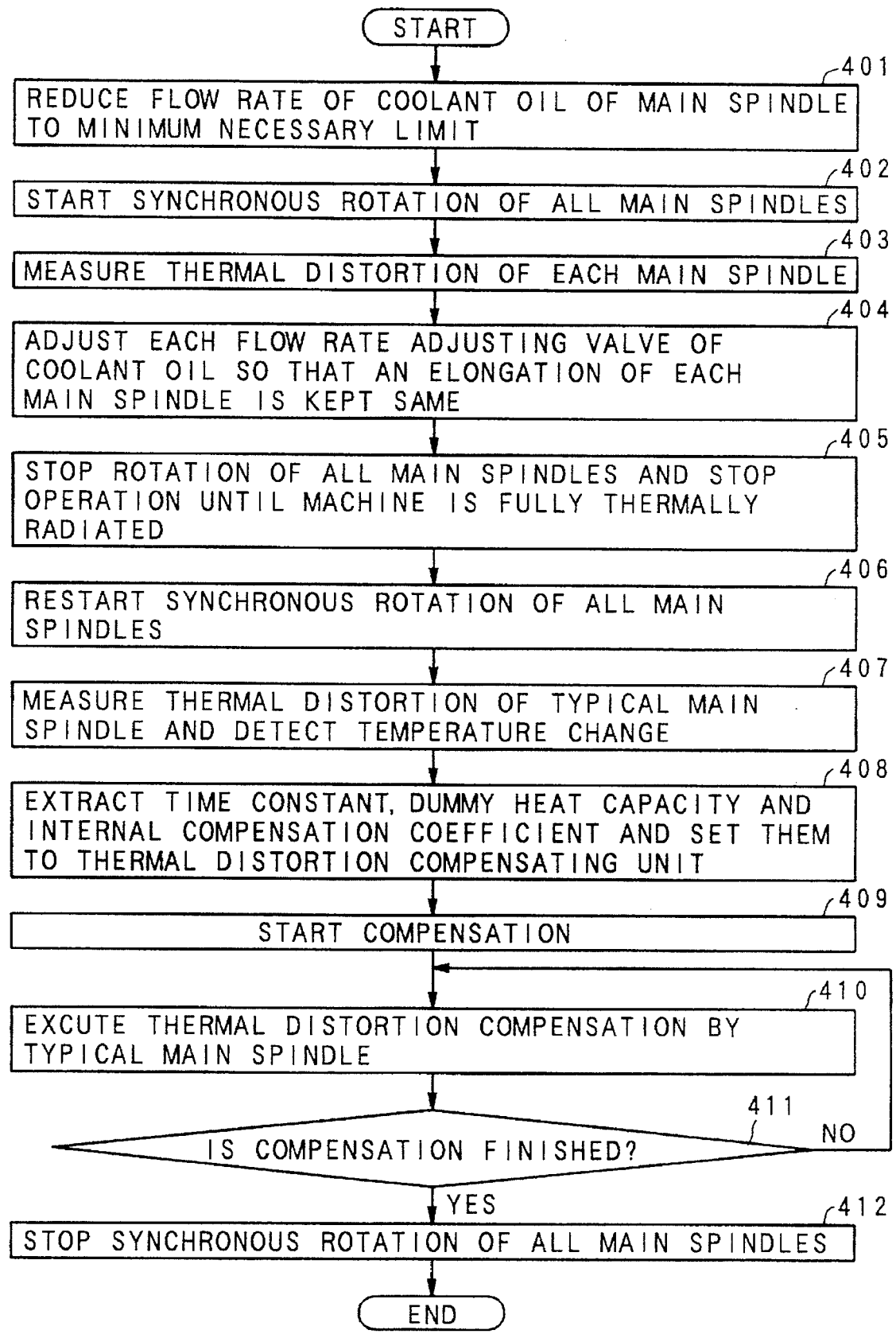
FIG. 36 is a flow chart showing the operation of the fifth embodiment.

FIG. 36 is a flow chart showing steps of the embodiment in the case where the main spindle cooler 87 is used. Incidentally, the following explanation in the bracket relates to the case where the main spindle heater 90 is used.

First of all, the adjusting valves 89a to 89d are actuated so that the flow rate of the coolant oil that flows through each main spindle 6a to 6d (or current of the heaters 91a to 91d) is throttled at a minimum level (step 401). Subsequently, the synchronous rotation of all the main spindle is started (step 402). After the machine tool is operated at a constant rotation speed for a predetermined period of time, the thermal distortion in the Z axis direction at the distal end portion of the main spindle due to the elongation of each main spindle is measured (step 403).

The flow rate of the coolant that flows through the flow paths 85a to 85d of each of the main spindle is adjusted by the adjusting valves 89a to 89d (or adjusting the current of the heater 91a to 91d by the current controller 91) so that the thermal distortion, i.e., the elongation of each main spindle is kept at the same level. Then, the adjust amount is set (step 404).

The rotation of all the main spindles is stopped and the operation is stopped till the machine structure 86 as a whole is sufficiently thermally radiated (step 405).

Thereafter, the synchronous rotation of all the main spindle is again started and the coolant oil (or current) is caused to flow through each main spindle in accordance with the adjust amount set in the step 404 (step 406).

Subsequently, the thermal distortion in the Z axis direction in the tip end portion of the typical main spindle 6a (or 6b) is measured as the time basis data, and the temperature change of the machine structure 86 is detected by one or both of the sensors $S_1$ and $S_2$ (step 407).

Thus, the detected temperature changes are used, in the same manner as in the foregoing embodiments, the nose temperature time constant $\tau_N$, the head temperature time constant $\tau_H$, the sample temperature time constant $\tau_S$, and the like are extracted, and the dummy heat capacity and the internal compensation coefficients are calculated. Then, these values are set in the thermal distortion compensating units 12, 12a and 12b (step 408).

The compensation is started in step 409. The thermal distortion compensation is executed by using the typical main spindle (step 410). In the case where the compensation should be finished in the step 411, the synchronous rotation of all the main spindle is stopped (step 412) and all the steps are finished. In the case where the compensation is not stopped, the operation is returned back to the step 410.

As shown in FIG. 33, the corrected thermal distortion of the typical main spindle calculated in the compensating units 12, 12a and 12b is fed to the numerical control unit 16 through the programmable controller 15 and is fed back to the Z axis servo motor 82. Thus, the Z axis servo motor 82 moves the spindle head 81 by a small distance in the Z axis direction to thereby carry out the positional compensation.

The thermal distortions of the typical main spindle and the other main spindles are made substantially uniform by the main spindle cooler 87 (or the main spindle heater 90).

Accordingly, it is possible to simultaneously machine four workpieces 9a to 9d with high precision by the tools 7a to 7d held by the main spindles 6a to 6d, respectively.

Figure 37:
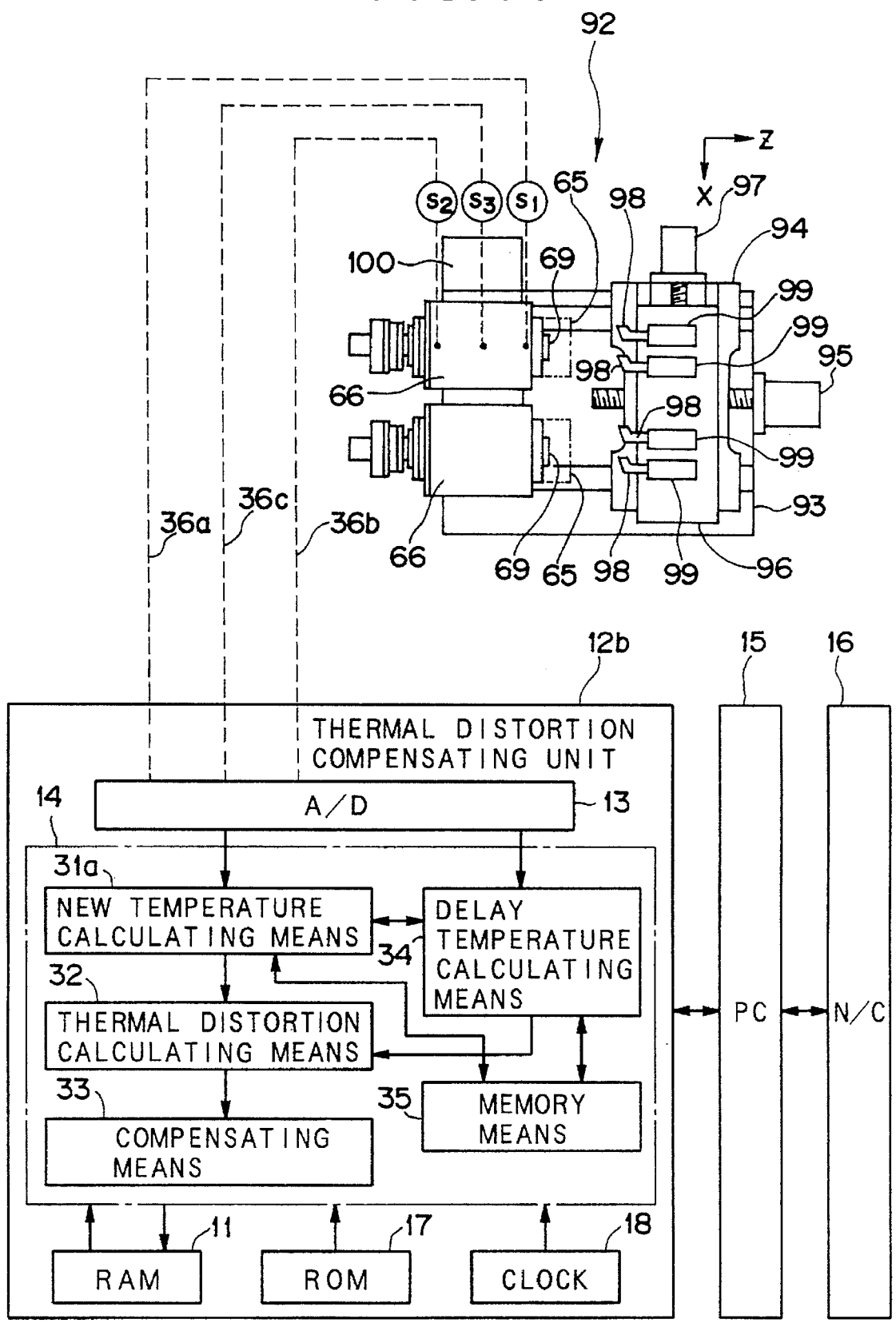
FIG. 37 is a view showing a modification of the fifth embodiment and is a block diagram including a plan view showing the machine tool having a plurality of main spindles.

FIG. 37 is a block diagram including a plan view of the machine tool having a plurality of main spindles. This is an example of the application of the fifth embodiment.

The machine tool shown is a multi-axis NC lathe 92 provided with headstocks 66 having the same structure as that of the fourth embodiment and two sets of main spindles 69. Accordingly, the NC lathe 92 has multi-heat sources and multiple spindles.

Two headstocks 66 are juxtaposed on a bed 93. A saddle 94 is mounted on the bed 93 movably in the Z axis direction and is reciprocated by a Z axis servo motor 95.

A cross slide 96 is mounted on the saddle 94 movably in the X axis direction and is reciprocated by the X axis servo motor 97. A plurality of blocks 99 having tools 98 are mounted on the cross slide 96. The main spindles 96 holding the workpieces through the chucks 65 and the like are rotated to cut the workpieces by the tools 98.

A coolant oil feeder 100 which constitutes a main spindle cooler unit having the same principle as in the main spindle cooler 87 shown in FIG. 34 is provided on the bed 93. The main spindle cooler are used to independently adjust the temperatures of the two main spindles 69 so that the thermal distortions of both the spindles are kept substantially equal to each other.

Flow paths for suppressing the elongations of the main spindles with the coolant oil are formed in the headstocks 66 in the vicinity of the front and rear bearings 71 and 72 of the both main spindles 69 and the built-in motors 70 (see FIG. 30). The main cooler has the same pipes and flow adjusting valves as those shown in FIG. 34. The adjustment of the flow rate to each main spindle 69 may be carried out independently.

Since the sensors $s_1$, $s_2$ and $s_3$ are mounted on the one headstock 66 in the same manner as in the fourth embodiment, the thermal distortion compensation is carried out by the thermal distortion compensating unit 12b in the same manner as in the fourth embodiment. The main spindle 69 on which the sensors $s_1$, $s_2$ and $s_3$ are mounted is used as a typical main spindle, and the thermal distortion of one typical main spindle 69 is made coincident with the thermal distortion of the other main spindle 69 so as to cancel the non-uniformity of the thermal distortions between the main spindles 69 and 69.

If the thermal compensation of the typical main spindle is carried out in the same steps as shown in FIG. 36, the workpieces held by the typical main spindle 69 and the other main spindle 69 may be simultaneously worked with high precision by the tools 98.

Incidentally, in the fifth embodiment, the single typical main spindle is used. In the case where the simultaneous working is not carried out, it is possible to compensate for the thermal distortion independently of a plurality of typical main spindles. Also, the cooler or the heater to which a Peltier effect is utilized may be used.

By the way, there are some conventional multiple spindle type machine tools in which a large amount of coolant oil or the like is caused to flow through the passage in the vicinity of a bearing of each main spindle to strongly cool the main spindle in order to reduce the elongation of the main spindle due to the heat generation. In this conventional method, it has been tried that the thermal distortion and non-uniformity of each main spindle are simultaneously canceled by causing the thermal distortion of each spindle to physically approach zero.

However, there is a limit to cancellation of the thermal distortion by this method. It is impossible to suppress the thermal distortion down to +10 μm or less. Also, since a large amount of coolant oil is recirculated, a large capacity cooler is required and a large amount of energy is wasted. Further, there is a fear that a strain would be generated in the bearing due to the strong cooling effect and the main spindle would be stuck.

In contrast, in the fifth embodiment, the thermal distortion of each main spindle is not caused to physically approach zero but the thermal distortions of the typical main spindle and the other main spindle are caused to be substantially equal to each other in order to cancel the non-uniformity between the main spindles. The typical main spindle is subjected to the thermal distortion compensation. Accordingly, it is possible to cause the machining errors after the compensation to be close to zero. The main spindle cooler 85 may be compact and the energy may be saved. There is no fear that the bearing would be stuck because of the small cooling effect.

Incidentally, the repetitive calculation is carried out in the first through fifth embodiments. Accordingly, as shown in FIGS. 1, 2, 18, 29 and 37, a memory means 35 is preferably provided in the thermal distortion compensating units 12, 12a and 12b. The memory means 35 stores the previous calculation result and a period from the time when the power source of the machine tool is turned off to the time when the power source of the machine tool is again turn The memory means 35 presents output signals to and receives signals from the delay temperature calculating means 34, 34a and 34b and the new temperature calculating means 31a. Thus, even if the power source is turned off, the history of the calculation of the thermal distortion compensation is stored in the memory means 35 so that the repetitive calculation is effective.

Also, in case of the dummy method in combination with the mix method or the dummy method in combination with the linearizing method, the temperature change of the machine structure may be detected by a discrete temperature sensor provided on a column, a bed, a cross rail or the like of the machine tool.

Also, as the temperature detecting means according to the present invention, a strain gauge for detecting the elongation of the machine structure due to the temperature change may be used instead of the temperature sensor. Namely, instead of directly detecting the temperature change of the machine structure by the temperature sensor, the strain gauge having the same output characteristics as the temperature change is mounted on the machine structure. Then, if an output signal of the strain gauge is inputted into the A/D convertor 13, this is substantially the same as detecting the temperature change, so that the same effect may be brought.

By the way, it is sufficient that the correlation in each embodiment is a constant relation and any other relation other than the linear correlation may be utilized.

In the present invention, since the length of the machine structure portion as in the conventional case is not utilized, there is no limit to the length of the machine structure. Also, it is unnecessary to conduct an actual measurement work of the data by changing variously the length measurement of parts of the machine structure or the rotation speed of the main spindle.

Accordingly, it is sufficient that the measurement of the rotation speed is carried out once. Thus, the measurement work for extracting the thermal distortion characteristics by using the actual machine tool is simplified. Also, it is unnecessary to carry out the confirmation work of the linear expansion coefficient of the machine structure material.

Further, since the temperature sensor may be located at any desired position, the limit to the mount position of the temperature sensor is moderated. A thermal distortion may be predicted with high precision with a small number of temperature sensors (for example, one or two sensors for one heat source). There is a high degree of freedom.

Also, the compensation is effected on the basis of the temperature of the machine structure and does not depend upon the direct detection of the room temperature. Accordingly, for instance, even if due to the action of opening the door of the room in the winter time, and the operation of an air conditioner in the summer time or the like, the room temperature would be rapidly changed, there is no adverse influence of the room temperature. It is possible to keep the compensation accuracy at a high precision level.

Also, the method and apparatus for compensating the thermal distortion of the invention may be applied to other type machines in which the thermal distortion would adversely influence the precision and performance of the machines, or automatic controlling machine such as a printing machine, a press and a laser working machine, so that the same effect will be ensured. The automatic controlling machines are controlled by an automatic controller such as an NC unit.

Accordingly to the present invention, as described above, it is possible to carry out the compensation for the thermal distortion with high precision.

The same reference numerals are used to designate the like members or components throughout the specification.

Various details of the invention may be changed without departing from its spirit nor its scope. Further, the foregoing description of the embodiments according to the invention is provided for the purpose of illustration only, and not for the purpose of limiting the invention as defined by the appended claims and their equivalents.

What is claimed is:

1. A method for compensating for a thermal distortion of a machine tool, comprising the steps of:

detecting a temperature change of a machine structure which is influenced by a heat source;

calculating a temperature change having substantially the same time constant as a time constant of the thermal distortion of said machine tool by using the temperature change detected; and correcting a machining error on the basis of a thermal distortion that changes in correspondence with the calculated temperature change.

2. A method for compensating for a thermal distortion of a machine tool, comprising the steps of:

detecting a temperature change of a machine structure which is influenced by a heat source;

calculating a temperature change having substantially the same time constant as a time constant of the thermal distortion of said machine tool by using the temperature change detected;

calculating a thermal distortion that changes in correspondence with the calculated temperature change;

detecting a temperature change at a predetermined position of said machine structure;

calculating a delay temperature change having substantially the same function of time as a lagging characteristic in which the thermal distortion is gradually offset from the calculated thermal distortion, by predicting a time lag to the detected temperature change; and correcting a machining error on the basis of a total value obtained by adding the lagging characteristic, that changes in correspondence with the delay temperature change, to the calculated thermal distortion.

3. A method for compensating for a thermal distortion of a machine tool, comprising the steps of:

detecting temperature changes of a machine structure at at least two positions which are influenced by a heat source and in which the temperature changes have different time constants each other;

mixing each temperature change detected, and then calculating a mixed temperature change having substantially the same time constant as a time constant of the thermal distortion of said machine tool; and correcting a machining error on the basis of a thermal distortion that changes in correspondence with the mixed temperature change.

4. A method for compensating for a thermal distortion of a machine tool, comprising the steps of:

detecting a temperature change of a machine structure in the vicinity of a heat source;

calculating a delay temperature change having substantially the same time constant as a time constant of the thermal distortion of said machine tool, by predicting a time lag of the detected temperature change; and correcting a machining error on the basis of a thermal distortion that changes in correspondence with the delay temperature change.

5. A method for compensating for a thermal distortion of a machine tool, comprising the steps of:

detecting a temperature change at a predetermined position of a machine structure which is influenced by a heat source;

calculating a temperature change of the heat source by using the detected temperature change;

calculating a new temperature change having substantially the same time constant as a time constant of the thermal distortion of said machine tool by using the temperature change of the heat source; and correcting a machining error on the basis of a thermal distortion that changes in correspondence with the new temperature change.

6. A method for compensating for a thermal distortion of a machine tool, comprising the steps of:

detecting temperature changes of a machine structure at at least two positions which are influenced by a heat source and in which the temperature changes have different time constants each other;

mixing each temperature change detected, and then calculating a mixed temperature change having substantially the same time constant as a time constant of the thermal distortion of said machine tool;

calculating a thermal distortion that changes in correspondence with the mixed temperature change;

detecting a temperature change at a predetermined position of the machine structure;

calculating a delay temperature change having substantially the same function of time as a lagging characteristic in which the thermal distortion is gradually offset from the calculated thermal distortion, by predicting a time lag to the detected temperature change; and correcting a machining error on the basis of a total value obtained by adding the lagging characteristic, that changes in correspondence with the delay temperature change, to the calculated thermal distortion.

7. A method for compensating for a thermal distortion of a machine tool, comprising the steps of:

detecting a temperature change of a machine structure in the vicinity of a heat source;

calculating a first delay temperature change having substantially the same time constant as a time constant of the thermal distortion of said machine tool, by predicting a time lag to the detected temperature change;

calculating a thermal distortion that changes in correspondence with the first delay temperature change;

detecting a temperature change at a predetermined position of the machine structure;

calculating a second delay temperature change having substantially the same function of time as a lagging characteristic in which the thermal distortion is gradually offset from the calculated thermal distortion, by predicting a time lag to the detected temperature change; and correcting a machining error on the basis of a total value obtained by adding the lagging characteristic, that changes in correspondence with the second delay temperature change, to the calculated thermal distortion.

8. A method for compensating for a thermal distortion of a machine tool, comprising the steps of:

detecting a temperature change at a predetermined position of a machine structure which is influenced by a heat source;

calculating a temperature change of the heat source by using the detected temperature change;

calculating a new temperature change having substantially the same time constant as a time constant of the thermal distortion of said machine tool by using the temperature change of the heat source;

calculating a thermal distortion that changes in correspondence with the new temperature change;

detecting a temperature change at a predetermined position of the machine structure;

calculating a delay temperature change having substantially the same function of time as a lagging characteristic in which the thermal distortion is gradually offset from the calculated thermal distortion, by predicting a time lag to the detected temperature change; and correcting a machining error on the basis of a total value obtained by adding the lagging characteristic, that changes in correspondence with the delay temperature change, to the calculated thermal distortion.

9. A method for compensating for a thermal distortion of a machine tool according to any one of claims 1 to 8, wherein said machine tool is selected from one of a machining center in which said heat source is a main spindle head and an NC lathe in which said heat source is a headstock.

10. A method for compensating for a thermal distortion of a machine tool according to any one of claims 1, 2, 5 and 8, wherein said machine tool comprises:

a main spindle for holding one of a workpiece and a tool;

a main spindle head for rotatably supporting said main spindle through a main bearing on a working position side and the other bearing on an opposite working position side, said main spindle being supported by the bearings; and a built-in motor interposed between both the bearings and incorporated in said spindle head for drivingly rotating said main spindle, wherein said main spindle bearing positions said main spindle in a central axial direction, and the other bearing supports said main spindle, that is elongated and contracted by the thermal distortion, slidingly in the central axial direction, and wherein a head temperature sensor for detecting said temperature change at a head position which is influenced by said heat source is mounted on said spindle head.

11. A method for compensating for a thermal distortion of a machine tool according to any one of claims 1, 2, 5 and 8, wherein said machine tool comprises:

a main spindle for holding one of a workpiece and a tool;

a headstock for rotatably supporting said main spindle through a front bearing on a working position side and a rear bearing on an opposite working position side, said main spindle being supported by the bearings; and a built-in motor interposed between said front and rear bearings and incorporated in said headstock for drivingly rotating said main spindle, wherein said rear bearing positions said main spindle in a central axial direction, and the front bearing supports said main spindle, that is elongated and contracted by the thermal distortion, slidingly in the central axial direction, and wherein three temperature sensors for detecting said temperature changes in the vicinity of said front and rear bearings and said built-in motor which become the heat sources are mounted on said headstock.

12. A method for compensating for a thermal distortion of a machine tool according to any one of claims 1 to 8, wherein said machine tool comprises a plurality of main spindles which holds one of the workpiece and the tool and rotates synchronistically each other, said main spindles being provided on a main spindle head, and wherein the thermal distortion of said spindle head with thermal growth caused by the rotation of said plurality of main spindles is made uniform by controlling an amount and/or a temperature of coolant oil flowing through a jacket provided in a nose portion of each of said main spindles, or by controlling a current amount of a heater provided in the nose portion of each of said main spindles, so as to cancel a non-uniformity of the thermal distortions among the main spindles, and at least one of said main spindles is used as the heat source.

13. A method for compensating for a thermal distortion of a machine tool according to any one of claims 1 to 8, wherein the temperature change is calculated by subtracting a reference temperature from a detected temperature.

14. An apparatus for compensating for a thermal distortion of a machine tool, comprising:

temperature detecting means for detecting a temperature change of a machine structure which is influenced by a heat source;

temperature calculating means for calculating a temperature change having substantially the same time constant as a time constant of the thermal distortion of said machine tool by using the temperature change detected by said temperature detecting means;

thermal distortion calculating means for calculating a thermal distortion that changes in correspondence with the temperature change calculated by said temperature calculating means; and compensating means for correcting a machining error on the basis of the thermal distortion calculated by said thermal distortion calculating means.

15. An apparatus for compensating for a thermal distortion of a machine tool, comprising:

temperature detecting means for detecting a temperature change of a machine structure which is influenced by a heat source;

temperature calculating means for calculating a temperature change having substantially the same time constant as a time constant of the thermal distortion of said machine tool by using the temperature change detected by said temperature detecting means;

thermal distortion calculating means for calculating a thermal distortion that changes in correspondence with the temperature change calculated by said temperature calculating means;

temperature detecting means for separately detecting a temperature change at a suitable position of said machine structure if necessary; and delay temperature calculating means for calculating a delay temperature change having substantially the same function of time as a lagging characteristic in which the thermal distortion is gradually offset from the thermal distortion calculated by said thermal distortion calculating means, by predicting a time lag to the temperature change detected by any of said temperature detecting means;

wherein a lagging characteristic that changes in correspondence with the delay temperature change is calculated, and at the same time, the lagging characteristic is added to the thermal distortion to thereby calculate a total value by said thermal distortion calculating means; and wherein a machining error is corrected on the basis of the total value by a compensating means.

16. An apparatus for compensating for a thermal distortion of a machine tool, comprising:

temperature detecting means for detecting temperature changes of a machine structure at at least two positions which are influenced by a heat source and in which the temperature changes have different time constants each other;

mixed temperature calculating means for mixing each temperature change detected by said temperature detecting means, and then calculating a mixed temperature change having substantially the same time constant as a time constant of the thermal distortion of said machine tool in a predetermined axial direction;

thermal distortion calculating means for calculating a thermal distortion that changes in correspondence with the mixed temperature change calculated by said mixed temperature calculating means; and compensating means for correcting a machining error on the basis of the thermal distortion in the predetermined axial direction calculated by said thermal distortion calculating means.

17. An apparatus for compensating for a thermal distortion of a machine tool, comprising:

temperature detecting means for detecting a temperature change of a machine structure in the vicinity of a heat source;

delay temperature calculating means for calculating a delay temperature change having substantially the same time constant as a time constant of the thermal distortion of said machine tool in a predetermined axial direction, by predicting a time lag of the temperature change detected by said temperature detecting means;

thermal distortion calculating means for calculating a thermal distortion that changes in correspondence with the delay temperature change calculated by said delay temperature calculating means; and compensating means for correcting a machining error on the basis of the thermal distortion in the predetermined axial direction calculated by said thermal distortion calculating means.

18. An apparatus for compensating for a thermal distortion of a machine tool, comprising:

temperature detecting means for detecting a temperature change at a predetermined position of a machine structure which is influenced by a heat source;

new temperature calculating means for calculating a temperature change of said heat source by using the temperature change detected by said temperature detecting means, and then calculating a new temperature change having substantially the same time constant as a time constant of the thermal distortion of said machine tool in a predetermined axial direction by using the temperature change of said heat source;

thermal distortion calculating means for calculating a thermal distortion that changes in correspondence with the temperature change calculated by said new temperature calculating means; and compensating means for correcting a machining error on the basis of the thermal distortion in the predetermined axial direction calculated by said thermal distortion calculating means.

19. An apparatus for compensating for a thermal distortion of a machine tool, comprising:

temperature detecting means for detecting temperature changes of a machine structure at at least two positions which are influenced by a heat source and in which the temperature changes have different time constants each other;

mixed temperature calculating means for mixing each temperature change detected by said temperature detecting means, and then calculating a mixed temperature change having substantially the same time constant as a time constant of the thermal distortion of said machine tool in a predetermined axial direction;

thermal distortion calculating means for calculating a thermal distortion that changes in correspondence with the mixed temperature change calculated by said mixed temperature calculating means;

temperature detecting means for separately detecting a temperature change at a suitable position of said machine structure, if necessary; and delay temperature calculating means for calculating a delay temperature change having substantially the same function of time as a lagging characteristic in which the thermal distortion in the predetermined axial direction is gradually offset from an output of said thermal distortion calculating means, by predicting a time lag to the temperature change detected by any of said temperature detecting means;

wherein the lagging characteristic that changes in correspondence with the delay temperature change is calculated, and at the same time, the lagging characteristic is added to the thermal distortion to thereby calculate a total value by said thermal distortion calculating means; and wherein a machining error is corrected on the basis of the total value by a compensating means.

20. An apparatus for compensating for a thermal distortion of a machine tool, comprising:

temperature detecting means for detecting temperature change of a machine structure in the vicinity of a heat source;

first delay temperature calculating means for calculating a delay temperature change having substantially the same time constant as a time constant of the thermal distortion of said machine tool in a predetermined axial direction, by predicting a time lag of the temperature change detected by said temperature detecting means;

thermal distortion calculating means for calculating a thermal distortion that changes in correspondence with the delay temperature change calculated by said first delay temperature calculating means;

temperature detecting means for separately detecting a temperature change at a suitable position of said machine structure, if necessary;

second delay temperature calculating means for calculating a delay temperature change having substantially the same function of time as a lagging characteristic in which the thermal distortion of said machine tool in the predetermined axial direction is gradually offset from the output of said thermal distortion calculating means, by predicting a time lag to the temperature change detected by any of said temperature detecting means;

wherein the lagging characteristic that changes in correspondence with the delay temperature change calculated by said second delay temperature calculating means is calculated, and at the same time, the lagging characteristic is added to the thermal distortion to thereby calculate a total value by said thermal distortion calculating means; and wherein a machining error is corrected on the basis of the total value by a compensating means.

21. An apparatus for compensating for a thermal distortion of a machine tool, comprising:

temperature detecting means for detecting a temperature change at predetermined positions of a machine structure which is influenced by a heat source;

new temperature calculating means for calculating a temperature change of said heat source by using the temperature change detected by said temperature detecting means, and then calculating a new temperature change having substantially the same time constant as a time constant of the thermal distortion of said machine tool in a predetermined axial direction by using the temperature change of said heat source;

thermal distortion calculating means for calculating a thermal distortion that changes in correspondence with the new temperature change calculated by said new temperature calculating means;

temperature detecting means for separately detecting a temperature change at a suitable position of said machine structure, if necessary;

delay temperature calculating means for calculating a delay temperature change having substantially the same function of time as a lagging characteristic in which the thermal distortion in the predetermined axial direction is gradually offset from the output of said thermal distortion calculating means, by predicting a time lag to the temperature change detected by any of said temperature detecting means;

wherein the lagging characteristic that changes in correspondence with the delay temperature change is calculated, and at the same time, the lagging characteristic is added to the thermal distortion to thereby calculate a total value by said thermal distortion calculating means; and wherein a machining error is corrected on the basis of the total value by a compensating means.

22. An apparatus for compensating for a thermal distortion of a machine tool according to any one of claims 14 to 21, wherein said machine tool is selected from one of a machining center in which said heat source is a main spindle head and an NC lathe in which said heat source is a headstock.

23. An apparatus for compensating for a thermal distortion of a machine tool according to any one of claims 14, 15, 18 and 21, wherein said machine tool comprises:

a main spindle for holding one of a workpiece and a tool;

a main spindle head for rotatably supporting said main spindle through a main bearing on a working position side and the other bearing on an opposite working position side, said main spindle being supported by the bearings; and a built-in motor interposed between both the bearings and incorporated in said spindle head for drivingly rotating said main spindle, wherein said main bearing positions said main spindle in a central axial direction, and the other bearing supports said main spindle, that is elongated and contracted by the thermal distortion, slidingly in the central axial direction, and wherein a head temperature sensor for detecting said temperature change at a head position which is influenced by said heat source is mounted on said spindle head.

24. An apparatus for compensating for a thermal distortion of a machine tool according to any one of claims 14, 15, 18 and 21, wherein said machine tool comprises:

a main spindle for holding one of a workpiece and a tool;

a headstock for rotatably supporting said main spindle through a front bearing on a working position side and a rear bearing on an opposite working position side, said main spindle being supported by the bearings; and a built-in motor interposed between said front and rear bearings and incorporated in said headstock for drivingly rotating said main spindle, wherein said rear bearing positions said main spindle in a central axial direction, and the front bearing supports said main spindle, that is elongated and contracted by the thermal distortion, slidingly in the central axial direction, and wherein three temperature sensors for detecting said temperature changes in the vicinity of said front and rear bearings and said built-in motor which become the heat sources are mounted on said headstock.

25. An apparatus for compensating for a thermal distortion of a machine tool according to any one of claims 14 to 21, wherein said machine tool comprises a plurality of main spindles which holds one of the workpiece and the tool and rotates synchronistically each other, said main spindles being provided on a main spindle head, and wherein the thermal distortion of said spindle head with thermal growth caused by the rotation of said plurality of main spindles is made uniform by controlling an amount and/or a temperature of coolant oil flowing through a jacket provided in a nose portion of each of said main spindles, or by controlling a current amount of a heater provided in the nose portion of each of said main spindles, so as to cancel a non-uniformity of the thermal distortions among the main spindles, and at least one of said main spindles is used as the heat source.

26. An apparatus for compensating for a thermal distortion of a machine tool according to any one of claims 14 to 21, wherein the temperature change is calculated by subtracting a reference temperature from a detected temperature.

* * * * *